June 23, 1970 J. J. LENTZ 3,517,391

DIGITAL COMPUTER

Filed Oct. 26, 1953 26 Sheets-Sheet 1

DRUM LAYOUT

INVENTOR.
JOHN J. LENTZ

BY

Albert R. Hodges
ATTORNEY

INVENTOR.
JOHN J. LENTZ
BY
Albert R. Hodges
ATTORNEY

June 23, 1970 J. J. LENTZ 3,517,391

DIGITAL COMPUTER

Filed Oct. 26, 1953 26 Sheets-Sheet 3

INVENTOR.
JOHN J. LENTZ

BY Albert R. Hodges
ATTORNEY

INVENTOR.
JOHN J. LENTZ

BY Albert R. Hodges
ATTORNEY

DIGITAL COMPUTER

Filed Oct. 26, 1953 26 Sheets-Sheet 5

INVENTOR.
JOHN J. LENTZ
BY
Albert R. Hodges

INVENTOR.
JOHN J. LENTZ
BY Albert R. Hodges
ATTORNEY

INVENTOR.
JOHN J. LENTZ
BY
Albert R. Hodges
ATTORNEY

June 23, 1970 J. J. LENTZ 3,517,391

DIGITAL COMPUTER

Filed Oct. 26, 1953 26 Sheets-Sheet 8

FIG. 7 ARITHMETIC UNIT (PART 1)

INVENTOR.
JOHN J. LENTZ

BY Albert R. Hodges
ATTORNEY

FIG. 8 ARITHMETIC UNIT (PART 2)

INVENTOR.
JOHN J. LENTZ
BY Albert R. Hodges
ATTORNEY

DIGITAL COMPUTER

Filed Oct. 26, 1953 26 Sheets-Sheet 10

INVENTOR.
JOHN J. LENTZ

BY Albert R. Hodges
ATTORNEY

RECORDING INPUT CIRCUITS

SINGLE-SHOT GATE GENERATOR

INVENTOR.
JOHN J. LENTZ

BY Albert R. Hodges
ATTORNEY

SECOND TAG CONTROL CIRCUITS

INVENTOR.
JOHN J. LENTZ
BY Albert R. Hodges
ATTORNEY

June 23, 1970 J. J. LENTZ 3,517,391

DIGITAL COMPUTER

Filed Oct. 26, 1953 26 Sheets-Sheet 13

RELAY SEQUENCING CIRCUITS

INVENTOR.

JOHN J. LENTZ

BY Albert R. Hodges

ATTORNEY

INVENTOR.
JOHN J. LENTZ

BY Albert R. Hodges
ATTORNEY

June 23, 1970 J. J. LENTZ 3,517,391

DIGITAL COMPUTER

Filed Oct. 26, 1953 26 Sheets-Sheet 15

INVENTOR.

JOHN J. LENTZ

BY Albert R. Hodges

ATTORNEY

DIGITAL COMPUTER

Filed Oct. 26, 1953 26 Sheets-Sheet 16

INVENTOR.
JOHN J. LENTZ

BY Albert R. Hodges
ATTORNEY

INVENTOR.
JOHN J. LENTZ
BY Albert R. Hodges
ATTORNEY

June 23, 1970 J. J. LENTZ 3,517,391

DIGITAL COMPUTER

Filed Oct. 26, 1953 26 Sheets-Sheet 18

INVENTOR.

JOHN J. LENTZ

BASE OSCILLATOR AND SYNCHRONIZING CIRCUITS

BY Albert R. Hodges

ATTORNEY

INVENTOR.
JOHN J. LENTZ

BY Albert R. Hodges
ATTORNEY

June 23, 1970 J. J. LENTZ 3,517,391

DIGITAL COMPUTER

Filed Oct. 26, 1953 26 Sheets-Sheet 20

NUMBER GATE GENERATOR (PART 1)

INVENTOR.

JOHN J. LENTZ

BY Albert R. Hodges

ATTORNEY

NUMBER GATE GENERATOR (PART 2)

INVENTOR
JOHN J. LENTZ
BY Albert R. Hodges
ATTORNEY

NUMBER GATE GENERATOR (PART 3)

INVENTOR
JOHN J. LENTZ
BY
Albert R. Hodges
ATTORNEY

MISCELLANEOUS GATE GENERATOR (PART 1)

INVENTOR.
JOHN J. LENTZ
BY Albert R. Hodges
ATTORNEY

MISCELLANEOUS GATE GENERATOR (PART 2)

INVENTOR.
JOHN J. LENTZ

BY Albert R. Hodges
ATTORNEY

MISCELLANEOUS GATE GENERATOR (PART 3)

INVENTOR.
JOHN J. LENTZ

BY Albert R. Hodges
ATTORNEY

June 23, 1970 J. J. LENTZ 3,517,391

DIGITAL COMPUTER

Filed Oct. 26, 1953 26 Sheets-Sheet 26

INVENTOR.
JOHN J. LENTZ

BY Albert R. Hodges
ATTORNEY

United States Patent Office 3,517,391
Patented June 23, 1970

3,517,391
DIGITAL COMPUTER

John J. Lentz, Chappaqua, N.Y., assignor to International Business Machines Corporation, New York, N.Y., a corporation of New York Filed Oct. 26, 1953, Ser. No. 388,160
Int. Cl. G06f 3/00, 7/24
U.S. Cl. 340—172.5 93 Claims

ABSTRACT OF THE DISCLOSURE

A data processor including a rotating magnetic drum storage on which data is stored in four functional groups or registers A, B, C, D with data recorded in interleaved fashion $B_0A_0B_1A_1$ . . . $C_0D_0C_1D_1$ . . . All data in the groups is read from the drum on each revolution and re-recorded after being circulated through arithmetic and logic circuitry. The circulation of data has a nominal time delay for non-shifting of data which may be varied to perform a right and left shift. Entry of data from a keyboard and control of various operations is effected through use of marking bits which are recorded in the data registers. In keyboard entry the marking bit is recorded in the next available data position to control the processor to effect recording when keyboard data is entered. Data output from the processor is by means of printer or cathode ray tube.

This invention relates to digital computers, and more particularly to a magnetic drum computer for adding, subtracting, multiplying and dividing numbers in serial form in a novel manner.

A principle object of the present invention is the provision of a compact and relatively simple, and hence portable and relatively inexpensive, computer.

A further object is to provide an electronic computer adapted for serial addition, subtraction, multiplication and division and combinations thereof in a novel manner.

Another object is to provide a computer in which "tags" are recorded on the magnetic drum or other moving carrier to designate the addresses of entry and read-out positions.

A further object is to provide a computer in which "tags" recorded on the magnetic drum or other moving carrier are utilized to control the computer by counting operations or otherwise.

Another object is to provide a computer in which "tags" recorded on the magnetic drum or other moving carrier serve both to designate addresses of entry and read-out positions and to control the computer by counting operations or otherwise.

Still another object is to provide a magnetic drum computer in which both the factor data and the synchronizing pulses are stored in a single track.

Yet another object is to provide a magnetic drum computer in which the numbers in a first group of registers comprising portions of the drum periphery may be interchanged with the numbers in a second group of registers comprising other portions of the drum periphery.

Still another object is to provide a computer in which the numbers in a first group of registers, normally passed through a first circuit path, may be interchanged with the numbers in a second group of registers, normally passed through a second circuit path.

An additional object is to provide a computer utilizing a magnetic medium for storage in which the digits of the several registers are interpositioned on the magnetic medium in a novel configuration.

A further object is to provide a new improved pulse delay apparatus which is especially adapted for use in a digital computer in accordance with the present invention.

Another object is to provide an improved normally closed electronic switch which finds special utility in a digital computer in accordance with the present invention.

Another object is to provide a computer utilizing a magnetic drum for storage, in which the various pulses on the drum need have no prechosen or fixed positions.

A related object is the provision of a computer utilizing magnetic drum storage, in which the speed or rate of rotation of the drum governs the basic timing.

Yet another object is the provision of a computer employing a single track on a magnetic drum for storage, in which the same heads and associated reading and recording amplifiers are utilized for both the synchronizing and the signal pulses.

Another object is to provide a novel capacitor-type counter having greater stability than previously known counters of this type and being especially adapted for use in a digital computer in accordance with the present invention.

An additional object is the provision of a novel switching circuit for developing a plurality of synchronized gates of different durations, and which is especially adapted for use in a digital computer in accordance with the present invention.

A further object is the provision of an improved electronic comparer circuit especially adapted for use in a digital computer in accordance with the present invention.

Still another object is the provision of a relay oscillator and a relay chain finding special utility in a digital computer in accordance with the present invention.

An additional object is to provide an arrangement for insuring positive firing of a gaseous discharge device by a pulse of relatively short duration and small amplitude, this arrangement being especially adapted for use in a digital computer in accordance with the present invention.

Another object is the provision of a digital computer especially adapted for operation in combination with an electric typewriter to furnish printed output readings.

Other objects and features of the present invention will be pointed out in the following description and claims and illustrated in the accompanying drawings, which disclose, by way of example, the principle of the invention and the best mode, which has been contemplated, of applying that principle.

THE DRAWINGS

In the drawings, in which like reference numerals designate like components:

Figure 3A:
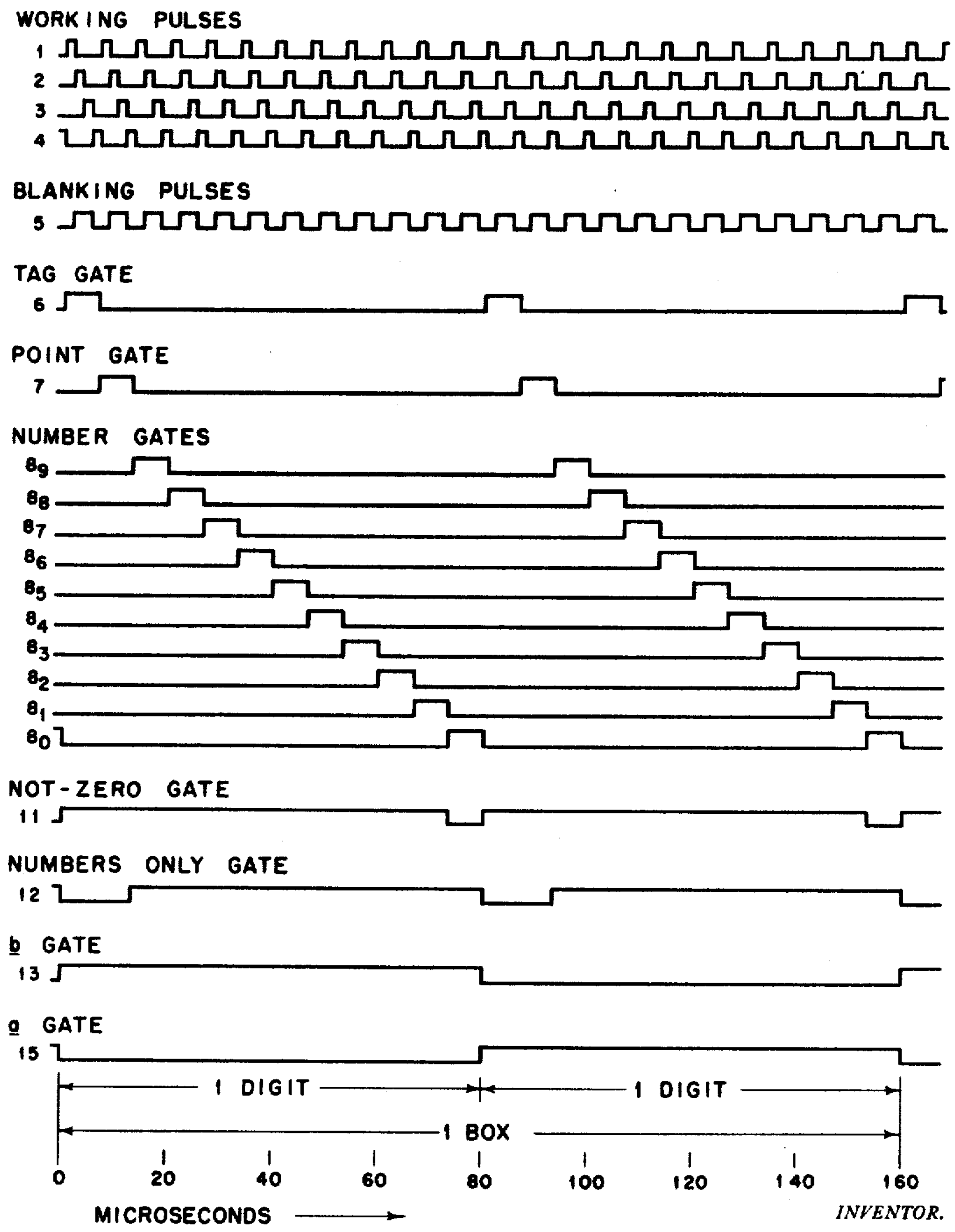
Figure 3B:
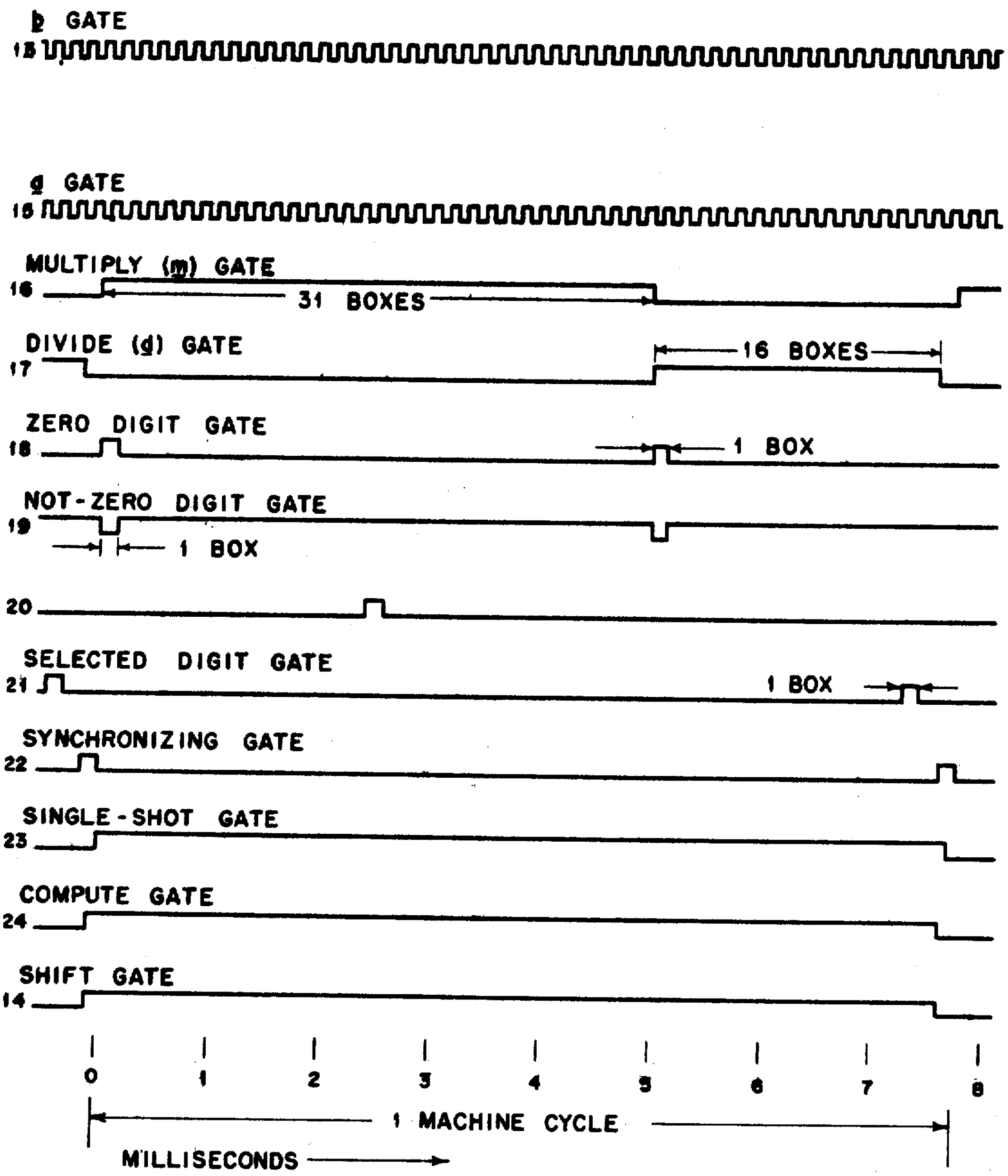
Figure 4:
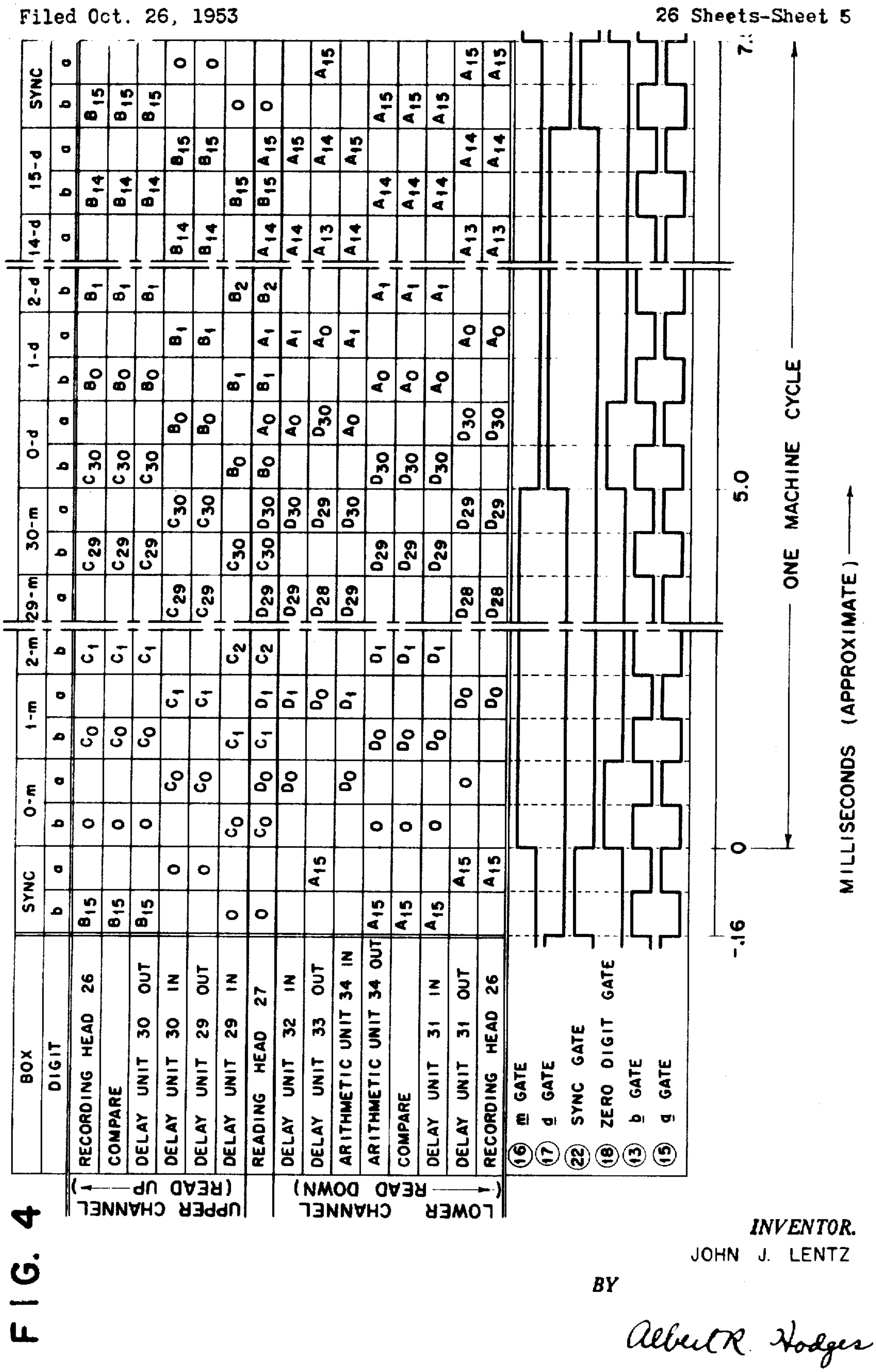
Figure 5:
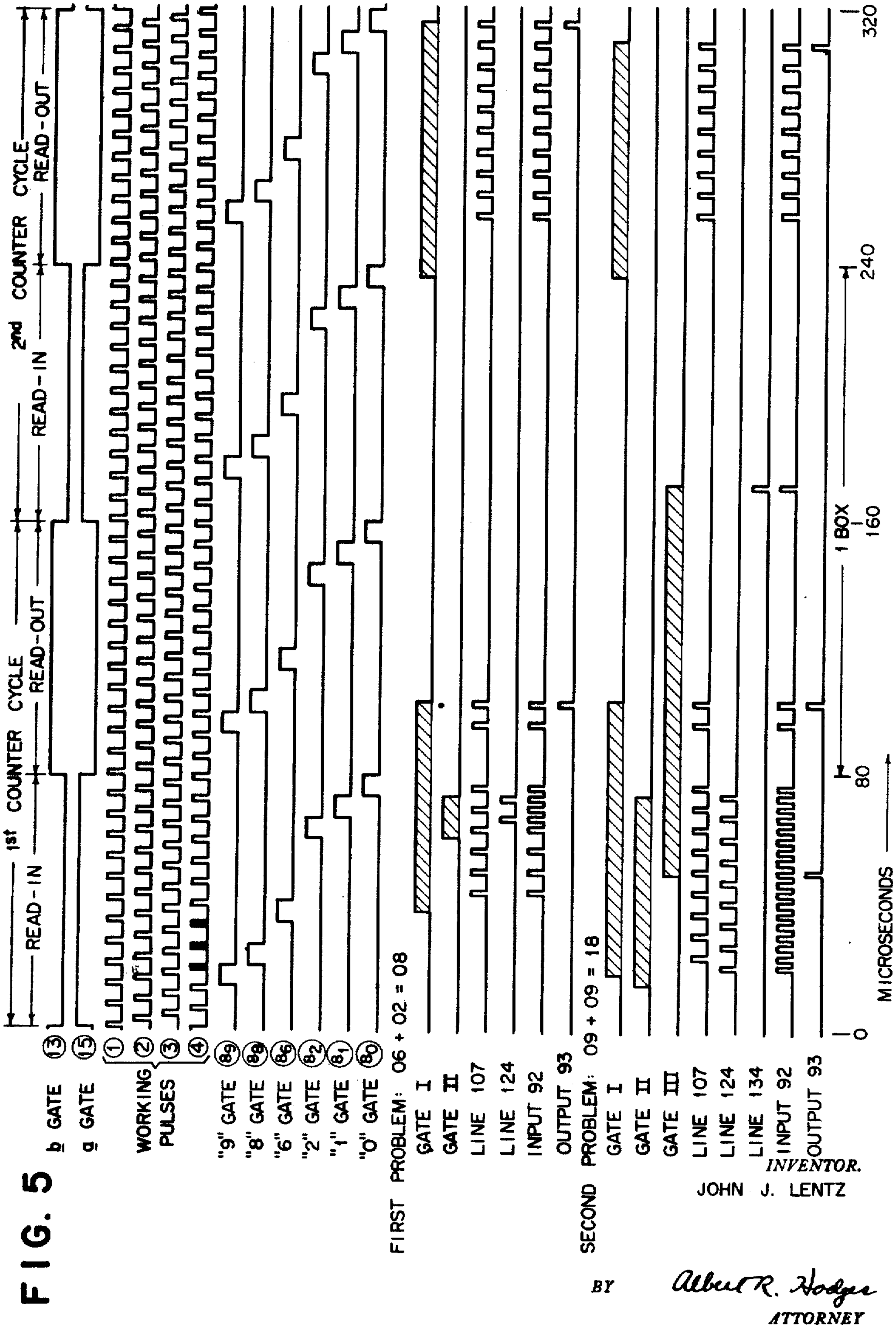
Figure 6:
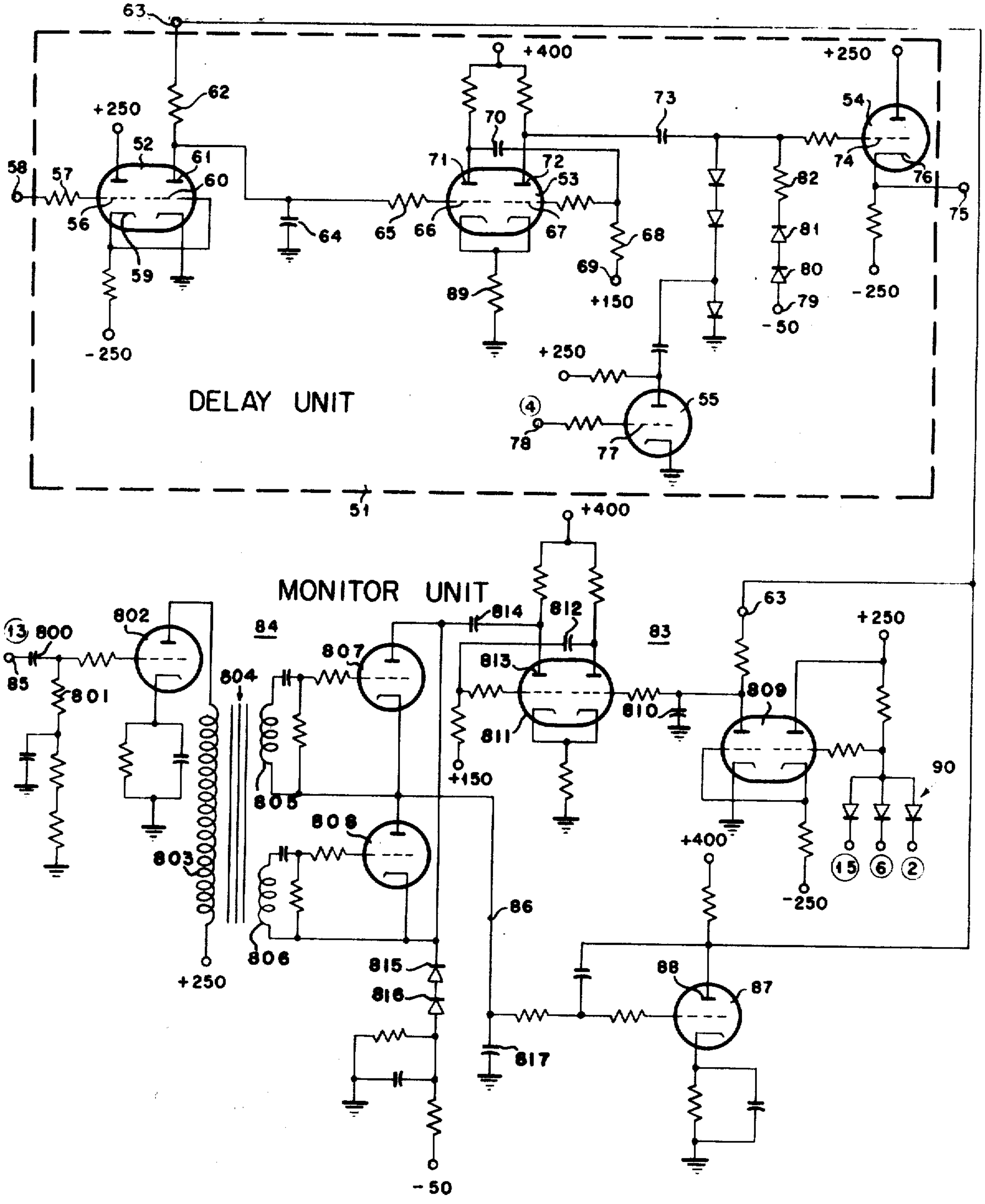
Figure 7:
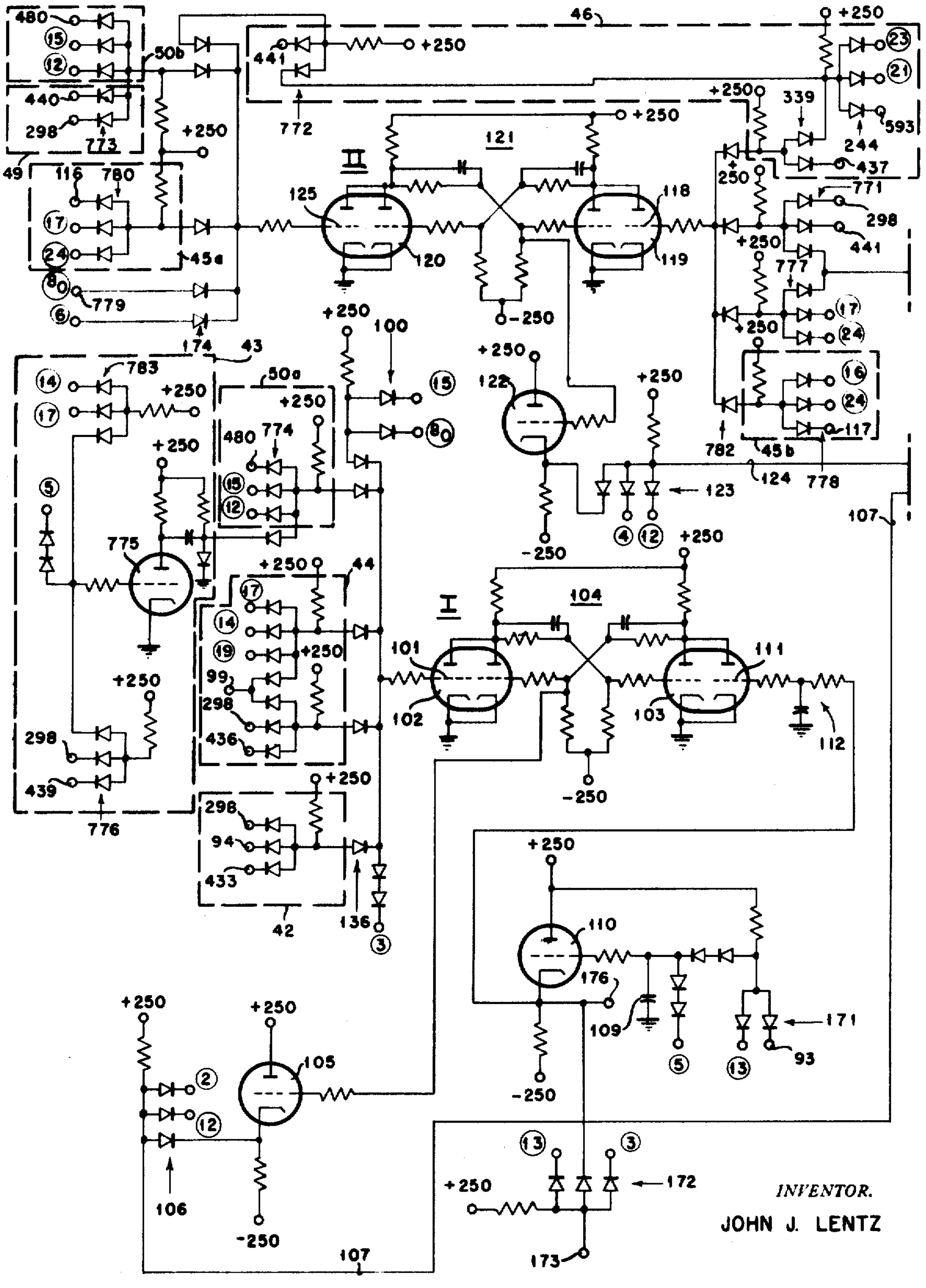
Figure 8:
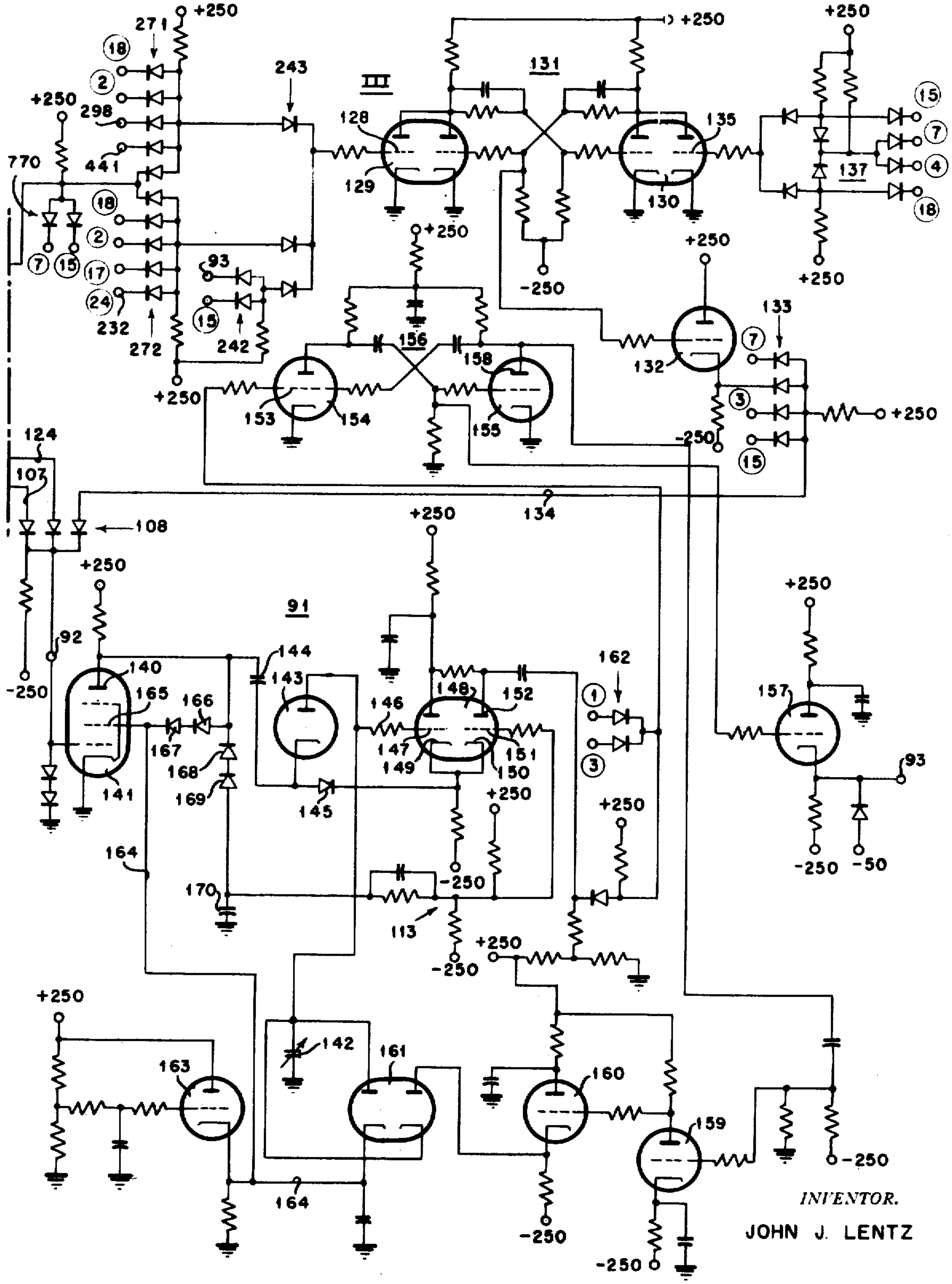
Figure 9:
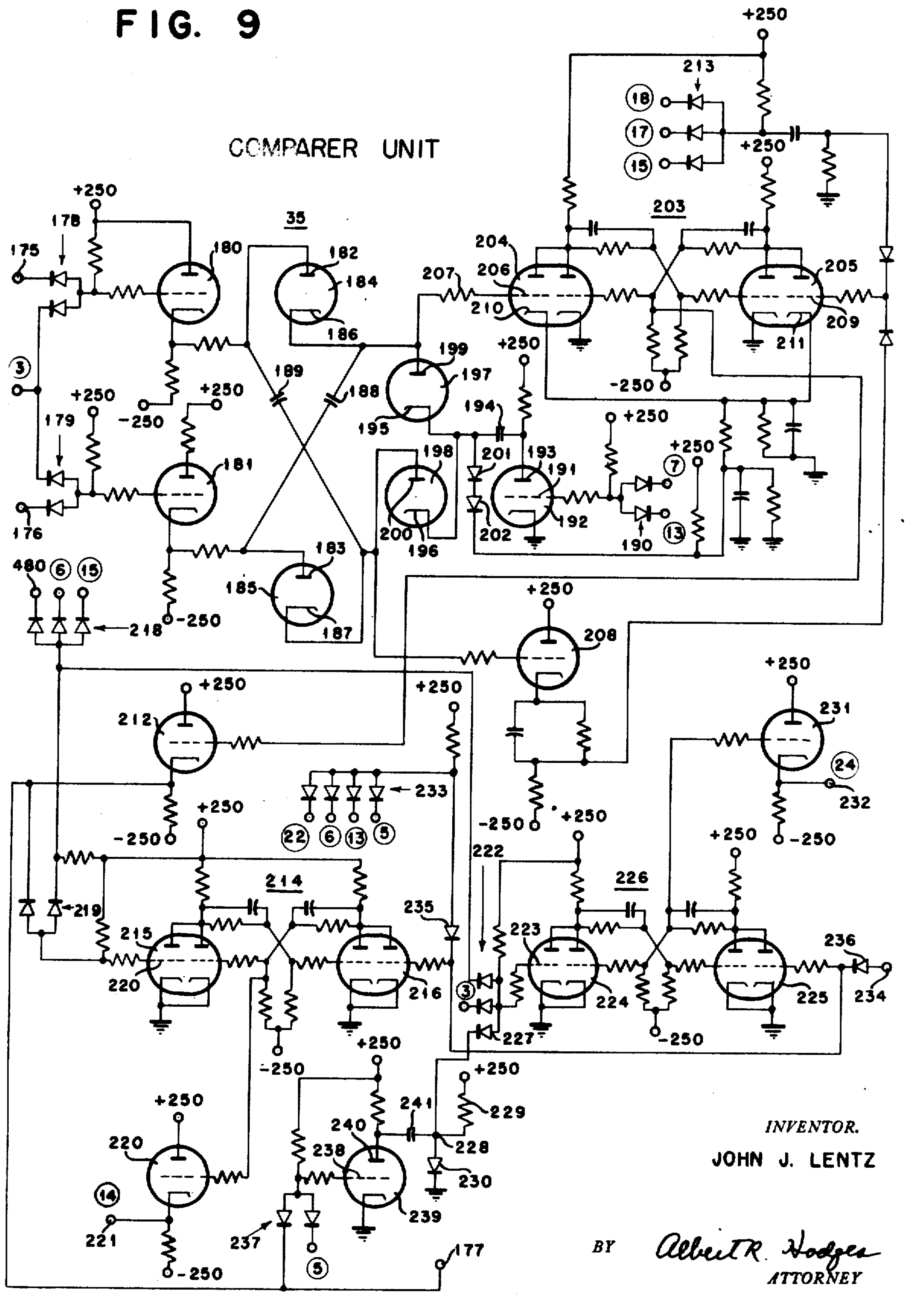
Figures 10, 11:
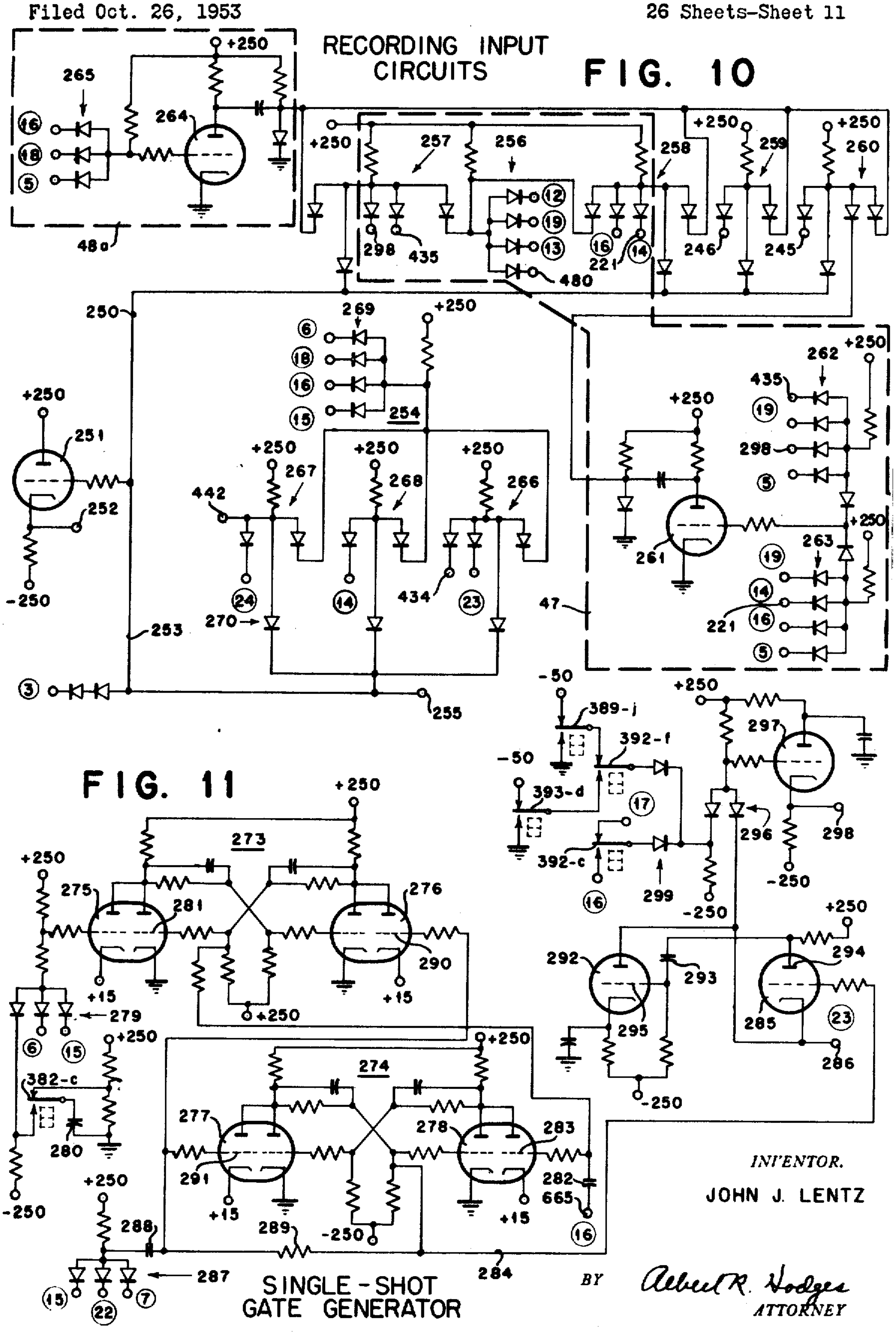
Figure 12:
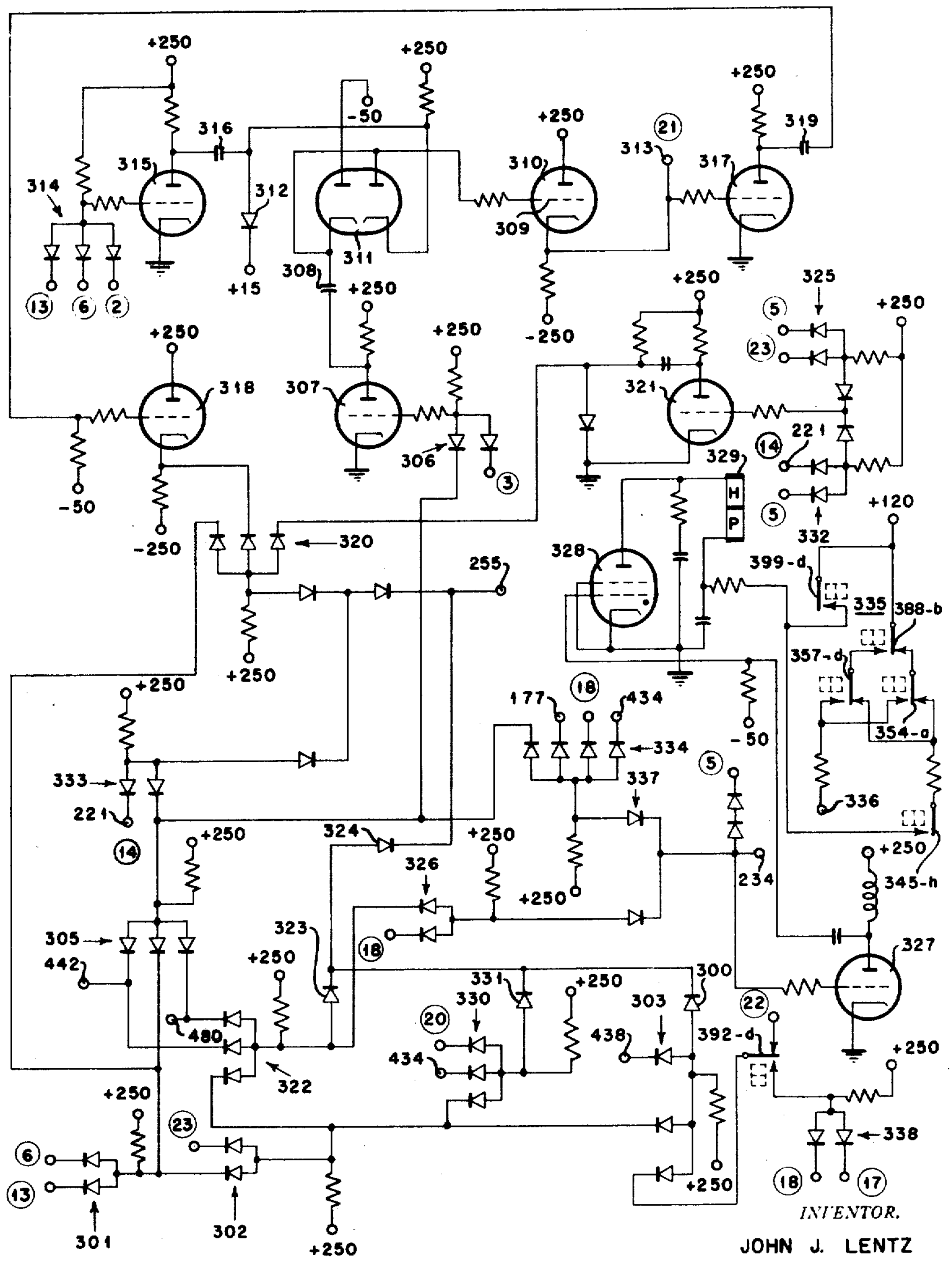
Figure 13:
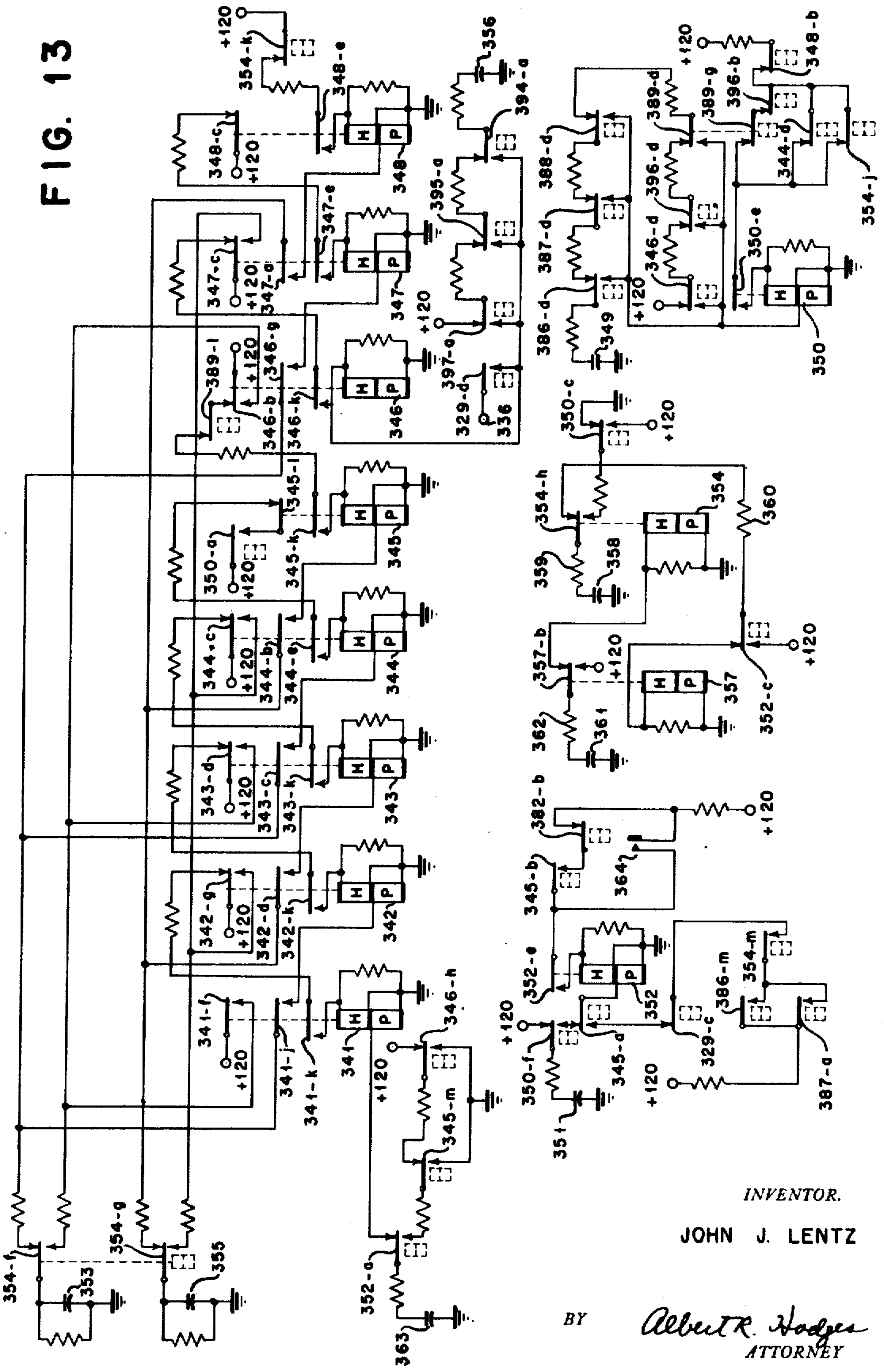
Figure 14:
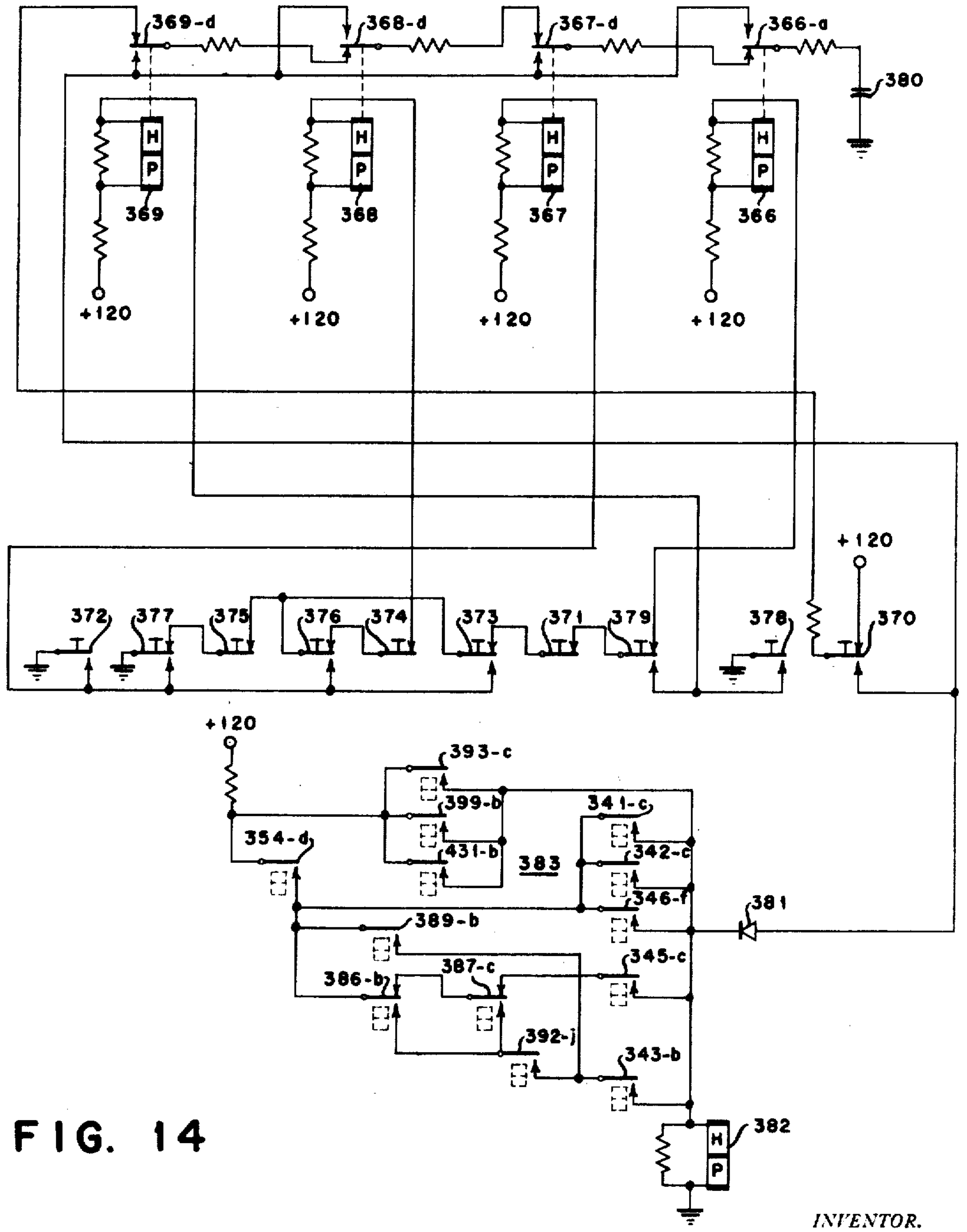
Figure 15:
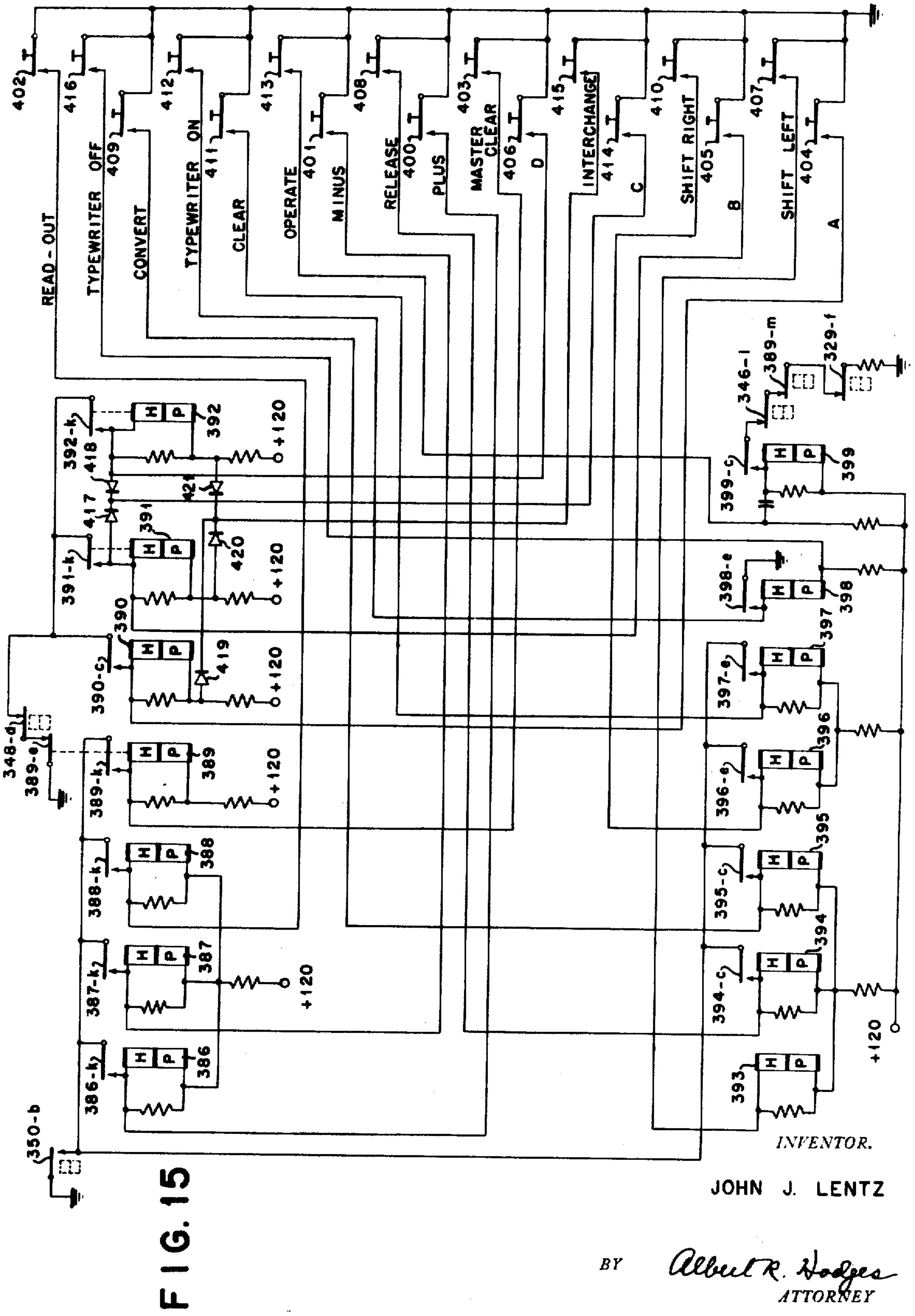
Figure 16:
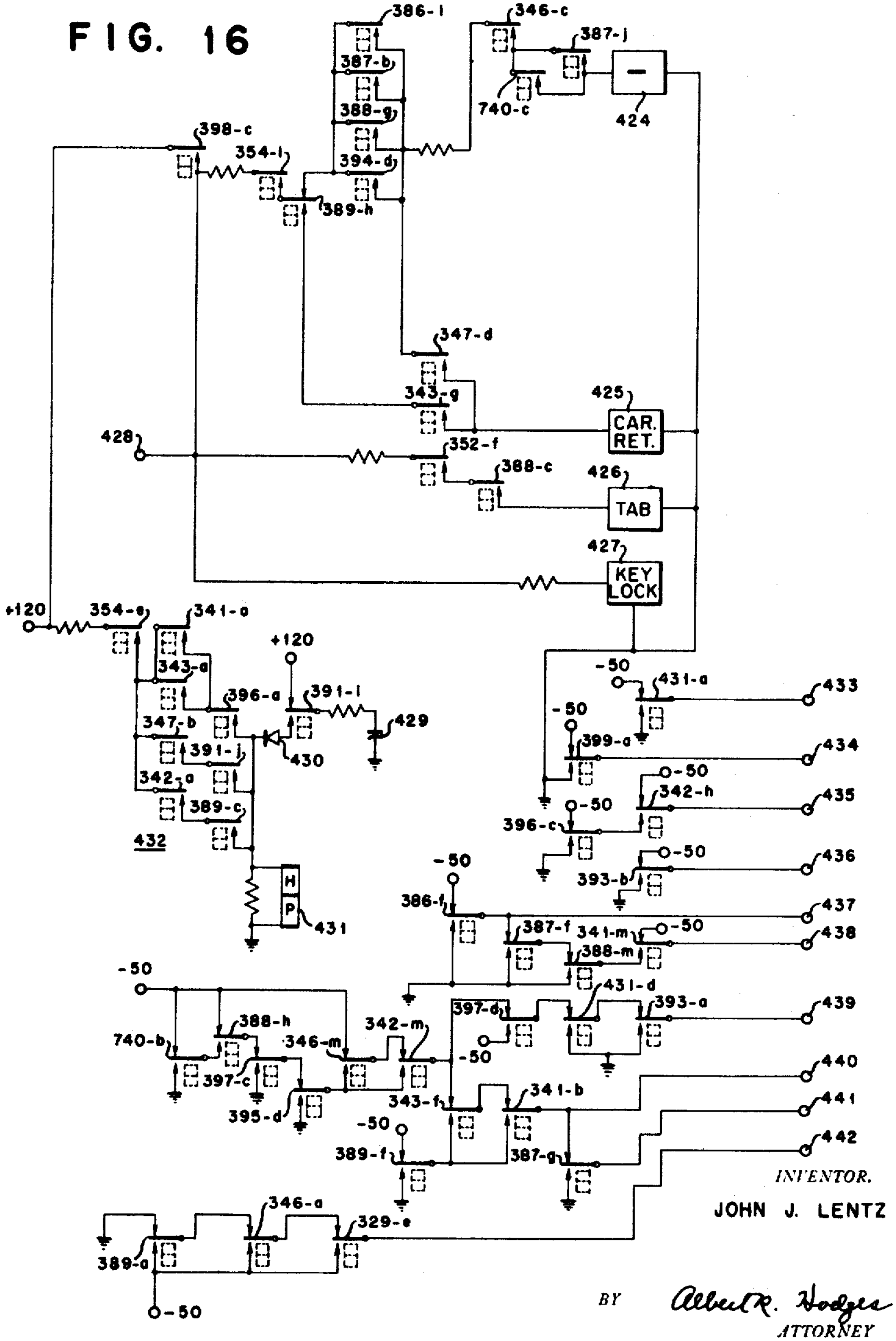
Figure 17:
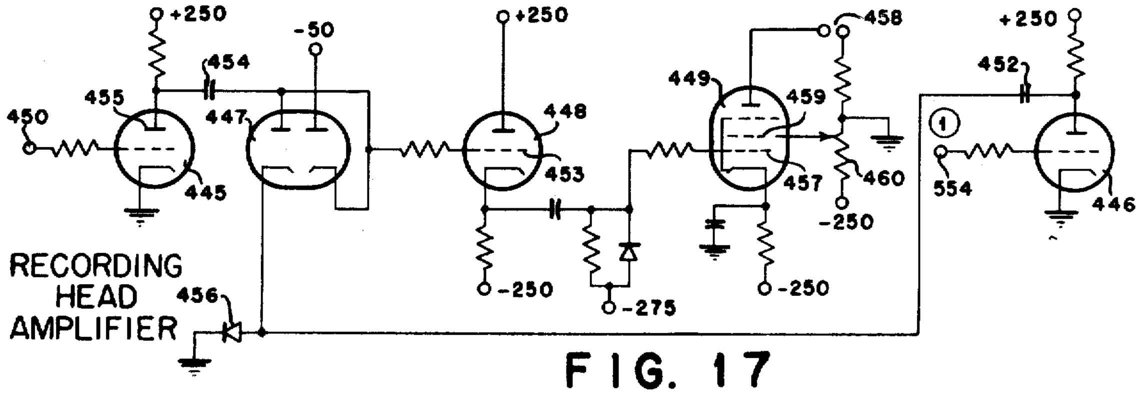
Figure 18:
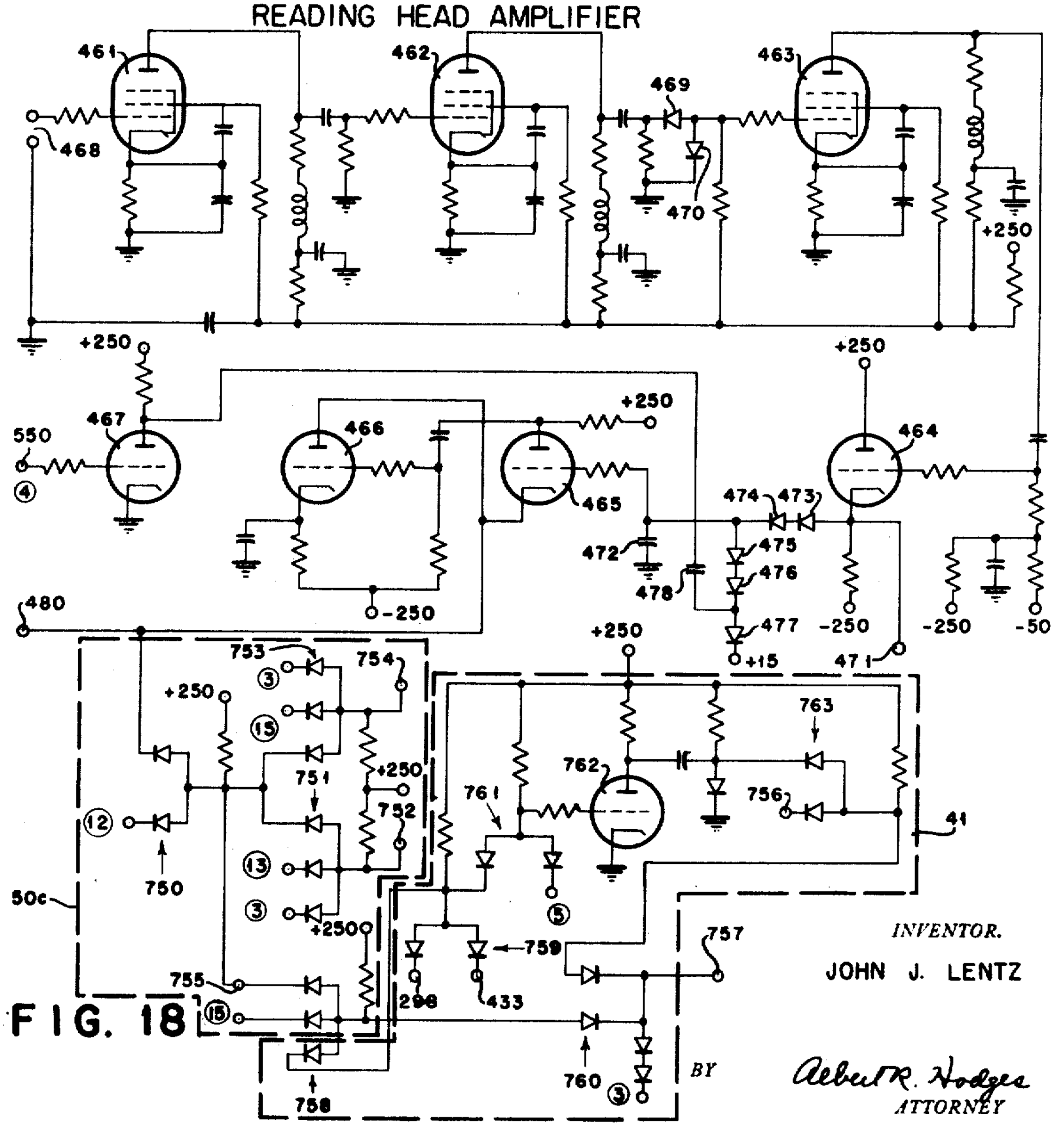
Figure 19:
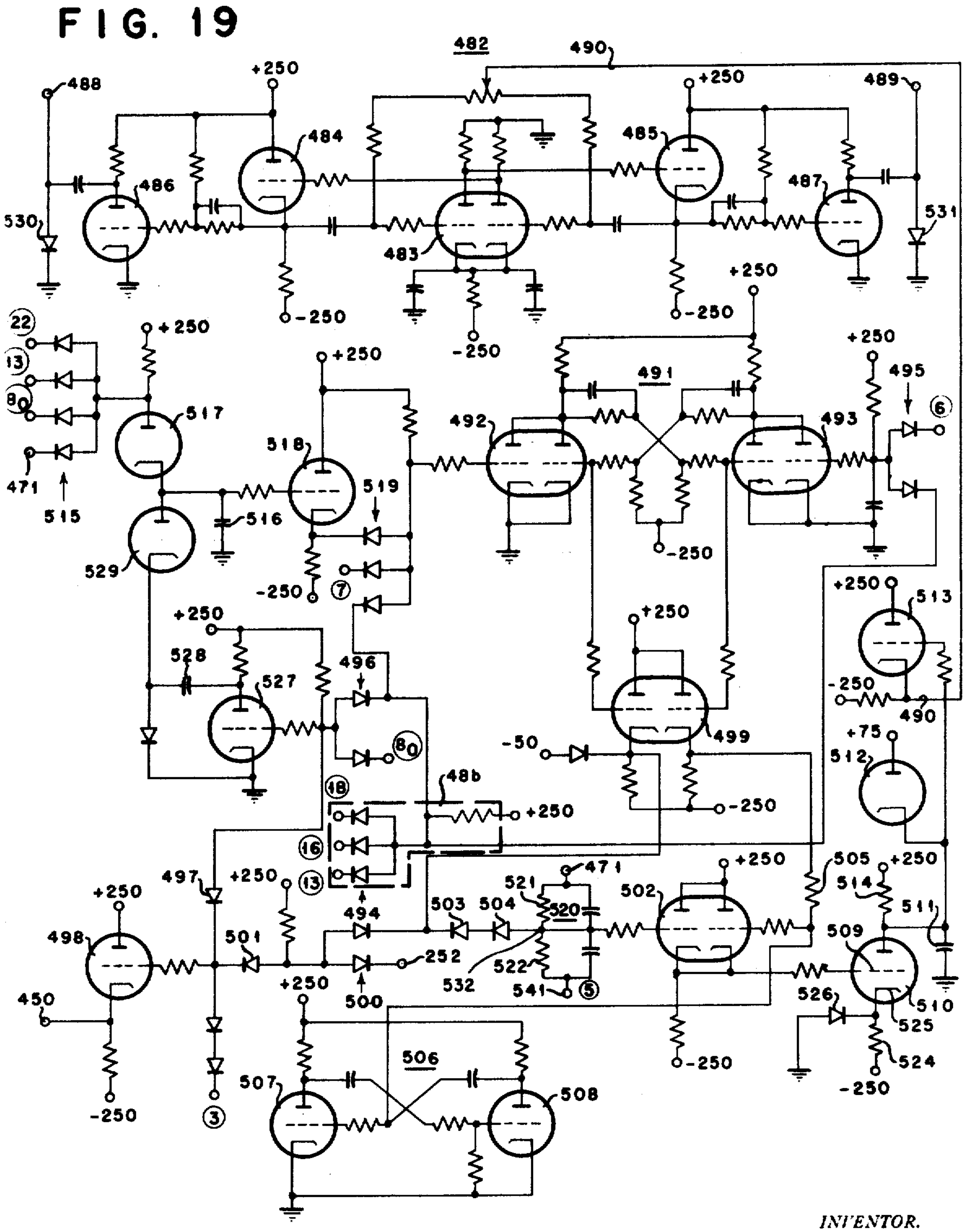
Figure 20:
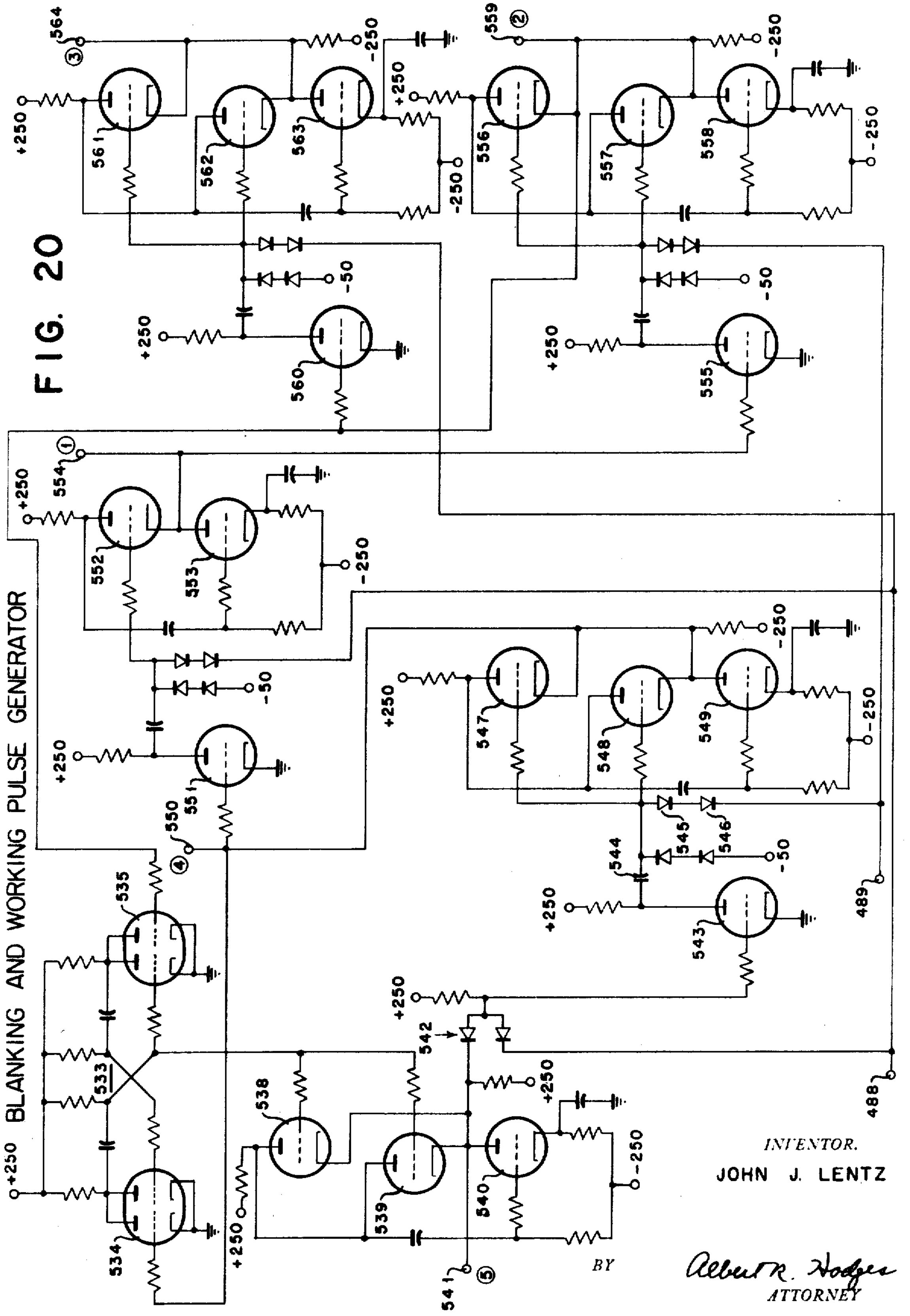
Figure 21:
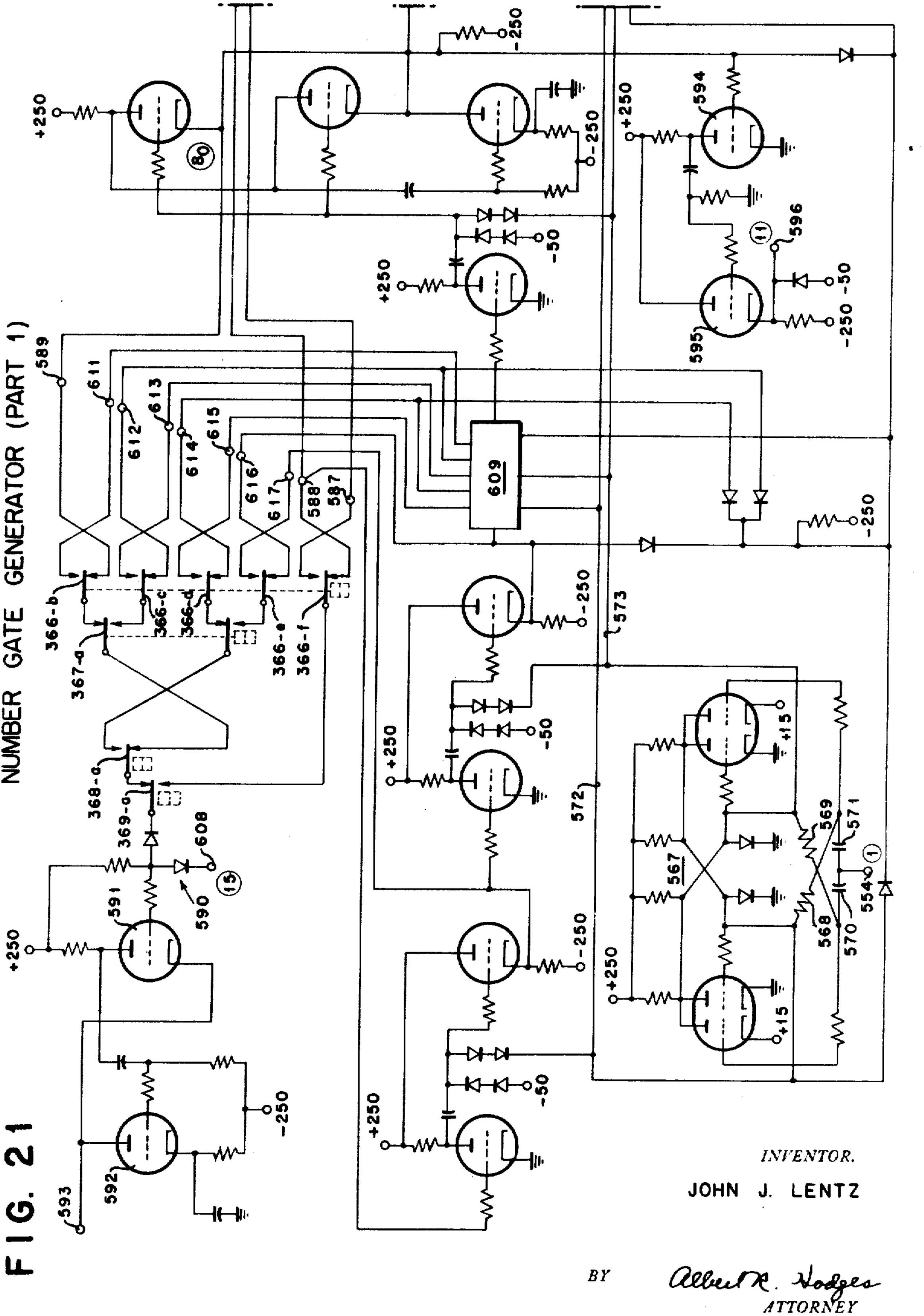
Figure 22:
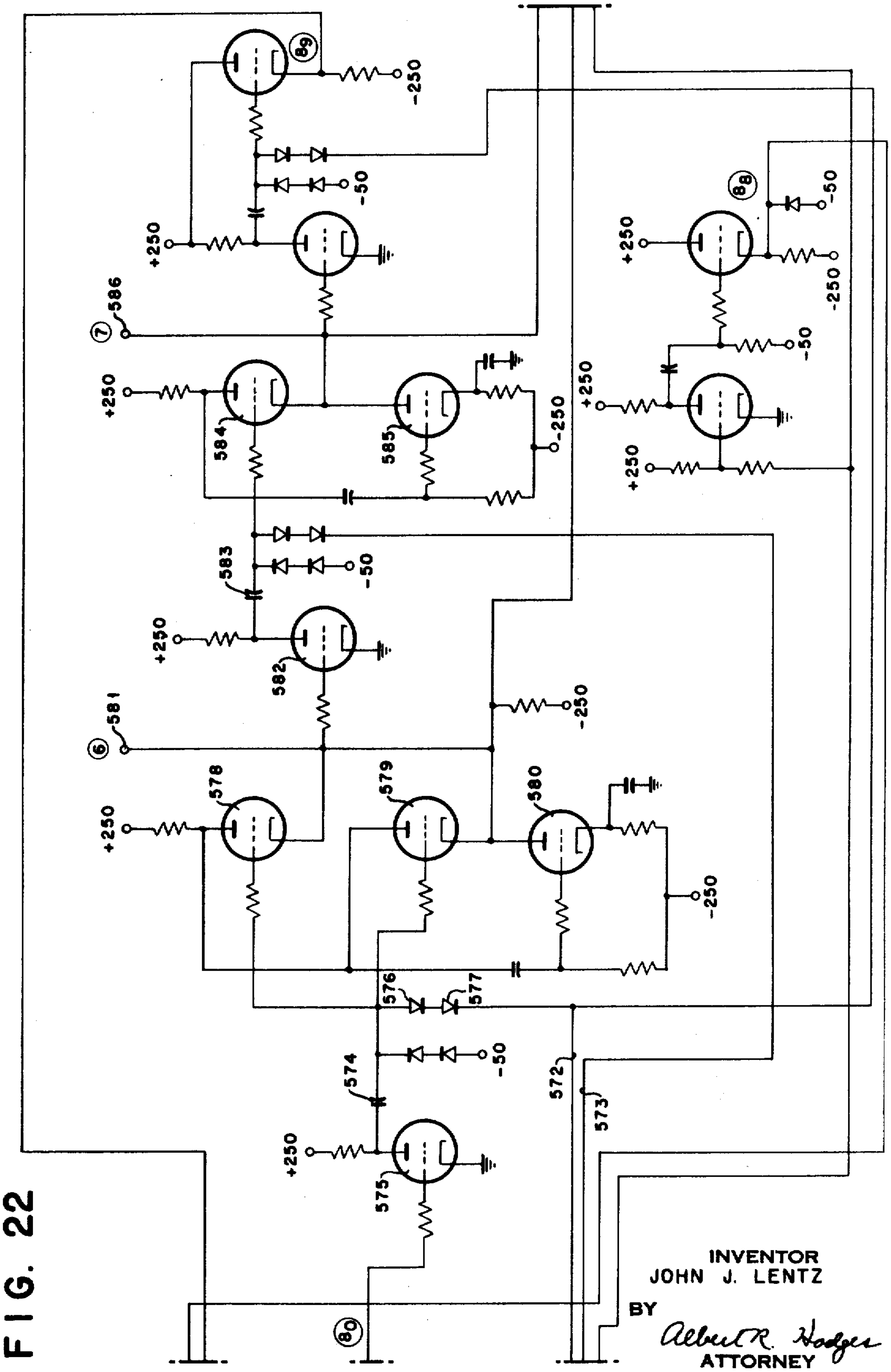
Figure 23:
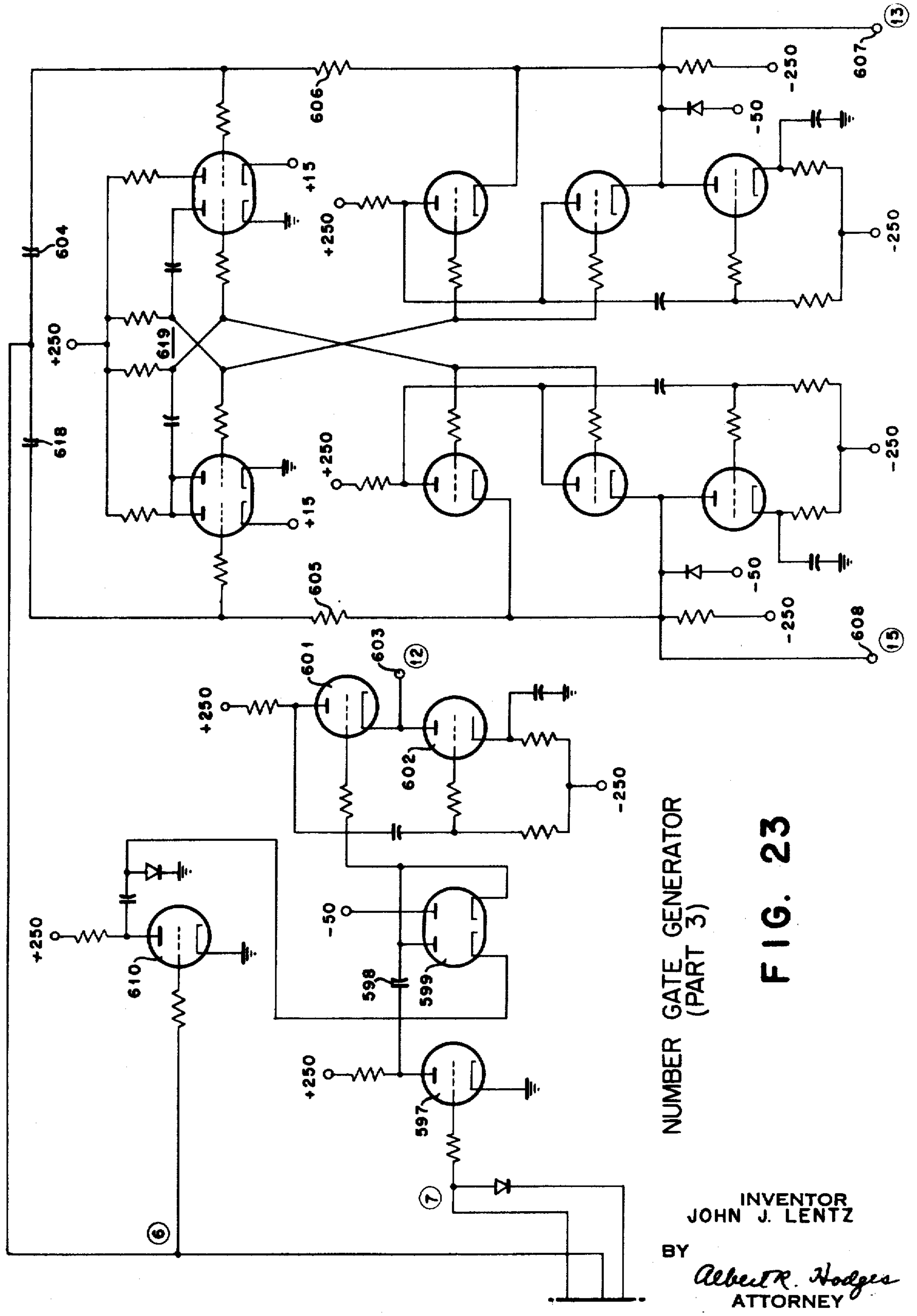
Figure 24:
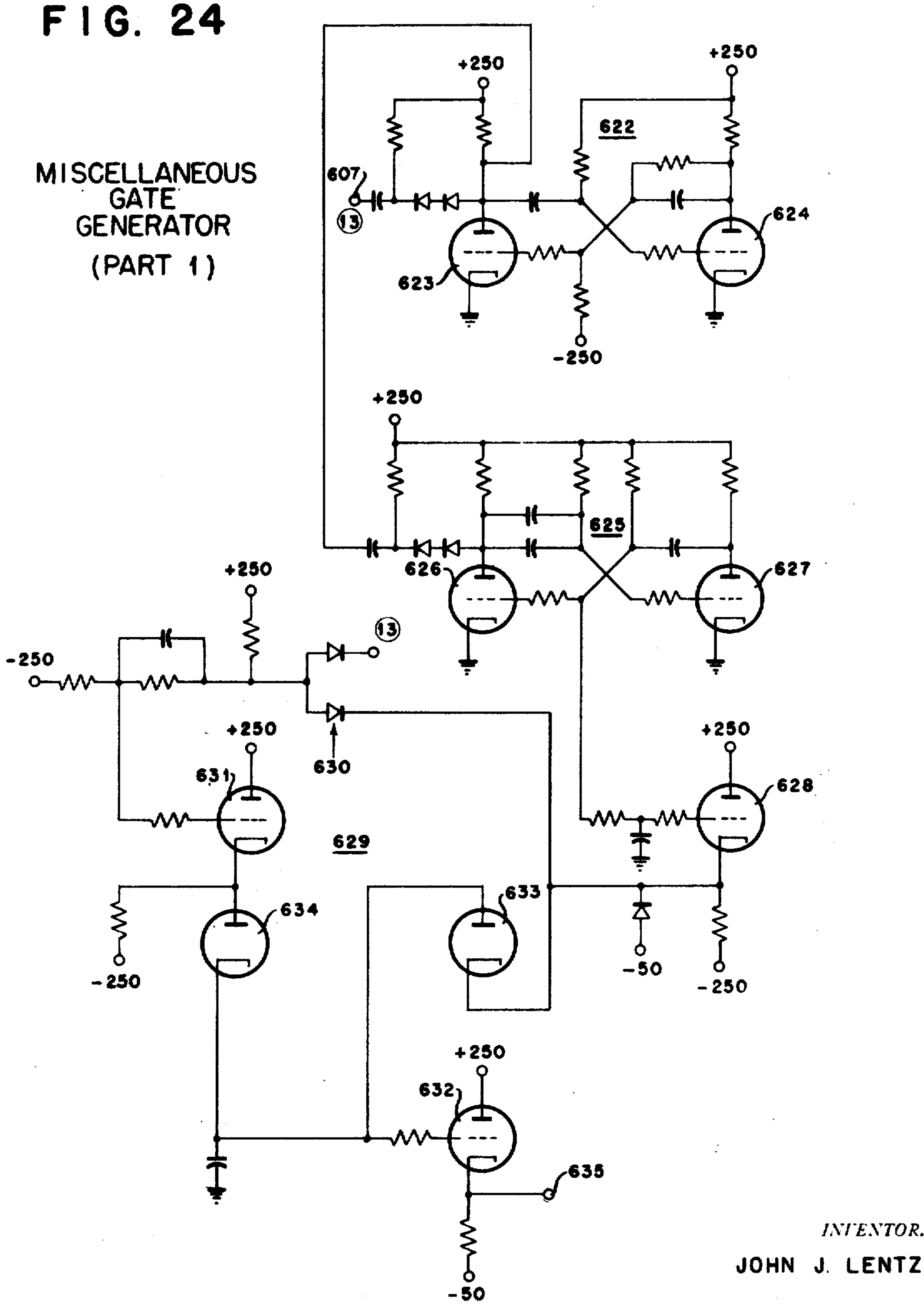
Figure 25:
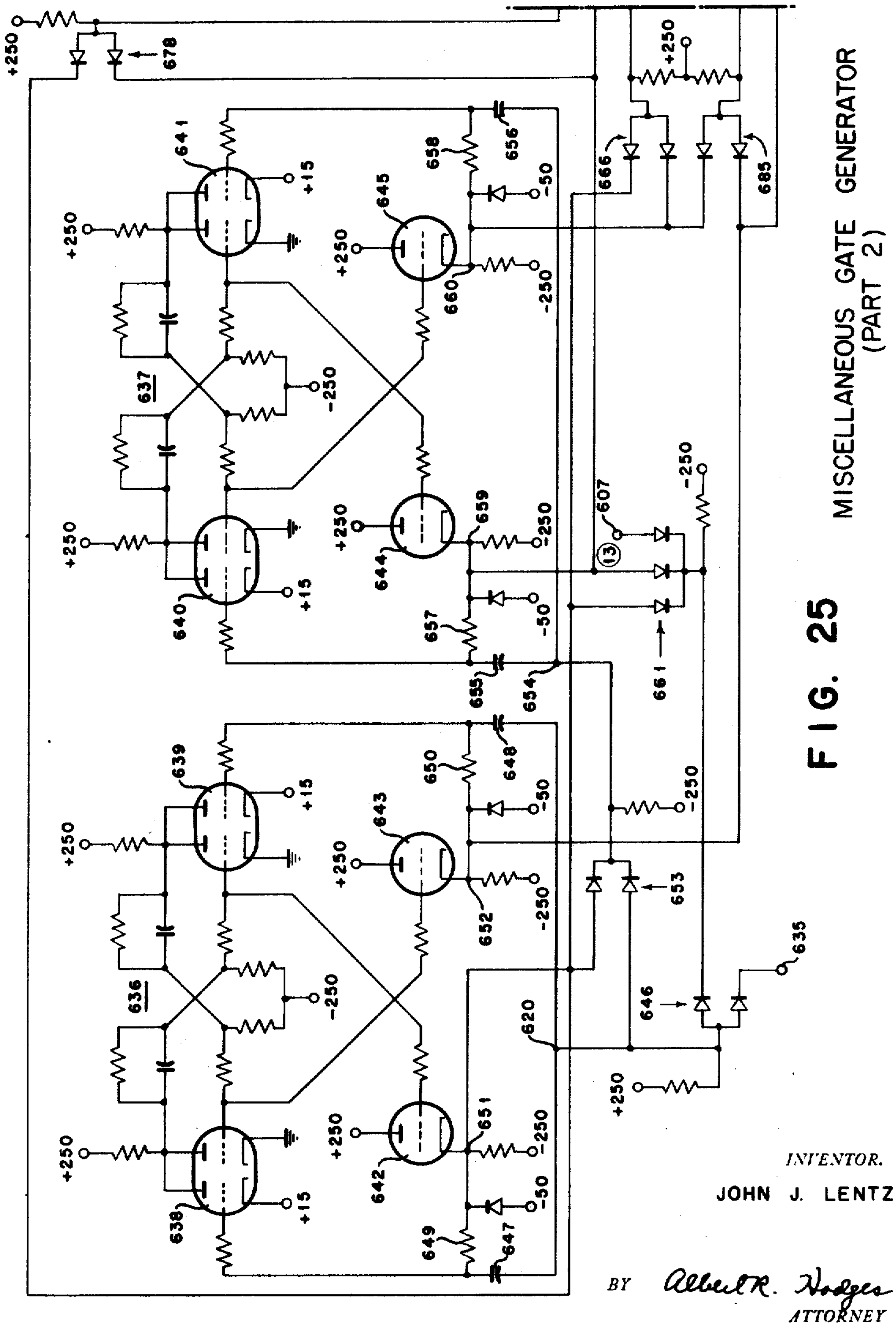
Figure 26:
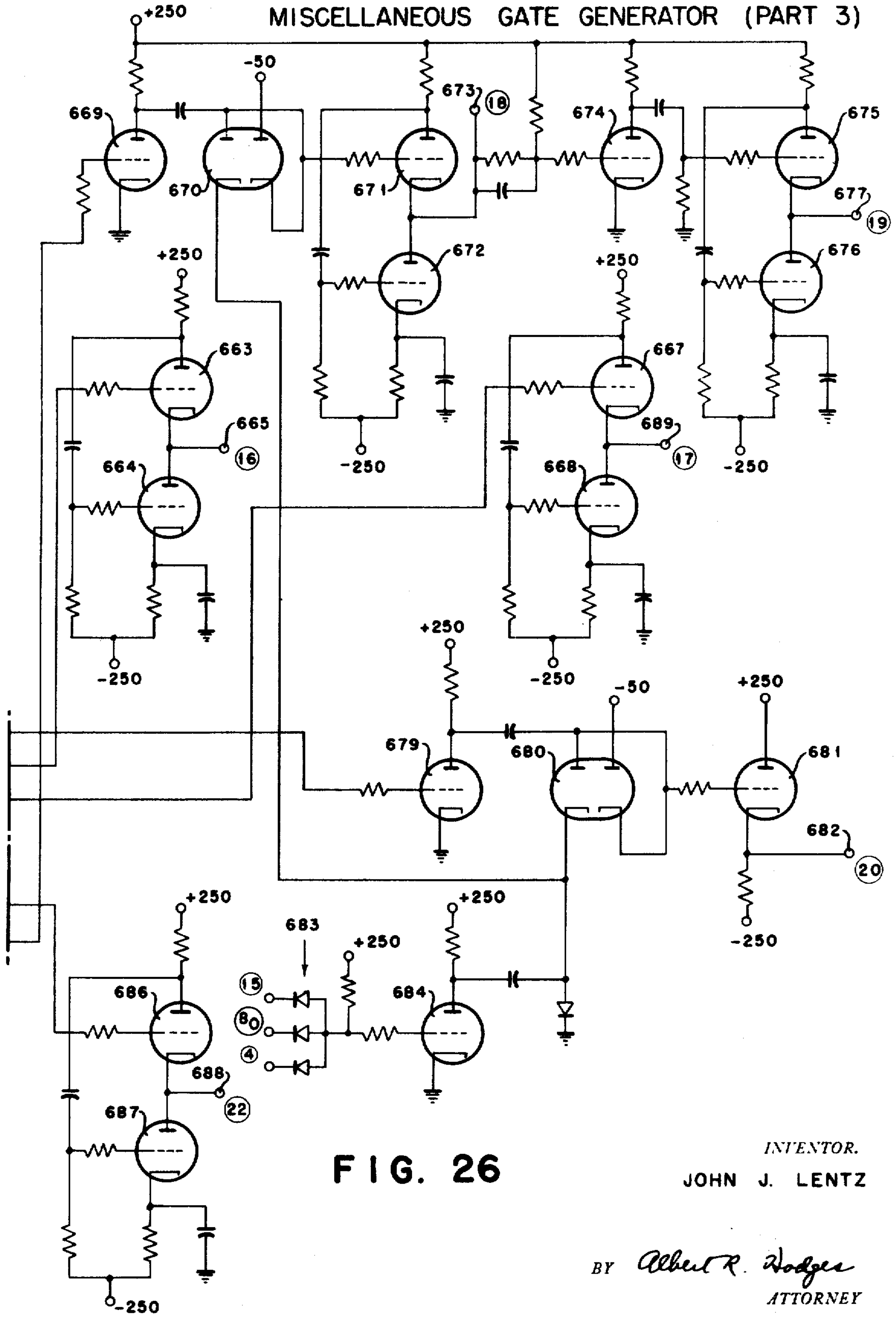
Figure 27:
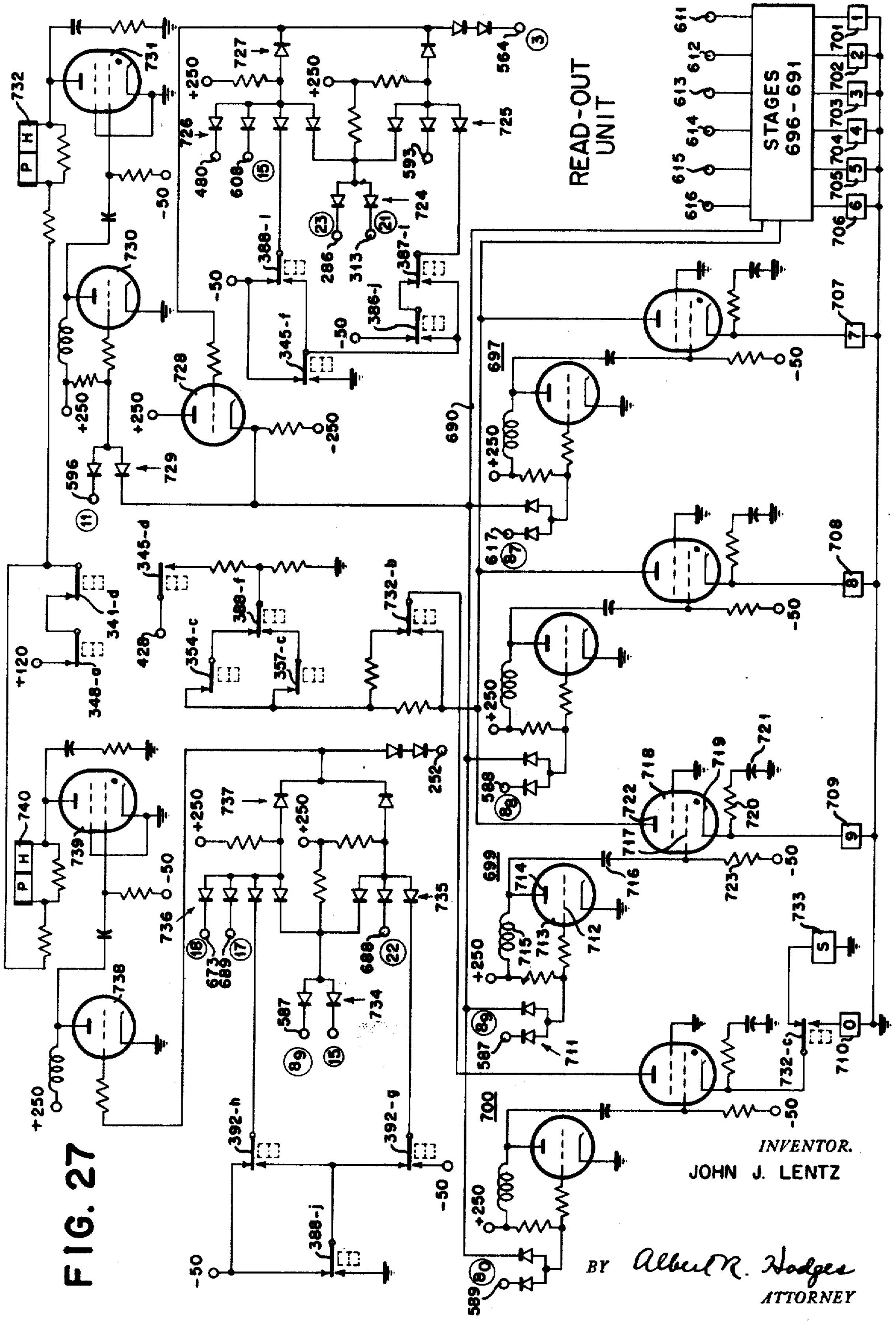

FIGS. 3*a* and 3*b* are graphical representations, to suitable time bases, of the approximate waveforms which exist in various portions of the computer circuits;

FIG. 4 is a chart illustrating the location of data during idling operation of the machine;

FIG. 5 is a chart illustrating graphically the timing of the operations of the arithmetic unit of FIGS. 7 and 8;

FIG. 6 is a typical circuit diagram of one of the several delay units and of the monitor unit;

FIGS. 7 and 8 taken together, with FIG. 7 to the left of FIG. 8, comprise the detailed circuit diagram of the arithmetic unit and associated switching circuits;

FIG. 9 is a detailed circuit diagram of the comparer unit and certain circuits associated therewith;

FIG. 10 is a detailed circuit diagram of the recording input circuits;

FIG. 11 is a detailed circuit diagram of the "single-shot" gate generator;

FIG. 12 is a detailed circuit diagram of the "second tag" electronic control circuits;

FIG. 13 illustrates the relay circuits comprising the sequencing circuits;

FIGS. 14–16 illustrate the relay control circuits;

FIG. 17 is a detailed circuit diagram of the recording head amplifier;

FIG. 18 is a detailed circuit diagram of the reading head amplifier;

FIG. 19 is a detailed circuit diagram of the base oscillator and the synchronizing circuits associated therewith;

FIG. 20 is a detailed circuit diagram of the blanking and working pulse generator;

FIG. 21–23, arranged respectively from left to right, comprise a schematic diagram, partly in block form, of the number gate generator;

FIGS. 24, 25 and 26, with the latter two arranged respectively from left to right, comprise detailed circuit diagrams of various miscellaneous gate generators; and FIG. 27 is a schematic circuit diagram, partly in block form, of the read-out unit.

The waveforms of FIGS. 3*a* and 3*b*

Throughout the drawings, the encircled reference numerals refer to the correspondingly labelled curves or wave shapes illustrated in FIGS. 3*a* and 3*b*. These curves show the approximate waveforms which are developed in a particular embodiment of a computer in accordance with the present invention and hence are illustrative only and are provided solely for the purpose of permitting a better understanding of the present invention. Changes in drum speed, head spacings and other variables will, of course, change the shapes of these curves. All curves are assumed to rise from approximately −50 volts to approximately ground potential. Thus, at any instant of time, a terminal carrying a given pulse train is either "up" (ground or 0 volts) or "down" (−50 volts). All the curves except curves 14, 21, 23 and 24 (all in FIG. 3*b*) are periodic. Where reference is made to these curves in the following description, therefore, these reservations are to be kept in mind. A brief discussion of each of the curves of FIGS. 3*a* and 3*b* follows.

The four fundamental pulse trains in the machine are referred to collectively as the "working pulses" and individually as the "first, second, third and fourth working pulses," designated respectively as curves 1, 2, 3 and 4. Each pulse train is up for approximately 1.7 microseconds and down for approximately 5.1 microseconds. The four pulse trains are interlaced and ordered in time in such a manner that no two are up simultaneously. The blanking gate (curve 5) comprises a series of pulses each of which rises at the beginning of a second working pulse and falls at the rise of the following fourth working pulse. The next twelve pulse trains comprise respectively the tag gate (curve 6), the point gate (curve 7), and ten number gates (curves $\mathbf{8}_9$–$\mathbf{8}_0$). Each of the twelve gates is up for approximately 6.8 microseconds and down for approximately 75 microseconds. Each gate rises with the rise of a first working pulse and falls with the rise of the next following first working pulse, so that after rising each gate stays up for the duration of a first, second, third and fourth working pulse before falling. The twelve gates are interlaced and ordered in the same fashion as the working pulses. The last ten of these gates are referred to collectively as the "number gates."

The not-zero gate (curve 11) is the inverse of the zero gate (curve $\mathbf{8}_0$). It is down while the zero gate is up, but it is up at all other times. Thus it is up while the tag gate (curve 6) or the point gate (curve 7) or any of the other nine number gates is up. The numbers only gate (curve 12) rises with the rise of a nine gate (curve $\mathbf{8}_9$) and falls with the rise of the following tag gate (curve 6). Thus the numbers only gate is up while all ten number gates are up, but is down when the tag and point gates are up.

Curves 13 and 15 respectively comprise the *b* gate and the *a* gate. These are 50% duty cycle gates. Each is up for approximately 80 microseconds and down for the same length of time. The *b* gate rises with the rise of a tag gate (curve 6), and falls with the rise of the next tag gate, at which time the *a* gate rises. After rising, each gate stays up for the duration of a tag gate, a point gate and all ten number gates before falling. The 80-microsecond interval of time beginning with the rise of an *a* gate or a *b* gate and ending with the fall of the same gate may be designated a "digit interval." The 160-microsecond interval of time beginning with the rise of a *b* gate and ending with the rise of the next *b* gate is designated a "box." As shown clearly in FIG. 3*a*, the *b* gate is up during the first digit of a box, and the *a* gate is up during the second digit of a box. Incidentally, curves 13 and 15 appear in both of FIGS. 3*a* and 3*b* for convenience in making the transition from the microsecond scale of the former to the millisecond scale of the latter.

Curve 16 comprises the multiply or *m* gate, and curve 17 comprises the divide or *d* gate. The *m* gate rises with the rise of a *b* gate (curve 13) and remains up for thirty-one boxes. It then falls, again with the rise of a *b* gate. Thus an *m* gate comprises thirty-one *b* gates and thirty-one *a* gates. The *d* gate rises with the fall of an *m* gate, and remains up for sixteen boxes before falling. The synchronizing gate (curve 22) rises when the *d* gate falls and has a duration of only one box. When the synchronizing gate falls, the *m* gate rises. A "machine cycle" or "major cycle" is an interval of time, approximately 7.5 milliseconds in length, which begins with the rise of an *m* gate and ends with the rise of the next following *m* gate.

The zero digit gate (curve 18) is up during the first box of the *m* gate and during the first box of the *d* gate, but is down at all other times. The not-zero digit gate (curve 19) is the inverse of the zero digit gate (curve 18), and hence is up when the latter is down and down when the latter is up. Curve 20 comprises a gate which is up during the sixteenth box of the *m* gate and is down at all other times.

The non-periodic gates comprise the selected digit gate (curve 21), the single-shot gate (curve 23), the shift gate (curve 14), and the compute gate (curve 24). No more than one selected digit gate is developed during any machine cycle, and it rises when the *b* gate (curve 13) and the tag gate (curve 6) are both up. It remains up for about 160 microseconds. The single-shot gate rises with the rise of an *m* gate, and falls at the beginning of the second digit interval of the next following synchronizing gate (curve 22). It rises only during certain computer operations. The shift and compute gates rise near the beginning of the second half of a synchronizing gate (curve 22) and fall at the beginning of the next synchronizing gate. These two gates are never up simultaneously, and they rise only during the performance of a computation.

It will be observed that there are forty-eight boxes of time in a single machine cycle, thirty-one of these boxes occurring during *m* time, that is, while the *m* gate (curve 16) is up, sixteen during *d* time, and one during synchronizing time. These boxes are conveniently designated individually in the following manner. The first box in *m* time will be called 0–*m*. This 160-microsecond interval of time occurs when the *m* gate and the zero digit gate (curve 18) are both up. Thus the expression 0–*m* refers to a particular 160-microsecond interval in every machine cycle. More specifically, it refers to a periodically recurring interval of time with a length of 160 microseconds, occurring once every machine cycle (approximately 7.5 milliseconds), whose time position is fixed with respect to the start of a machine cycle, that is, with respect to the rise of the *m* gate. The other boxes have similar designations, running from 1–*m* through 30–*m*, and then from 0–*d* through 15–*d*; and the last box, which occurs when neither the *m* gate nor the *d* gate is up, is designated the synchronizing box. The latter box corresponds to the time when the synchronizing gate (curve 22) is up. Within each digit interval, which comprises one-half of a box interval, the gates of curves 6, 7 and $8_9$–$8_0$ form twelve "cells," each of which is readily identified by specifying under which of these twelve gates it lies. Each cell is similarly divided into four parts by the working pulses (curves 1–4). Accordingly it is possible to uniquely designate any one of the 4608 intervals, each 1.7 microseconds long, which together comprise a single machine cycle.

The following table shows the source, by figure and terminal number, of each of the curves of FIGS. 3*a* and 3*b*:

| | Figure | Terminal | Description |
|---|---|---|---|
| Curve: | | | |
| 1 | 20 | 554 | Working pulses. |
| 2 | 20 | 559 | |
| 3 | 20 | 564 | |
| 4 | 20 | 550 | |
| 5 | 20 | 541 | Blanking pulses. |
| 6 | 22 | 581 | Tag gate. |
| 7 | 22 | 586 | Point gate. |
| $8_9$ | 22 | 587 | Nine gate.[1] |
| $8_8$ | 22 | 588 | Eight gate.[1] |
| $8_7$ | 21 | 617 | Seven gate.[1] |
| $8_6$ | 21 | 616 | Six gate.[1] |
| $8_5$ | 21 | 615 | Five gate.[1] |
| $8_4$ | 21 | 614 | Four gate.[1] |
| $8_3$ | 21 | 613 | Three gate.[1] |
| $8_2$ | 21 | 612 | Two gate.[1] |
| $8_1$ | 21 | 611 | One gate.[1] |
| $8_0$ | 21 | 589 | Zero gate.[1] |
| 11 | 21 | 596 | Not-zero gate. |
| 12 | 23 | 603 | Numbers only gate. |
| 13 | 23 | 607 | *b* gate. |
| 14 | 9 | 221 | Shift gate. |
| 15 | 23 | 608 | *a* gate. |
| 16 | 26 | 665 | Multiply *m* gate. |
| 17 | 26 | 689 | Divide *d* gate. |
| 18 | 26 | 673 | Zero digit gate. |
| 19 | 26 | 677 | Not-zero digit gate. |
| 20 | 26 | 682 | |
| 21 | 12 | 313 | Selected digit gate. |
| 22 | 26 | 688 | Synchronzing gate. |
| 23 | 11 | 286 | Single-shot gate. |
| 24 | 9 | 232 | Compute gate. |

BRIEF GENERAL DESCRIPTION

The invention will be more readily understood by the following brief description of a particular embodiment of it which has been built and successfully operated. This particular computer provides storage for 94 decimal digits on a single-channel magnetic drum. These decimal digits are grouped into four accumulating registers designated as the A, B, C and D registers. The A and B registers ($A_0$–$B_0$ through $A_{15}$–$B_{15}$ in FIG. 1) are each of sixteen-digit capacity; the C and D ($C_0$–$D_0$ through $C_{30}$–$D_{30}$ in FIG. 1), each of 31-digit capacity. Normally the sixteenth or highest order digit in each A and B register is used as an indication of algebraic sign, and the thirty-first order digits of the C and D registers are similarly employed. The remaining box has two-digit capacity and, as indicated below, the first half of the box or first digit is utilized for synchronizing information.

The digits are read sequentially from the drum, each digit being read during its own specified interval of time as defined by the pulse trains of FIGS. 3*a* and 3*b* in the manner outlined above. For example, the lowest-order digit of the C register, $C_0$, is read during 0-*m*, *b* time. It will be recalled, as shown in FIG. 3*a*, that *b* time comprises the first digit of a box and, as is seen from FIG. 1, $C_0$ occurs as the first digit of box $C_0$–$D_0$. If this digit is a six, it is read during 0–*m*, *b*, $8_6$ time. Each register is scanned once in every machine cycle, so that the A register is read during the sixteen time intervals designated by the expression *d*, *a*; the B register in the sixteen intervals designated *d*, *b*; the C register in the 31 intervals designated *m*, *b*; and the D register in the 31 intervals designated *m*, *a*. The synchronizing information is read in the time interval designated sync, *b* or, in other words, the synchronizing information is read during the first half of the synchronizing box. The magnetized spots recorded on the drum are converted to electrical pulses by reading head 27, the value of any particular stored digit being determined by the time position within a half box (see enlarged projection of FIG. 1) of the corresponding signal pulse which occurs within the digit intervals to which that digit is assigned.

The basic computing operation is $$\frac{A}{B}\times C+D$$

As will be clear from the description below, this comprises entering the C value into the D register as many times as the B value can be divided into the A value, the method of division comprising "over and over" subtraction and the answer appearing in the D register.

The drum is used as a "revolver." Similar revolvers are disclosed in U.S. Pat. No. 2,718,356, issued Sept. 20, 1955 to W. P. Burrell et al. Information, magnetically written in subdivisions of the drum periphery previously designated as "boxes," is read by the reading head, amplified and shaped, and is passed through short-term electronic circuit delay units used for temporary storage and through electronic computing circuits, and is then re-recorded one box time after it was read. The information may be transmitted unchanged through this electronic portion of the machine, as is the case when the machine is idling, or it may be modified during its transit, as in execution of any of the various machine functions described below.

The computer functions

The functions of which the computer is capable include the following:

Entry: Multi-digit numbers may be entered from an outside source into any desired register on the drum, and may be selectively added to or subtracted from the number, if any, already standing in any register on the drum. If the result is negative, the answer appears in the register as the tens complement.

Conversion: The number in a register may be replaced by subtracting that number from zero and placing the result in the register. Thus a negative number in tens-complement form may be replaced by its absolute value and, conversely, an absolute value may be changed to its tens complement.

Clear: Any register or all four may be cleared at will.

Read-out: A printed record of the contents of the various registers, as desired, is produced by a readout unit controlling an electric typewriter. If the number standing in a given register is negative, the read-out unit recognizes this and prints the absolute value followed by a minus sign.

Shift: The number in a register may be shifted, in effect, to the right or to the left as many places as may be desired, within the capacity of the machine. Since this is a serial machine, right shift comprises advancing the recording of the digits, while left shift comprises delaying the recording.

Interchange: The number in the A register may be interchanged with that in the B register, or likewise the number in the C register may be interchanged with that in the D register. This function has certain applications in computing and also makes possible savings in the components within the machine.

Multiplication and division: The machine includes sequencing units which on command cause the machine to perform the basic operation $$\frac{A}{B}\times C+D$$

the result appearing in the D register in an average operating time of approximately 500 milliseconds. This makes it possible to perform either multiplication or division at will without independent multiply or divide switching of the sequence networks. Multiplication is performed by "over and over" addition, that is, the factor $A/BB$ determines how many times the contents of the C register are added "over and over" to the contents of the D register.

The structural elements

In a preferred embodiment of the invention, information is stored on a single-track magnetic drum comprising a brass disc six inches in diameter and 0.25 inch thick provided with an active surface of nickel-cobalt alloy plated on the periphery. The drum is driven at approximately 6,000 revolutions per minute, thereby providing a peripheral speed of approximately 2000 inches per second.

Figure 1:
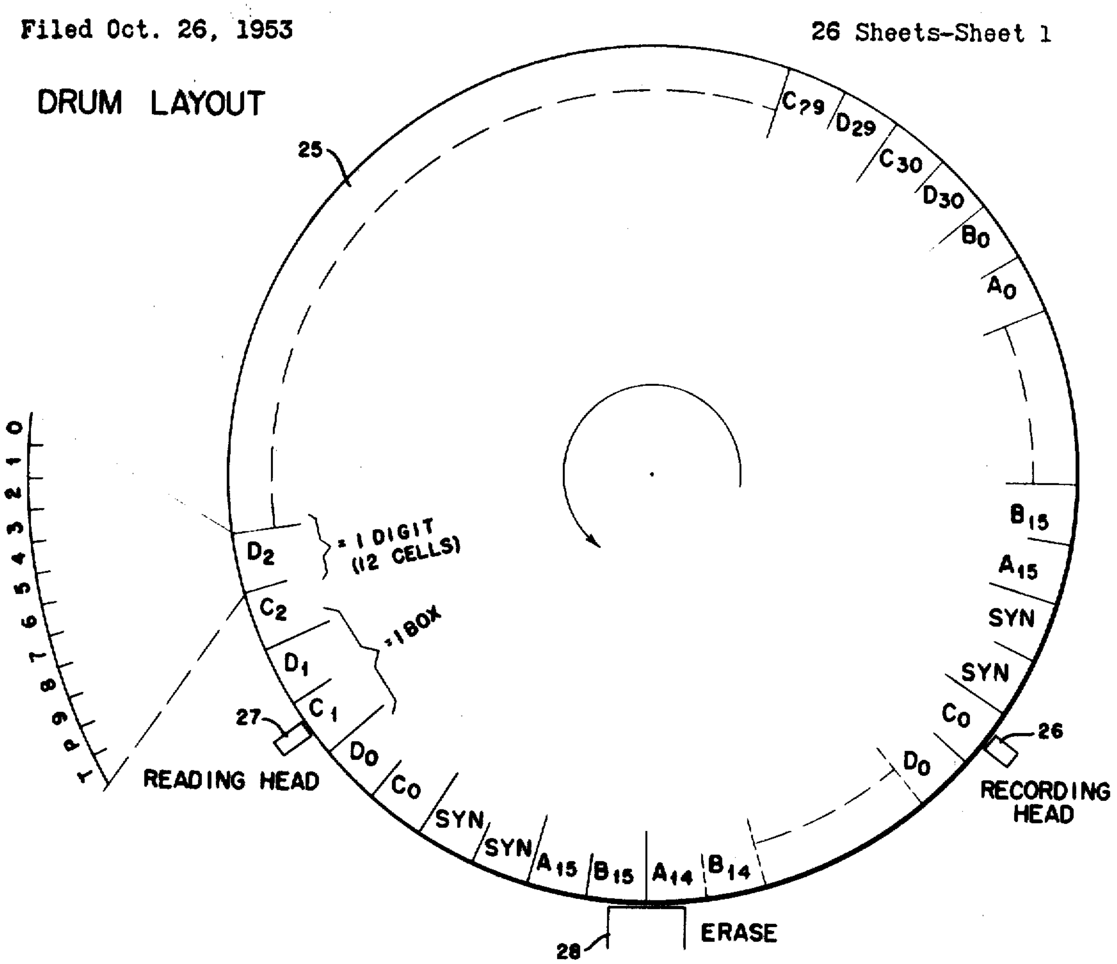
FIG. 1 is a diagrammatic view of a magnetic drum layout as utilized in the computer of the present invention, showing a preferred distribution of the intelligence digits among registers distributed around the periphery of the drum.

Referring to FIG. 1 of the drawings, the drum or disc 25 has an active region of its peripheral surface divided into 1128 cells packed about 75 to the inch and subdivided into 94 groups each of 12 cells, each group providing space for differential storage of a digit and two such contiguous groups comprising a "box." The last ten of the twelve cells in a given digit storage space comprising a group provide locations (as shown in the enlarged sector illustration) for storing the respective digits 0 to 9 in simple IBM coding. The first two cells of a group are called "tag" (T) and "point" (P), and are provided for storage of control information. Any group of 12 cells passes under a recording head 26 and a reading head 27 in the order T, P, 9, 8, 7, 6, 5, 4, 3, 2, 1, 0, as shown in the detailed sector representation in FIG. 1.

Individual decimal digits comprising a multi-digit number, stored in the respective A, B, C and D registers, are distributed, for example, around the drum in the particular manner as illustrated in FIG. 1, this interpositioning, in general, being an important feature of the invention. Individual digits of two different registers are differentially stored in the cells of two different groups of cells grouped by pairs, in the above-mentioned boxes. Thus a box will contain two such sectors as shown in detail in FIG. 1. For example, as illustrated in FIG. 1, the units digit of the C register is differentially recorded in one cell of the first box half designated $C_0$, and is followed by the units digit of the D register differentially stored in one cell of the second box half designated $D_0$, these two halves being each laid out as shown in detail in the enlarged sector and the two halves together comprising one box; next come the tens digit of C in $C_1$ and the tens digit of D in $D_1$, and so on through the thirty-first box comprising $C_{30}$ and $D_{30}$, in which the thirty-first (highest order) digits of C and D are stored. Next the units digit of the B register is stored in the box half $B_0$, and the units digit of the A register in the box half $A_0$, and so on. Following the sixteenth (highest order) digits of B and A, one box (two halves) is reserved for synchronizing information. The particular tag T (as illustrated in the enlarged sector representation) which is located at the beginning of the second digit in a given box, that is, during *a* time, may be called the first tag, while the tag T at the beginning of the first digit of the same box, during *b* time, is referring to as the second tag.

Suitable erasing means, labelled "ERASE," such as a permanent magnet 28 is disposed adjacent the surface of drum 25 between heads 26 and 27, and serves to clear the drum of previously recorded data before it again passes under the recording head. As shown in FIG. 1, heads 26 and 27 are spaced by 270° as measured counterclockwise and, as also shown, are offset by one box. Let us assume that $C_1$ is read, as illustrated in FIG. 1. This data will normally be passed through the electronic portion of the computer where it is delayed one box, so that this data is re-recorded one box later, or at the time $C_2$ is being read. However, as the re-recorded data is revolved counterclockwise from the recording head to the reading head, it gains one box, so that the data will again be read at $C_1$ time, one machine cycle later. As shown in FIG. 1, recording head 26 is re-recording the previously read units digit of the C register, while reading head 27 is reading the tens digit of the C register.

Figure 2:
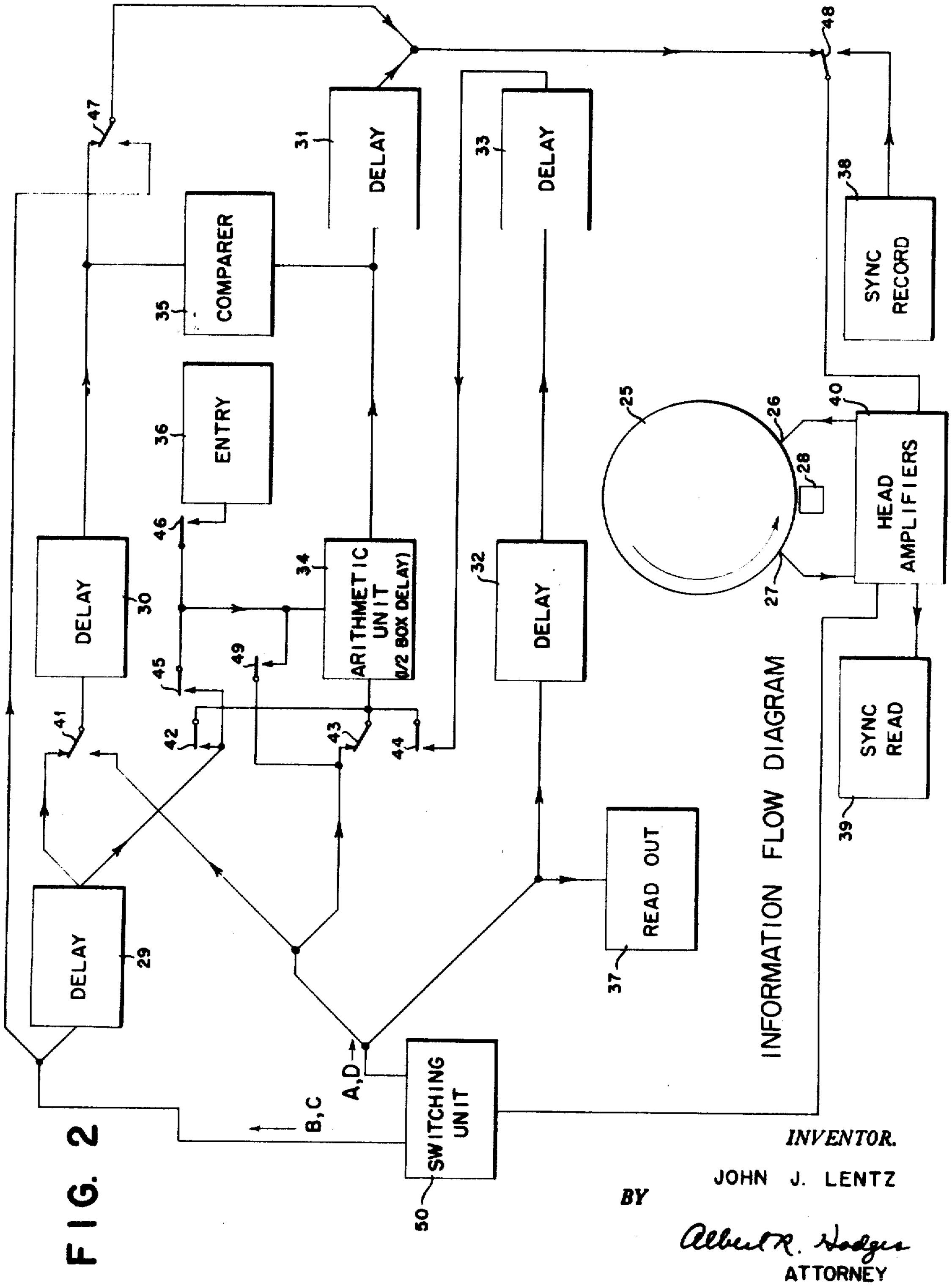
FIG. 2 is the basic information flow diagram of a computer in accordance with a preferred embodiment of the present invention.

As shown in the basic information flow diagram of FIG. 2, the principal elements of the computer in addition to the moving carrier or drum 25 comprise electronic delay units represented as blocks 29, 30, 32 and 33, the contents of any one of these blocks being illustrated in FIG. 6; a capacitor-type arithmetic unit 34, whose details are illustrated in FIGS. 7 and 8; an electronic comparer unit 35 shown in detail in FIG. 9; an entry unit 36 comprising a keyboard and its controlled switches shown in FIGS. 14–16; and an information read-out unit 37 whose details are shown in FIG. 27. Also provided, for synchronizing purposes, are synchronizing recording unit 38 and synchronizing read-out unit 39 whose details are shown in FIG. 19. An amplifier unit 40, comprising recording and reading amplifiers whose circuits are shown respectively in FIGS. 17 and 18, is associated with recording and reading heads 26 and 27. Switches 41–49 are diagrammatically shown only, and will be described in detailed later. The details of switching unit 50 are shown in FIGS. 7 and 18. Additional clock, switching and control units, to be described later, have been omitted from this figure to simplify the basic representation of the entire device.

Delay units 29–33, one of which is shown in FIG. 6, are identical, and serve as short-term storage elements, each unit storing a timed manifestation of a decimal digit for approximately one-half a box interval and then passing it along to the next unit to which the digit is to be transmitted. In these delay circuits, the time interval between reception of an input pulse and emission of the resultant output pulse may be controlled by variation of a control voltage. A monitor unit, also illustrated in detail in FIG. 6, is common to all the delay units, and is provided to control the delay so that the time between input and output pulses is kept equal to the time which elapses from the instant of reading a given cell from the drum in a first digit location until the corresponding cell in the next digit location is read.

Arithmetic unit 34, whose details are shown in FIGS. 7 and 8 and which will be described in detail later, comprises a modified form of frequency divider including a novel capacitor-type decimal counter and means for insuring the necessary stability of the unit. Associated with the capacitor-type counter are three gating circuits I, II and III (FIGS. 7 and 8) which pass bursts of clock pulses to the counter. The first two, namely I and II, of these gating circuits pass separate groups of pulses representing respectively each one of the two components of the sum being formed at the time. The third gate, III, stores information as to the requirement or non-requirement for a carry pulse, and delivers this carry pulse to the counter, when so required, at the appropriate time. The arithmetic unit works in serial fashion. For example, during multiplication, it first adds the units digit of register C to the units digit of register D and passes the sum digit along. It then treats the tens digit of register C, the tens digit of register D and a possible carry from the units summation, and so on. Subtraction is accomplished by generating the tens complement of the subtrahend which is then added to the minuend. Information passing through arithmetic unit 34 is subjected to a half-box delay.

As stated above, the operation A/B is performed by repeated subtraction of B from A. During the course of the operation, A is reduced in magnitude until it is no longer possible to substract with a positive result. Comparer unit 35 is controlled in accordance with the relative magnitudes of A and B and, when A becomes less than B, causes A to be shifted one place to the left and at the same time causes C to shift one place to the right. The resultant quotient of A/B is utilized in the machine to determine how many times the contents of the C register is to be added to the contents of the D register, whereby the operation $$\frac{A}{B}\times C+D$$

is performed. The result is registered in the D register.

Entry unit 36 comprises a keyboard, control switches and relay circuits, to be described later, by means of which multi-digit numbers are entered into the desired registers and also by means of which the operations to be performed on the numbers are controlled.

Information read-out unit 37 includes means for manifesting the contents of each register, as for example visually on the screen of a cathode-ray tube or in printed form by an electric typewriter.

The principal elements of the computer are interconnected by suitable electronic switching circuits. As stated above, these circuits are illustrated merely as a plurality of two-position switches 41–49. Each of these switches is shown in its "normal" position, its other position being designated as its "actuated" position. Control means are provided to operate the electronic switching circuits at the proper times to establish the proper paths to meet the requirements of the particular operation taking place. The components comprising switches 42–46 and 49 are enclosed in correspondingly numbered dashed boxes in FIG. 7, switch 45 occupying two boxes respectively designated **45*a* and 45*b*. The dashed box and its contents comprising switch 41 is shown in FIG. 18, while portions 48*a* and 48*b* of switch 48 are illustrated respectively in FIGS. 10 and 19. The components comprising switching unit 50 are shown in dashed boxes 50*a* and 50*b* in FIG. 7 and 50*c*** in FIG. 18.

The operation of the computer

Idling: As shown in FIG. 2, the computer is illustrated as being in its so-called idling condition, all of switches 41–49 being illustrated in their "normal" positions. This is the normal state of the computer, to which it invariably returns at the end of each major cycle. Under this condition, as the barious digits are read from drum 25 by reading head 27, they pass through switching unit 50, to be described later, which, as illustrated symbolically in FIG. 2, separates the A and D digits from the B and C digits. The A and D digits, which follow what may be called the lower channel or path, pass through switch 43 to arithmetic unit 34 and delay unit 31, and via switch 48 and head amplifier unit 40 to recording head 26. The B and C digits, however, are routed by switching unit 50 to what is called the upper channel or path, comprising delay unit 29, switch 41, delay unit 30 and switch 47, and then via switch 48 and head amplifier unit 40 to recording head 26. The A and D digits, as well as the B and C digits, when so routed, are subjected to a one-box delay as they pass respectively through the lower and upper channels of the electronic portion of the computer, but are otherwise unchanged.

The operation of the computer under the idling condition will be more readily understood by reference to the chart of FIG. 4. This chart clearly brings out the time relationships between the various boxes comprising a machine cycle and the pertinent gates of FIGS. 3*a* and 3*b* which, for additional clarity, have been illustrated below the chart. The upper portion of the chart (to be read up) depicts the flow of the digits of the B and C registers through the components comprising the upper channel (FIG. 2). The lower portion of the chart (to be read down) illustrates the passage of the digits of registers A and B through the lower channel of the computer. The digit $C_0$, for example, is read by reading head 27 during $0—m$, $b$ time, and enters delay unit 29 during the same time interval. It emerges from delay unit 29, after a half-box delay, during $0—m$, $a$ time and immediately enters delay unit 30. After a second half-box delay, it emerges from delay unit 30 during $1—m$, $b$ time, being supplied to comparer unit 35 and being recorded on the drum by recording head 26 during the same time interval. In a similar manner, any particular digit of the A and D registers may be traced through arithmetic unit 34 and delay unit 31 of the lower channel, to be recorded by recording head 26 after a total delay of one box. Arithmetic unit 34, like the delay units, introduces a half-box delay. Although all the digits of the A and D registers as they are read also pass through delay units 32 and 33 where they are subjected to a total delay of one box, they can go no further since, under the idling condition, switch 44 is in its normal or open state, as illustrated in FIG. 2.

Entry: When entry of outside data onto the drum is required, switch 46 (FIGS. 2 and 7) is actuated by means of the entry unit (FIGS. 14–16), so that information passes from the entry unit via "actuated" switch 46 into arithmetic unit 34, all data being entered sequentially with the highest order first, where digit by digit it is either selectively added to or subtracted from the number, if any, already standing in the selected register of the drum, which number is fed to arithmetic unit 34 via switch 43, as shown. Since all entries are inserted by way of the arithmetic unit, the digits of the selected register must be passed through the lower information channel which, as described above, includes the arithmetic unit. If necessary, the computer automatically performs an interchange( described later) to accomplish this. Upon completion of entry of a single digit of a multi-digit number into the selected register on the drum, the computer returns to its idle condition until another digit is to be entered.

Conversion: Conversion comprises replacing a number in a register by its complement, and is performed by subtracting that number from zero. To accomplish this, switches 43 and 49 are "actuated." Under this condition, the number originally in the selected register passes via "actuated" switch 49 to arithmetic unit 34. This unit is now conditioned for subtraction and, since switch 43 is open, the number will be subtracted from zero (by addition of its complement) in view of the fact that no other digit enters unit 34. The complement of the number, therefore, passes through delay unit 31 and back to the drum through switch 48, as described above.

Clear: During the clear operation, switch 49 only is "actuated," so that information flows through both of switches 43 and 49 into arithmetic unit 34, which again is conditioned for subtraction, with the result that the number in the register is this time subtracted from itself so that zeros are produced to be recorded on the drum.

Left shift: A shift to the left may be accomplished by "actuating" both of switches 43 and 44, so that the information flows from reading head 27 via delay units 32 and 33 in series and through "actuated" switch 44 to arithmetic unit 34, from which it is fed to delay unit 31 and then to recording head 26. The introduction of an additional delay of two half boxes due to the combined action of delay units 32 and 33 causes a shift peripherally of the drum in a clockwise direction, which thus produces a shift to the left or delay of one digit for all the digits of the register concerned.

Right shift: A shift to the right is produced by "actuating" switch 47. The information to be shifted to the right is read from the drum and flows through switching unit 50 directly to switches 47 and 48 and back to the drum without the normal one box of delay due to passing through delay units 29 and 30. Thus the digits are shifted peripherally of the drum in a counterclockwise direction, so that the digits of the register are shifted to the right. Since the information in the register selected to be shifted to the right must circulate in the upper channel, which does not contain arithmetic unit 34, the computer automatically performs an interchange (described next) to accomplish this if necessary.

Interchange: Interchange is accomplished by the "actuation" of switches 41, 42 and 43. If this is done for that portion of a major cycle during which digits of the A and B registers are flowing through the electronic circuits of the computer, then the A digits pass through "actuated" switch 41 to delay unit 30, thus by-passing delay unit 29, and then via switches 47 and 48 to recording head 26, which it is to be noted is part only of the path normally followed by the B digits. The latter, however, in this instance are routed through delay unit 29, "actuated" switch 42, arithmetic unit 34, delay unit 31 and switch 48 back to the drum, a path which includes most of the elements normally traversed by the A digits and which provides an additional half box of delay. Therefore, the digit which was in the A register records earlier by half a box which is the time when a B digit would normally record, and the digit which was in the B register records later by half a box, which is the time when an A digit would normally record. Thus the A and B digits are interchanged. In a similar manner, the digits of the C and D registers may be interchanged by "actuation" of switches 41, 42 and 43 for the appropriate portion of a major cycle. This provision of interchange comprises an important feature of the present invention.

Multiplication and division: Comparer unit 35 is employed in the process of multiplication and divison. This unit is operative at all times, so that at the end of each major cycle of operation information regarding the relative magnitudes of the multi-digit numbers in the A and B registers is available to the control unit. When the basic compute operation $$\frac{A}{B}\times C+D$$

employed for multiplication and division is initiated, the control unit (described later) consults comparer unit 35 at the end of a machine cycle and at this time generates either a "compute" or a "shift" gate, respectively depending upon whether A is greater than or equal to B on the one hand, or A is less than B on the other. These two gates occur in rapid succession during the course of the computation.

If A is greater than or equal to B so that a compute gate is generated, then the paths of information through the computer are as shown in FIG. 2 wih the exception that switch 45 is "actuated," thus allowing the output of delay unit 29 to flow into arithmetic unit 34 as well as into delay unit 30, and the arithmetic unit is instructed to subtract, but only during the period when A and B are passing through. Since the numbers of the C register are read respectively one-half box before the numbers of the associated D register and since the numbers of the C register pass through delay unit 29 while those of the D register go directly to the arithmetic unit, corresponding digits of C and D meet at arithmetic unit 34 in the same half box time. Similarly, corresponding digits of B and A meet in the same half box time. Since, as is seen from FIG. 1, the C and D registers are read in the first part of the machine cycle while the B and A registers are read during the second part of this cycle, the output of the arithmetic unit is the sum $C+D$ during the first part of the cycle. During the second part of the cycle, the difference $A-B$ is produced at the output of the arithmetic unit, since, as stated above, with a compute gate being generated the unit is instructed to subtract at the time the A and B registers are being read. These results are respectively routed back to the drum where they are recorded in the positions fomerly occupied by D and A, respectively. Thus in one full machine cycle, the machine replaces D by $C+D$ and replaces A by $A-B$, while B and C remain unchanged. On its way to the drum from arithmetic unit 34, the altered information is compared by comparer unit 35 so that, at the end of the compute cycle, the control unit knows whether or not B is to be subtracted from the new value in the A register. If so, one more full compute cycle is initiated, this process continuing until subtraction is no longer possible.

When comparer unit 35 finally indicates that B cannot again be substracted from the value in the A register, the control unit generates a shift gate instead of a compute gate, thus causing the value in the A register to be shifted one digit to the left while C is shifted one digit to the right. Here again, during the shift cycle comparer unit 35 compares the shifted quantities, so that at the end of the cycle the control unit may call either for another shift cycle or for a compute cycle, depending upon the information ascertained by the comparer unit 35.

The process continues in this fashion until a total of fourteen shifts has been made. Next, so long as compute cycles are being generated the machine is allowed to continue; but as soon as the signal for the fifteenth shift is received, the process is halted without allowing this shift to take place. The above-described operations give the result $$\frac{A}{B}\times C+D$$

to fifteen digits. In case a 30-digit answer is desired, the machine may be caused to go through the sequence a second time, thus filling in the last fifteen places.

THE DELAY UNITS

All the delay units 29–33, represented as blocks in FIG. 2, are identical, and the contents of any block is shown within the broken-line rectangle 51 of FIG. 6. Each delay unit comprises dual triodes 52 and 53, and triodes 54 and 55. The left-hand portion of dual triode 52 functions as a cathode follower, its grid 56 being connected through a resistor 57 to an input terminal 58, while its cathode 59 is connected to grid 60 of the right-hand portion of dual triode 52. Right-hand anode 61 is connected through a resistor 62 to a terminal 63, which in turn is connected to a source of delay control voltage to be described later.

When a positive-going input pulse is applied to input terminal 58, the right-hand portion of dual triode 52 conducts heavily, so that anode 61 closely approaches ground potential. This causes the discharge of a capacitor 64 connected between anode 61 and ground. At the termination of the input pulse, the right-hand portion of device 52 becomes nonconductive, and capacitor 64 charges toward the potential of terminal 63. The charging waveform is applied through a resistor 65 to left-hand grid 66 of dual triode 53, whose right-hand grid 67 returns through a resistor 68 to positive potential terminal 69. When the charging of capacitor 64 is beginning, the left-hand portion of dual triode 53 is nonconductive and its right-hand portion conductive. As grid 66 becomes increasingly positive and exceeds the potential of grid 67, conduction suddenly transfers to the left-hand side due to the regenerative feedback through a capacitor 70 connected between left-hand anode 71 and grid 67 of dual triode 53, and also due to the common cathode return, comprising resistor 89, of the two portions of dual triode 53.

The resultant positive-going impulse at right-hand anode 72 of dual triode 53 is applied through a capacitor 73 to grid 74 of triode 54, arranged to operate as a cathode follower with an output terminal 75 connected to its cathode 76. The delay time constant is so adjusted that the potential of grid 74 rises one-half box time after an input pulse is applied to the main input terminal 58 of the delay unit. Grid 74 remains at this positive value until it is restored to its normally negative value by the action of triode 55, whose grid 77 is connected to a terminal 78. Appropriately timed positive-going pulses (curve 4) are applied to this terminal 78, thus causing triode 55 to become momentarily conductive so that capacitor 73 is discharged and grid 74 of triode 54 is permitted to assume its normal negative potential, as determined by negative potential source 79, connected to this grid via rectifier elements 80 and 81, and a resistor 82. The delay unit just described comprises an important feature of the present invention.

In order to adjust the time delay provided by each of delay units 29–33 (FIG. 2) to exactly equal one-half box time despite changes in the speed of rotation of drum 25, a monitor is provided. As shown in the lower portion of FIG. 6, it comprises another delay unit 83 very similar to that just described, its input including an "AND" circuit 90 of three diodes supplied respectively with the pulses of curve 2 and the gates of curves 6 and 15. The output of delay unit 83 is supplied to a discriminator-rectifier circuit 84, in which it is compared for time coincidence with the gate of curve 13 applied to an input terminal 85. The resultant direct-current voltage, developed in lead 86, is utilized to regulate the conductivity of a triode 87, whose anode 88 is connected to terminals 63 of delay units 51 and 83. In operation, if the output pulse of delay circuit 83 fails to coincide with the rise of each gate of curve 13, an error signal is developed in lead 86 and utilized to adjust the delay control voltage at terminals 63 in such a manner as to restore coincidence.

Although the monitor unit of FIG. 6 utilizes a sampling circuit of conventional type which does not in itself comprise a part of the present invention, its operation will now be discussed in somewhat greater detail. Referring to FIG. 6, the gate of curve 13 which is applied to terminal 85 is differentiated by the network comprising a capacitor 800 and a resistor 801. The resultant alternately positive-going and negative-going spikes are applied to the grid of a triode 802. Tube 802 is so biased initially that only the positive-going spikes, corresponding to the rise of the gate of curve 13, are passed through the tube to the primary winding 803 of a transformer 804. These spikes result in positive-going interrogating pulses across each of the two secondary windings 805 and 806 of transformer 804. Triodes 807 and 808, associated respectively with secondary windings 805 and 806, are normally nonconductive due to the rectified grid current resulting from the abovementioned spikes except for the duration of each interrogating pulse. For this brief interval of time, tubes 807 and 808 are capable of conduction.

When "AND" circuit 90 is enabled by the simultaneous presence of the pulses of curve 2 and the gates of curves 6 and 15, the right-hand portion of a dual triode 809 becomes conductive, thus discharging a capacitor 810 associated with the left-hand portion of tube 809. Capacitor 810 then charges to a potential sufficiently high to cause the right-hand portion of a dual triode 811 to become conductive. The left-hand portion of tube 811 is first conductive and then suddenly cuts off due to the negative-going pulse applied to its grid by a capacitor 812, so that the left-hand plate 813 of tube 811 rises by about 50 volts. The resultant positive-going voltage pulse is applied through a capacitor 814 to the cathode of a diode 815, the anode of which is connected through a diode 816 to a bias network providing approximately —25 volts. If the potential at the cathode of diode 815 is not equal to the potential on lead 86, current flows through one or the other of triodes 807 and 808 during the time that these tubes are rendered capable of conduction by the interrogating pulses. This current flows in a direction appropriate to change the charge on a capacitor 817 connected between lead 86 and ground in the proper sense to suitably correct the direct-current voltage developed at anode 88 of tube 87 and supplied to terminals 63 of the delay units.

THE ARITHMETIC UNIT

FIGS. 7 and 8 of the drawings, taken together, comprise the detailed circuit diagram of arithmetic unit 34 (FIG. 2) and its associated electronic switches 42, 43, 44, 45, 46 and 49, as well as portions **50*a* and 50*b* of switching unit 50. The arithmetic unit comprises three gating circuits, designated generally by numerals I, II, and III, through which bursts of pulses or in the case of gating circuit III, single pulses, are supplied to the decimal counter, designated generally by reference numeral 91 (FIG. 8) and having an input terminal 92 and an output terminal 93. Gating circuits I and II (FIG. 7), comprising the two inputs to the arithmetic unit, each remain open just long enough during the entry portion of the counter operating cycle to pass the number of pulses corresponding respectively to the two components, namely the augend and addend, of the sum being formed at the time. Gating circuit III (FIG. 8) includes means for storing information as to the necessity for a carry pulse and delivers any such carry pulse to counter 91** at the appropriate time. During subtraction, it also provides "elusive one" pulses.

The gating circuits

Electronic switches 42, 43 and 44, enclosed in their respective dashed outlines, are associated with gating circuit I. As is seen in FIG. 2, switch 42 is connected to the output of delay unit 29 and, referring to FIG. 7, terminal 94 of switch 42 is the connection to which delay unit 29 is joined. Terminals 298, respectively of switches 42, 43 and 44, are all supplied with a suitably gated portion of the single-shot gate (curve 23). The production of the single-shot gate and of a suitably gated portion of it will be described later in connection with FIG. 11. The signals from reading head 27 (FIG. 2), developed in a manner to be described later in connection with FIG. 18, are supplied to terminals 480 of switch 50 (respectively in portions **50*a* and 50*b*), while terminal 99 of switch 44 is connected to the output of delay unit 33** (FIG. 2).

The outputs of switches 42, 43 and 44, together with the output of an "AND" circuit 100 supplied with the gates of curves $8_0$ and 15, comprise the inputs of an "OR" circuit 136, the output of which is connected to the left-hand grid 101 of a dual triode 102 forming, with dual triode 103, a bistable trigger circuit 104 (FIG. 7). The arrival of a positive-going pulse at grid 101, which can occur only if a third working pulse (curve 3) is also present, causes tube 102 to become conductive and tube 103 to become nonconductive, thus turning trigger circuit 104 on. This in turn causes a triode 105 connected as a cathode follower to deliver a plus output to one input of an "AND" circuit 106, whose other two inputs comprise the second working pulses of curve 2 and the numbers only gate (curve 12). This "AND" circuit is enabled when the rise of the numbers only gate (curve 12) is jointly effective with the pulse output from triode 105 to permit each of the pulses of curve 2 to pass to output line 107 of gating circuit I and, via one of the inputs of an "OR" circuit 108 (FIG. 8), to input terminal 92 of decimal counter 91. Thus it will be apparent that the number of pulses (curve 2) which are supplied to counter 91 via gating circuit I in a given digit half box will be determined by when trigger circuit 104 is turned on. This in turn depends upon the time of arrival of a signal read from the drum and supplied to gating circuit I either undelayed via switch 43 (see also FIG. 2) or after appropriate delays through switch 42 or switch 44.

To restore trigger circuit 104 to its normal state with tube 103 conductive, each output pulse at output terminal 93 of counter 91 (FIG. 8) is applied to one input of an "AND" circuit 171 (FIG. 7), the other input being the *b* gate (curve 13). If the *b* gate is up, a positive-going pulse is provided at the output of "AND" circuit 171. Since the counter output pulse and hence this positive-going pulse have substantially the same duration as the second working pulse (curve 2) which caused the counter to fire, it is necessary first to elongate this positive-going pulse and then to delay its application to trigger circuit 104. The elongation is achieved by utilizing the output of "AND" circuit 171 to store a charge on a capacitor 109. This charge is subsequently terminated by the fall of the still-up blanking pulse (curve 5), and the resultant effectively elongated pulse is passed through a triode 110 connected as a cathode follower and having an output terminal 176. The pulse at this terminal is effectively delayed by passing it through an integrating circuit 112, and is then applied to right-hand grid 111 of tube 103, thus rendering this tube conductive to thus terminate the plus output provided by triode 105 when trigger circuit 104 is on and hence disable "AND" circuit 106. If the *b* gate (curve 13) is not up, firing of counter 91 does not restore trigger circuit 104 to its normal state. The elongated counter output pulse as developed at terminal 176 is supplied to one input of comparer unit 35 (FIG. 9). This output pulse also serves as one input to an "AND" circuit 172 (FIG. 7), to which are also supplied third working pulses (curve 3) and the *b* gate (curve 13). Output terminal 173 of "AND" circuit 172 may be considered the output terminal of the arithmetic unit, and is connected to the input terminal of delay unit 31 (FIG. 2).

Turning now to gating circuit II (FIG. 7) and its associated electronic switches 45, 46 and 49, signals from reading head 27 (FIG. 2), developed as described later in connection with FIG. 18, are supplied without passing through any delay unit to terminal 480 of switch **50*b*. Terminals 289, respectively of switch 49 and "AND" circuit 771, to be described presently, are supplied with a suitably gated portion of the single-shot gate (curve 23), developed as described later in connection with FIG. 11. The output of delay unit 29 (FIG. 2) is connected to terminals 116 of "AND" circuit 780 (box 45*a*) and 117 of "AND" circuit 778 (box 45*b*) of switch 45. An "AND" circuit 244 is provided as part of switch 46, two of its inputs comprising the selected digit gate (curve 21) and the single-shot gate (curve 23). The selected number gate, developed as explained later in connection with FIG. 21, is applied to its third input terminal 593. The output of this "AND" circuit 244 provides one input of an "AND" circuit 339, and also one input of an "AND" circuit 772, as shown. The outputs of "AND" circuits 339, 771, 777 and 778 serve as the inputs of an "OR" circuit 782, the output of which is connected to the right-hand grid 118 of a dual triode 119 forming, with dual triode 120, a bistable trigger circuit 121. The enabling of one of these "AND" circuits, therefore, causes tube 119 to become conductive and tube 120 nonconductive. This in turn causes a triode 122 connected as a cathode follower to deliver a plus output to one input of an "AND" circuit 123, whose other two inputs comprise fourth working pulses (curve 4) and the numbers only gate (curve 12). This plus output acts conjointly with the numbers only gate (curve 12) to permit the pulses of curve 4 to pass along the output line 124 of gating circuit II, through a second input of "OR" circuit 108, to input terminal 92 of counter 91 (FIG. 8). It will be evident, therefore, that the number of pulses (curve 4) which are supplied to counter 91 via gating circuit II in a given digit half box will be determined by when trigger circuit 121 is turned on. This in turn is dependent upon the time of arrival either of a signal read from the drum and supplied to gating circuit II via one of switches 45 and 49, or of the selected number gate representing the digit value to be entered and supplied via "AND" circuits 244 and 339 comprising a portion of switch 46, as will be described later. Trigger circuit 121 is restored to its normal state (with tube 120 conductive) by the application of a positive-going pulse, provided by an "OR" circuit 174 in a manner to be described later, to left-hand grid 125 of dual triode 120, thus rendering this tube conductive and hence terminating the plus output provided by triode 122, so that "AND" circuit 123** is disabled.

A third source of input pulses to counter 91 comprises gating circuit III (FIG. 8), which serves to provide a single carry pulse when the sum of the two numbers entering the arithmetic unit exceeds nine and, as will be explained later, to provide an "elusive one" pulse during subtraction. When the sum exceeds nine, the counter, as described presently, delivers an output pulse during the first half of its operation cycle, this pulse being effectively stored in gating circuit III and utilized to furnish an extra pulse to the counter at the beginning of the immediately subsequent adding cycle for the digits of the next higher order. A suitably gated portion of the single-shot gate (curve 23), developed as described later in connection with FIG. 11, is applied to terminal 298. The output of counter 91, appearing at terminal 93, serves as one input of an "AND" circuit 242, whose other input is the *a* gate (curve 15). The output of "AND" circuit 242 provides an input of an "OR" circuit 243, the other inputs of which are connected respectively to the outputs of "AND" circuits 271 and 272. The function of "AND" circuits 271 and 272 will be discussed later. The output of "OR" circuit 243 is connected to the left-hand grid 128 of a dual triode 129 forming, with dual triode 130, a bistable trigger circuit 131.

When the counter passes through nine to thus produce an output pulse at output terminal 93, this pulse, when the *a* gate (curve 15) is up, enables "AND" circuit 242 and a positive-going pulse is applied via "OR" circuit 243 to grid 128, thus rendering tube 129 of trigger circuit 131 conductive and tube 130 nonconductive. A triode 132 connected as a cathode follower is thus caused to deliver a single positive-going pulse to one input of an "AND" circuit 133, the remaining inputs of which comprise the pulses of curve 3 and the gates of curves 7 and 15. When this "AND" circuit is enabled, a positive-going output pulse is provided on line 134, and this carry pulse passes via "OR" circuit 108 to input terminal 92 of counter 91. Since the point gate (curve 7) determines the timing of this carry pulse, it will not interfere with any digit entered into the counter. Since a carry pulse can be produced only in *a* time (curve 15), a carry pulse enters the counter only during the counter cycle succeeding that in which the counter passed from nine to zero (see FIG. 5). Trigger circuit 131 is restored to its normal condition (tube 130 conductive) by the application of a positive-going pulse to the right-hand grid 135 of dual triode 130, this pulse being developed in a network 137 of "AND" and "OR" circuits, its configuration being such that an output pulse is produced when both of gates 4 and 7, and either of gates 15 and 18, are up. Normally the *a* gate (curve 15) is effective to reset trigger circuit 131. However, a carry pulse is not to be passed on from the highest-order digit position. To insure this, trigger circuit 131 of gating circuit III is reset under control of the zero digit gate (curve 18). This gate covers the entire counter cycle following the one in which the counter passed from nine to zero. Thus no carry pulse will issue from the highest order. This is true for registers C and D. However, in the case of the A and B registers it is impossible to suppress the carry in the manner described above. In fact, a carry pulse is produced and passed to the counter, but prior to this the correct sum has already been read out from the counter by way of delay unit 31 (FIG. 2) to the drum. The timing of the operation of switch 48 (FIG. 2) is such that the output from the counter is dissipated before it is recorded on the drum. This dissipation is produced by the coincidence of the pulses of curve 5 and the gates of curves 16 and 18 in "AND" circuit 265 in switch **48*a* (FIG. 10), whose output is applied to one input of "AND" circuit 259 to render it ineffective, so that the output of the counter, applied to the other input 246**, is not passed to the drum.

The counter

Counter 91 (FIG. 8) accepts intermittent bursts of pulses, at rates as high as 300,000 pulses per second, and emits one output pulse after each tenth pulse received. The application of each positive-going pulse to its input terminal 92 causes a negative-going pulse at anode 140 of pentode 141. Due to this negative-going pulse, a charge is drawn from a capacitor 142 through a diode 143 into a capacitor 144 connected as shown, thus lowering the potential at the top of capacitor 142 by approximately ten volts. At the end of the input pulse at terminal 92, pentode 141 becomes nonconductive and its anode 140 is restored to its normal high positive potential. The charge on capacitor 144 is then dissipated through a rectifier element 145.

The junction of capacitor 142 and the anode of diode 143 is connected through a resistor 146 to the left-hand grid 147 of a dual triode 148, this tube serving two functions, in accordance with an important feature of the present invention. The left-hand portion acts as a cathode follower to linearize the discharge of capacitor 142. This is accomplished by returning rectifier element 145 to the joined cathodes 149 and 150 of tube 148, whose cathode potential varies in steps like that of the potential across capacitor 142. If rectifier element 145 were returned to a source of fixed potential instead of to a source of potential varying with that of capacitor 142, the amount of change of potential on the cathode of diode 143 to withdraw an increment of potential from capacitor 142 would increase with each such withdrawal, so that each increment of potential on capacitor 142 for each pulse applied to input terminal 92 would be less than the preceding one, thus producing a nonlinear discharge of capacitor 142. However, with the bottom plate of capacitor 144 connected via rectifier element 145 to a source of potential varying in value with that across capacitor 142, as shown in FIG. 8, the increments of charge removed from capacitor 142 for each pulse applied to input terminal 92 would be substantially equal, thus linearizing the discharge of capacitor 142.

As a second function, the two sections of dual triode 148 together act as a balanced voltage discriminator to detect the time at which the voltages on grids 147 and 151 become equal. At the start of a cycle of operation, capacitor 142 is charged to approximately 100 volts, and the left-hand portion of dual triode 148 is conductive, its right-hand portion being nonconductive. Capacitors 142 and 144 are so chosen that, after ten pulses have been received, capacitor 142 becomes discharged almost to ground potential, at which time the potential of grid 147 is sufficiently lowered so that it becomes equal to that of grid 151. Thus the right-hand portion of dual triode 148 now becomes conductive, and a negative-going pulse is developed at its anode 152. In other words, the counter has "fired." This pulse is applied to grid 153 of a triode 154 which, with a triode 155, forms a trigger circuit 156, and this negative-going pulse thus causes normally conductive triode 154 to become nonconductive, so that a positive-going pulse is supplied through a triode 157 connected as a cathode follower to the counter output terminal 93. The negative-going pulse developed at anode 158 of triode 155 when it becomes conductive is passed through triodes 159 and 160, operating respectively as an amplifier-inverter and a cathode follower, and is utilized after passing through the right-hand portion of a dual diode 161 to fully recharge capacitor 142, thus restoring counter 91 to its initial state. In the meantime, trigger circuit 156 is restored to its normal condition by the application of a positive-going pulse via an "OR" circuit 162 to grid 153 of triode 154, thus rendering it again conductive.

Short-term stability is enhanced by clipping the control-grid potential of pentode 141 at ground and by operating this tube below the knee of its plate characteristic. This insures that the amplitude of pulses at anode 140 is substantially independent of variations in amplitude of the input pulses.

An important feature of the present invention is the provision of means for enhancing the long-term stability of the counter. Since the amplitude of each of the voltage steps at capacitor 142 is very nearly directly proportional to the amplitude of the negative-going driving pulse developed at anode 140 of pentode 141, the counting ratio of the counter may be preserved by causing the total excursion of the voltage across capacitor 142 to vary in proportion to the long-term variation of the driving pulse. A substantially fixed voltage, of approximately 100 volts, is provided by means of a cathode follower 163 and applied via a line 164 to the screen grid 165 of pentode 141. Rectifier elements 166 and 167 are connected in series between anode 140 and line 164, so that anode 140 cannot rise higher than the potential of this line 164. The left-hand portion of dual diode 161 is connected between the upper end of capacitor 142 and this line 164, so that the upper limit of the voltage excursion across capacitor 142 has the same value as the upper limit of the driving pulse developed at anode 140 of pentode 141. The lower limit of the driving pulse at anode 140 is read by what is essentially a negative-peak-reading voltmeter comprising rectifier elements 168 and 169 conductively connected between anode 140 and capactor 170, the resultant voltage being applied as a reference potential to right-hand grid 151 of dual triode 148. There is provided a voltage-dividing network 113 comprising a pair of resistors of relatively high resistance connected in series between +250 volts and −250 volts, their junction being connected through a parallel-connected resistor and capacitor as shown to the top plate of capacitor 170. This junction is also connected to right-hand grid 151 of dual triode 148. With these connections, the total excursion of the voltage across capacitor 142 remains almost exactly equal to the amplitude of the driving pulse at anode 140, so that the counting ratio of counter 91 is unaffected even when this amplitude varies within wide limits, it being assumed for the moment that the positive and negative supply voltages remain fixed. Network 113 provides a small compensating voltage superimposed on the voltage developed across capacitor 170, thus substantially overcoming the effects of supply-voltage fluctuations. With the arrangement just described, it has been found possible to vary the supply voltage by as much as 50% or to replace pentode 141 with a pentode of different type number without impairing the operation of the counter or causing it to miscount.

The operation of the arithmetic unit

In operation, the counter goes through at least one complete cycle of its operation in a period of 160 microseconds corresponding to one box in length. Each cycle includes a read-in portion and a read-out portion, each 80 microseconds in length. During the first or read-in portion, bursts of interleaved pulses indicative of the respective digits to be combined are received from the respective gating circuits I and II and are sent to the counter. There is no interference between these two groups of pulses because the pulses of curves 2 and 4, transmitted respectively by gating circuits I and II, are staggered in time. Read-out from the counter can occur only during the second or read-out portion, as described presently, so that a half-box delay is introduced by arithmetic unit 34. Thus after this delay the counter emits a pulse whose time position is indicative of the sum. This sum digit is recorded on the drum after passing through delay unit 31 (FIG. 2), introducing another half-box delay. Thus the previously mentioned delay of one box is introduced between the reading of the augend and the recording of the sum.

Idling: It will be recalled that, during idling operation, the contents of the A and D registers are read from the drum and pass through the arithmetic unit before reaching the recording head to be re-recorded. The passage of a particular digit through the counter during idling will now be discussed. Let it be assumed that the digit in question is a six, and that it is stored in the tenth-order position of the A register, that is, in $A_{10}$. Thus a pulse is read from the wheel at 10–*d*, *a*, $\mathbf{8}_6$ time, thereby enabling "AND"

circuit 774 (FIG. 7) and opening gating circuit I. This conditions "AND" circuit 106 and permits pulses defined by curves 2 and 12 to pass via line 107 to input terminal 92 of counter 91 (FIG. 8). During 10–*d*, *a* time, six pulses enter the counter, these pulses being defined by curve 2 and occurring respectively under the number gates of curves $8_5$, $8_4$, $8_3$, $8_2$, $8_1$ and $8_0$. Gating circuit I remains open as 10–*d*, *b* time begins, so that four more pulses, defined by curve 2 and occurring respectively under the number gates of curves $8_9$, $8_8$, $8_7$, and $8_6$ enter the counter. Since the pulse under the last-mentioned gate is the tenth pulse received by the counter, it causes the counter to fire and reset to zero. The resultant counter output pulse at terminal 93 thus occurs at 10–*d*, *b*, $8_6$ time under the gate of curve 2.

As previously described, this counter output pulse is elongated and utilized to close gating circuit I, so that no further pulses are passed to the counter until the digit $A_{11}$ is read from the drum. The elongated pulse, which has approximately the duration of a blanking pulse (curve 5), is also applied in coincidence with a third working pulse (curve 3) and the *b* gate (curve 13), by means of "AND" circuit 172 (FIG. 7), via terminal 173 to the input of delay unit 31 (FIG. 2), in which it is subjected to a delay of one-half box. The output of delay unit 31 thus comprises a pulse in 11–*d*, *a*, $8_6$ time defined by a third working pulse (curve 3). This delayed output pulse, corresponding to the six in the $A_{10}$ register position, is again recorded in 11–*d*, *a*, $8_6$ time, that is, one box later than it was read. As will be discussed more in detail later, the pulse as thus recorded will be read, in the next machine cycle, at 10—*d*, *a*, $8_6$ time. It will be apparent, therefore, that the digit in $A_{10}$ has remained effectively unchanged during the idling cycle. All the other digits of the A register, and all of the digits of the D register, would be handled by the counter in exactly the same manner during idling operation.

Addition: Operation of the arithmetic unit will be more readily understood by reference to FIG. 5, which illustrates graphically the solution of two separate problems. Considering first the case of a sum of nine or less (the counter having been cleared to zero, as described presently), suppose that it is desired to add 02 (the addend) to the value 06 (the augend) already standing in the eleventh- and tenth-order positions of the A register. As just described in connection with idling operation, gating circuit I is opened at 10–*d*, *a*, $8_6$ time so that, during 10–*d*, *a* time, six pulses enter the counter via line 107, these pulses being defined by curve 2 and occurring respectively under the number gates of curves $8_5$, $8_4$, $8_3$, $8_2$, $8_1$ and $8_0$. In the meantime, "AND" circuit 244 (FIG. 7) is enabled by the rise of the selected digit gate (curve 21), the single-shot gate (curve 23) and the selected number gate (curve $8_2$) developed at terminal 593 inaccordance with a previous selection by the keyboard operator, as described later in connection with entry. The enabling of "AND" circuit 244 opens gating circuit II at 10–*d*, *a*, $8_2$ time, so that two pulses enter the counter via line 124, these pulses being defined by curve 4 and occurring respectively under the number gates of curves $8_2$ and $8_1$, before gating circuit II is closed at 10–*d*, *a*, $8_0$ time by the gate of curve $8_0$ applied at terminal 779 (FIG. 7). Accordingly, a total of eight pulses reaches counter input terminal 92, as indicated in FIG. 5, during the read-in portion of the first counter cycle, that is, in 10–*d*, *a* time. This will drop the voltage on capacitor 142 (FIG. 8) only eight of the ten possible steps, so that the counter does not yet fire. Gating circuit I is still open, but gating circuit II is closed.

During the second or read-out portion of the first counter cycle, defined as 11–*d*, *b* time, the counter is tested to determine how many additional pulses are required to cause it to reset, thus determining the number representative of the sum of the two input numbers. This is accomplished by supplying a series of test pulses (curve 2) to the counter, these pulses being supplied through gating circuit I which, as just explained, has remained open. During 11–*d*, *b* time, the counter receives two more pulses via line 107, these pulses being defined by curve 2 and occurring respectively under the number gates of curves $8_9$ and $8_8$. The counter fires upon receipt of the pulse under curve $8_8$, since this is the tenth pulse to enter the counter. The resultant counter output pulse, corresponding to the sum of six and two, is timed by the "8" gate (curve $8_8$) and after elongation is passed through delay unit 31 and recorded at 11–*d*, *a*, $8_8$ time so that, in the next machine cycle, it will be read at 10–*d*, *a*, $8_8$ time. Thus the digit $A_{10}$ has been changed from a six to an eight, the result of adding a two to a six. Since the selected digit gate (curve 21) rises only once during this entry cycle, gating circuit II does not open again during the cycle. As described above, capacitor 142 (FIG. 8) is again charged to its highest level, so that the counter is reset to zero and ready to respond to new pulses when the next digits come along.

The next higher order digit in each of the numbers being added in the problem under discussion is assumed to be a zero. Accordingly, in the second counter cycle the zero read from the drum opens gating circuit I during the "0" gate (curve $8_0$) in the read-in portion, and this gating circuit is closed by the firing of the counter which takes place under the "0" gate (curve $8_0$) of the read-out portion. Thus ten pulses (curve 2) are permitted to flow via line 107 into the counter during read-out time, as shown. Because the selected digit gate (curve 21) is not produced since there is no second tag available, gating circuit II remains closed throughout the second counter cycle, so that no pulses (curve 4) are supplied to counter 91 along line 124. As shown, therefore, a total of ten pulses, all supplied by gating circuit I, are applied to counter input terminal 92, causing it to fire and produce an output pulse at its output terminal 93 timed by the "0" gate (curve $8_0$) in the readout portion of the second counter cycle. Since, as stated above, the counter is connected via delay unit 31 to recording head 26, the zero originally in the $A_{11}$ digit position remains unchanged. In the problem as a whole, therefore, the sum of 06 and 02 is recorded back on the drum as 08.

If the two numbers entering the arithmetic unit are sufficiently large to make their sum exceed nine, a carry is necessary. In this case, the counter will go through all ten possible steps and fire during the read-in portion of the first counter cycle, thus producing a first output pulse during the first half of this cycle. This first output pulse is utilized to later produce a carry when the next two digits are added. Operation under these conditions will be better understood by reference to the second problem of FIG. 5, in which the addition of nine and nine is illustrated. In this case, during the read-in portion of the first counter cycle, gating circuit I is opened, under the "9" gate (curve $8_9$) applied through "AND" circuit 774 and "OR" circuit 136 (FIG. 7), if a third working pulse (curve 3) is present. It is not closed by the first counter output pulse developed at output terminal 93 (FIG. 8) and applied to input terminal 109 of "AND" circuit 171 (FIG. 7), since the *b* gate (curve 13) is down during the read-in portion of the counter cycle. Gating circuit I is closed only by the second output pulse of counter 91, occurring in the readout portion of the first counter cycle, since the *b* gate (curve 13) is up at this time. While gating circuit I is open, nine pulses (curve 2) are supplied via line 107 to counter 91 during the read-in portion of the first counter cycle.

As shown in FIG. 5, gating circuit II is opened by the rise of a "9" gate (curve $8_9$), which is applied through terminal 593 and "AND" circuits 244 and 339 to render tube 119 conductive. As in the first problem, gating circuit II is closed by the rise of the "0" gate (curve $8_0$) applied through "OR" circuit 174 to render tube 120 conductive. Thus nine pulses (curve 4) are permitted to pass via line 124 into counter 91. During the read-in portion of the first counter cycle, a total of eighteen pulses reaches counter input terminal 92 as indicated in FIG. 5. Upon the arrival of the tenth pulse in the read-in portion of the cycle, the counter fires, producing a first output pulse at its output terminal 93. This output pulse is supplied to input terminal 93 of "AND" circuit 242 (FIG. 8) and, since the *a* gate (curve 15) is now up, this "AND" circuit is enabled and gating circuit III is opened, as shown in FIG. 5. During the second or read-out portion of the first counter cycle, gating circuit 1 remains open long enough to permit two additional pulses (curve 2) to pass via line 107 into counter 91. Upon the arrival of the twentieth pulse at input terminal 92, the counter fires again, producing a second output pulse during the read-out portion of the cycle at its output terminal 93 timed by the "8" gate (curve $8_8$). The flow of input pulses is now cut off as before by the closing of gating circuit I. Thus the first or lowest order digit of the sum being formed is indicated as being an eight.

Since gating circuit III is still open as the first half of the second counter cycle is begun, "AND" circuit 133 (FIG. 8) is enabled by the coincidence of a third working pulse (curve 3) and the gates of curves 7 and 15, so that a pulse which is the carry pulse is supplied via line 134 to input terminal 92 of counter 91. Immediately following production of this carry pulse, gating circuit III is closed by the coincidence of a pulse of curve 4 with the gates of curves 7 and 15 in network 137, rendering tube 130 conductive. Since the next higher order digit in each of the numbers being added is a zero, as in the first problem, only nine pulses (curve 2) are permitted to flow via line 107 to counter input terminal 92 during the second counter cycle, between the opening of gating circuit I during the "0" gate (curve $8_0$) in the read-in portion and its closing because the counter is fired for the third time as explained below under the "1" gate (curve $8_1$) of the read-out portion since a carry pulse has already been entered into the counter. Gating circuit II remains closed, so no pulses (curve 4) are supplied to counter 91 along line 124. Thus the carry pulse, supplied by line 134, is added to the nine pulses supplied via line 107, providing a total of ten pulses at counter input terminal 92 and causing the counter to fire a third time. The resultant output pulse at output terminal 93 thus occurs under the "1" gate (curve $8_1$), indicating that the second digit of the sum being formed is one.

Subtraction: Each register is provided with one more digit position than there are digits in the largest number to be stored, the highest order digit position being reserved for algebraic sign information. If this highest order digit is a zero, the number in the register is positive, and its magnitude is equal to the digits stored in all the lower order digit positions; if the highest order digit is a nine, the number is negative and its magnitude is equal to the tens complement of the digits stored in all the lower order digit positions. The tens complement of a number is formed by replacing each digit of the number, except the units digit, by that digit subtracted from nine, the units digit being replaced by the difference between itself and then. Thus negative numbers are represented by tens complements, and the arithmetic unit subtracts by adding the tens complement of the subtrahend to the minuend.

When subtraction is in progress, the minuend digits control gating circuit I (FIG. 7) in exactly the same way that the augend digits control this circuit during addition, as described above. The subtrahend digits enter arithmetic unit 34 (FIG. 2) through gating circuit II (FIG. 7) as do the addend digits in addition, but during subtraction gating circuit II is so controlled that, during the first or read-in half period of each counter cycle, the number of pulses (curve 4) as applied to "AND" circuit 123 which pass via line 124 into counter 91 (FIG. 8) is equal to the difference between the digit nine and each subtrahend digit. Furthermore, when the two units order digits are being subtracted, an extra pulse, called the "elusive one" pulse, is caused to enter the counter through gating circuit III (FIG. 8), as described presently.

The control of gating circuit II during subtraction will be better understood by considering a specific example. A particular register is first selected which contains the minuend. This is selected by depressing the proper one of register buttons 404, 405, 414 and 406 (FIG. 15). Subsequently, when the "six" button is depressed, assuming the subtrahend digit is a six, a single-shot gate (curve 23) will be developed at terminal 286 of FIG. 11, and a selected portion of the single-shot gate will be produced at terminal 298 (FIG. 11), as described later. The particular portion selected will have been previously determined by the choice of register. This portion is applied to input terminal 298 of an "AND" circuit 771 (FIG. 7). Minus button 401 (FIG. 15) is now depressed, causing the pickup of minus relay 387 and the transfer of relay contacts 387–*g* (FIG. 16). This raises input terminal 441 (FIGS. 7 and 16) of "AND" circuit 771 (FIG. 7) to ground potential. "Six" button 376 (FIG. 14) is now depressed, so that the corresponding selected number gate (curve $8_6$) is developed at terminal 593 (FIGS. 7 and 21) as explained later in connection with FIGS. 14 and 21, and thus supplied to "AND" circuit 244 (FIG. 7) to be effective as described below. A single-shot gate (curve 23) is also developed as stated above and is applied to an input terminal of "AND" circuit 244. The gates of curves 7 and 15 comprise the two inputs of an "AND" circuit 770 (FIG. 8), the output of which is fed to the third input of "AND" circuit 771 (FIG. 7). Thus "AND" circuits 770 and 771 will be enabled by the coincidence of the point gate (curve 7) and the *a* gate (curve 15), which rises during the first half of the first counter operating cycle (FIG. 5), when a single-shot gate (curve 23) is produced and its selected portion is applied to terminal 298 as stated above. The enabling of "AND" circuits 770 and 771 renders tube 119 of trigger circuit 121 conductive, thus opening gating circuit II as described above for addition, so that the pulses of curve 4 begin flowing through line 124 to counter 91, the first pulse to be passed being the one encompassed by the "9" gate (curve $8_9$), since the numbers only gate (curve 12) must rise before "AND" circuit 123 (FIG. 7) is enabled.

Subsequently in the same read-in portion of the first counter cycle, "AND" circuit 244 is enabled by the coincidence of the selected number gate (curve $8_6$) at terminal 593 and the gates of curves 21 and 23, and this in turn causes the enabling of an "AND" circuit 772 (FIG. 7), since terminal 441 is now at ground potential. A positive-going pulse is thus passed through "OR" circuit 174 (FIG. 7) to left-hand grid 125 of tube 120, rendering this tube conductive and shutting off trigger circuit 121 and thus closing gating circuit II, so that the flow of pulses (curve 4) into counter 91 ceases at the beginning of the selected number gate, that is, at "six" time. It will be apparent, therefore, that three (or 9 minus 6) pulses (curve 4) as applied to "AND" circuit 123 (FIG. 7) have been permitted to pass through gating circuit II via line 124 into counter 91 (FIG. 8). In FIG. 5, these three pulses of curve 4 are indicated as solid pulses. If no selected number gate representing the subtrahend digit had arrived at terminal 593 to close gating circuit II before zero time, this gate is invariably closed by the "0" gate (curve $8_0$) which is applied to input terminal 779 of "OR" circuit 174. In this particular instance, a zero in effect would have been subtracted from the minuend digit entered through gating circuit I, so that nine (or 9 minus 0) pulses (curve 4) would have passed through gating circuit II into counter 91.

If the six to be subtracted lies in the units digit position, an "elusive one" pulse must be delivered to the counter. In this case, "AND" circuit 770 (FIG. 8) is enabled as before. Its output also serves as one input of "AND" circuit 271 (FIG. 8). A zero digit gate (curve 18), indicative of the fact that the units order is involved, enables "AND" circuit 271, since input terminal 298 is controlled by a suitable portion of the single-shot gate (curve 23) and input terminal 441 is at ground potential for subtraction, so that gating circuit III is opened by a pulse (curve 2) coincident with these other timed pulses. "AND" circuit 133 (FIG. 8) is thus conditioned to be enabled by the coincidence of one of the third working pulses of curve 3 and the gates of curves 7 and 15, so that a single pulse of curve 3 passes as an "elusive one" pulse via line 134 to counter 91. Immediately thereafter, gating circuit III is closed by a pulse developed in network 137 by the coincidence of a single pulse of curve 4 and these same gates of curves 7 and 15, in readiness to be opened again if the subtraction should call for a carry. The previously mentioned three pulses (curve 4) passed by gating circuit II reach counter 91 subsequent to the "elusive one" pulse, as will be obvious from FIGS. 3*a* and 3*b*, so that, in the example chosen, the combined action of gating circuits II and III supplies a total of four (10 minus 6) pulses to the counter.

In accordance with this procedure, therefore, a tens complement is formed, the number in the highest order digit position always being a nine. This tens complement of the subtrahend is now added, in the manner previously described in connection with addition, to the minuend. If the highest order digit position of the resultant contains a zero, the result is positive, its magnitude being equal to the digits stored in the remaining digit positions. If the highest order digit is a nine, however, the resultant is negative and its value is equal to the tens complement of the remaining digits. The digit in the highest order digit position is otherwise without significance and is discarded.

Subtraction is performed by the arithmetic unit during the machine operations of clearing, converting, and multiplication and division, as will now be briefly discussed.

Clear: Any register may be cleared at will in a single machine cycle by subtracting the number in the register from itself. The register to be cleared is first selected by depressing the proper one of register buttons 404, 405, 414 and 406 (FIG. 15), this in turn providing a suitable gate at terminal 298 (FIG. 7), as explained later in connection with FIG. 11. Then clear button 411 (FIG. 15) is depressed, causing the pickup of clear relay 397 (FIG. 15). As shown in FIG. 16, the resultant transfer of relay contacts 397–*c* and 346–*m* (as will be explained in connection with FIG. 13) causes terminal 441 (FIGS. 7 and 16) to be grounded. This terminal is one input of an "AND" circuit 771 (FIG. 7), the other inputs of which are terminal 298 and the output of "AND" circuit 770 (FIG. 8). Accordingly, when "AND" circuit 770 is enabled by the coincidence of the gates of curves 7 and 15, as previously described, "AND" 771 is enabled and gating circuit II is opened. The gating circuit is closed by digit pulses read from the drum and applied at terminal 480 as one input of an "AND" circuit 773 (FIG. 7). Input terminal 440 is now grounded, due the previous depression of clear button 411, as will be evident from FIG. 16; and input terminal 298, which also appears in FIG. 11, is also grounded. A coincidence of a pulse at input terminal 480 and of the gates of curves 12 and 15, comprising the remaining two inputs, enables "AND" circuit 773 which, via "OR" circuit 174, closes gating circuit II, thus entering into the counter the complement of the number read as described above under subtraction. In the meantime, the same drum signal pulse is applied to terminal 480 of switch **50*a* and enables an "AND" circuit 774** (FIG. 7) which opens gating circuit I, thus entering into the counter the value of the number read. In this way, the tens complement of the whole number in the register is added to the number itself, thereby clearing the register in one machine cycle.

Conversion: The number in a selected register may be replaced by the result of subtracting that number from zero. After selection of the register by depressing the proper one of register buttons 404, 405, 414 and 406 (FIG. 15) convert button 409 is depressed. Gating circuit II (FIG. 7) behaves just as described previously in connection with clearing. Gating circuit I (FIG. 7), however is prevented from opening by the action of an electronic switching circuit comprising a normally non-conductive triode 775 which is rendered conductive by the enabling of an "AND" circuit 776. As shown in FIG. 16, terminal 439 (FIGS. 7 and 16) is grounded during conversion by the transfer of relay contacts 395–*d* and 346–*m*, and terminal 298 is also grounded as explained later in connection with FIG. 11, so that "AND" circuit 776 (FIG. 7) is enabled and the blanking pulses of curve 5 are permitted to render triode 775 conductive to thus disable "AND" circuit 774. Accordingly, trigger circuit 104 is not operated and therefore no pulses pass through gating circuit I into counter 91, so that the number in the register is thus effectively subtracted from zero. Incidentally, an "AND" circuit 783, which is enabled by the rise of the shift gate (curve 14) and the divide gate (curve 17), operates in a manner similar to that just described in connection with "AND" circuit 776 to disable "AND" circuit 774 and hence prevent pulses read from the drum from reaching gating circuit I when the A register is being shifted to the left. During both clearing and conversion, as in subtraction, gating circuit III is opened as necessary to provide an "elusive one" pulse during operations involving the units orders, this being done by "AND" circuit 271 (FIG. 8) as described above, and this gating circuit is closed by the pulses of curve 4 and the gates of curves 7 and 15 as applied in network 137, all as previously described.

Multiplication and division: In the multiply-divide operation, it is necessary to subtract the contents of the B register from that of the A register during the "compute" portion of the operating cycle. Gating circuit II is opened at the proper time by the enabling of an "AND" circuit 777 (FIG. 7) having the compute gate (curve 24) as one of its inputs, its remaining inputs comprising the divide gate (curve 17) and the output of "AND" circuit 770 (FIG. 8). Gating circuit II is closed by the enabling of an "AND" circuit 780 (of switch **45*a*, FIG. 7), whose inputs include the divide gate (curve 17) and the compute gate (curve 24). It is noted that, just prior to this subtraction, gating circuit II had been opened by pulses developed by the enabling of an "AND" circuit 778 and was closed by pulses of the "0" gate (curve $\mathbf{8_0}$) applied at input terminal 779 of "OR" circuit 174, for the purpose of adding the contents of the C register to that of the D register. During the multiply-divide operation, gating circuit III is opened as necessary to provide an "elusive one" pulse during operations involving the units orders, this being done by the enabling of "AND" circuit 272, to input terminal 232 of which is applied the compute gate (curve 24). As previously described in connection with subtraction, gating circuit III is closed by the pulses of curve 4 and the gates of curves 7 and 15 as applied in network 137**.

THE COMPARER UNIT

The detailed circuit diagram of comparer unit 35 (FIG. 2) and its associated circuits are shown in FIG. 9. The pulse output of delay unit 30 (FIG. 2) is supplied to input terminal 175, and input terminal 176 is supplied with the previously mentioned elongated counter output pulses from the same-numbered terminal of arithmetic unit 34 (FIG. 7), these pulses being timed in accordance with the digit stored in the latter unit. Both inputs are supplied to comparer unit 35 only during the first half of each box, that is, when the *b* gate (curve 13) is up. The function of the comparer unit is to compare the two numbers represented by the pulses respectively applied to input terminals 175 and 176, digit by digit as they are transmitted to it and, after the highest order has passed, to provide a positive-going output pulse at an output terminal 177 only if the number applied to input terminal 175 exceeds the number applied to input terminal 176. No output pulse is provided if the numbers are equal in value. Since each digit of the multi-digit number is represented by an appropriately time-spaced pulse, the pulse corresponding to the lowest-value digit occurring last, and since the lowest-order digits are compared first, the problem of comparison reduces itself to determining which of the two input terminals is impulsed last. If this be terminal 176, then an output pulse is obtained. An important feature of the present invention is the provision of apparatus for accomplishing this. Before the comparison of multi-digit numbers is discussed, the operation of the comparer unit will be described for the comparison of individual digits applied to input terminals 175 and 176.

Comparison of individual digits

Terminals 175 and 176 are connected, respectively through "AND" circuits 178 and 179 and cathode followers 180 and 181, to anodes 182 and 183 of a pair of diodes 184 and 185. The pulses of curve 3 are applied to the remaining inputs of "AND" circuits 178 and 179, as shown. In a manner which will be described later, cathodes 186 and 187, respectively of diodes 184 and 185, are established at a potential of approximately −50 volts at the beginning of each box. Likewise, in the absence of any input pulses, anodes 182 and 183 are at approximately −50 volts, these anodes rising to ground level upon the application of input pulses respectively at input terminals 175 and 176.

Let is first be supposed that the digit represented by the pulse applied to input terminal 175 is larger than that represented by the pulse applied to terminal 176. When the positive-going pulse is applied to terminal 175, anode 182 of diode 184 rises to ground level, so that diode 184 becomes conductive and capacitor 188 is charged up to ground potential. Cathode 187 of diode 185 also is brought nearly to ground potential by the pulse transmitted through capacitor 189. After the input pulse at terminal 175 is over, cathode 187 falls back to approximately −50 volts, whereas cathode 186 remains substantially at ground potential due to the charge on capacitor 188. Up to this point, input terminal 176 has remained at approximately −50 volts.

At a subsequent time, under the conditions assumed above, a number pulse appears at input terminal 176, this pulse rendering diode 185 conductive and charging capacitor 189, thus bringing cathode 187 up to ground potential, where it remains. The input pulse applied to terminal 176 is also transmitted through capacitor 188 to cathode 186 which was already at ground potential before the pulse appeared, so that cathode 186 is driven substantially positive with respect to ground. After this, the circuit remains quiescent until the start of the next box when it is reset, as described below, for comparison of the next digit. It will be noted that cathode 186 rises well above ground for a certain period of time, whereas cathode 187 does not rise above ground potential under the conditions as assumed.

If, on the other hand, the number represented by the pulse applied to terminal 176 had been greater than that represented by the pulse applied to terminal 175, the situation would have been reversed. In this case, cathode 187 would have been driven well above ground while cathode 186 would have remained at approximately ground potential. If the two input digits had been equal, neither cathode would have risen above ground, each having been driven to ground potential while the simultaneous input pulses were present and then falling back to −50 volts, since no charge could be forced through diodes 184 and 185 in this case.

For the purpose of initially establishing cathodes 186 and 187 at approximately −50 volts, there is provided an "AND" circuit 190, the inputs of which comprise the gates of curves 7 and 13, and the output of which is connected to grid 191 of a triode 192. Anode 193 of triode 192 is coupled by a capaictor 194 to the two cathodes 195 and 196, respectively of diodes 197 and 198, the anodes 199 and 200 of which are connected respectively to cathodes 186 and 187 of diodes 184 and 185. Cathodes 195 and 196 are also connected through rectifier elements 201 and 202 to a suitable voltage divider or other source of potential adapted to provide approximately +35 volts.

In operation, capacitor 194 is initially charged to a potential of approximately 215 volts, triode 192 being normally nonconductive. At the beginning of each box, the coincidence of the gates of curves 7 and 13 enable "AND" circuit 190 and provide a positive-going pulse, thus rendering triode 192 momentarily conductive and causing its anode 193 to drop sufficiently in potential so that cathodes 195 and 196, and hence anodes 199 and 200 of diodes 197 and 198, reach a potential of approximately −50 volts, thus establishing cathodes 186 and 187 at −50 volts. The purpose of rectifier elements 201 and 202 is to prevent cathodes 195 and 196 from becoming more positive than approximately 35 volts, so that capacitor 194 is charged to approximately 215 volts when triode 192 is nonconductive.

Development of output pulse

For the purpose of developing an output pulse at output terminal 177 (also in FIG. 12) only when the digit applied to input terminal 175 is greater than that at input terminal 176, there is provided a bistable trigger circuit 203 comprising a pair of duel triodes 204 and 205. The left-hand grid 206 of tube 204 is connected through a resistor 207 to cathode 186 of diode 184. Cathode 187 of diode 185 is connected through a cathode follower 208 to the right-hand grid 209 of tube 205. The left-hand cathode 210 of tube 204 and the right-hand cathode 211 of tube 205 are connected to a suitable voltage divider or other source of potential adapted to provide approximately +25 volts.

Whenever cathode 186 of diode 184 rises to a substantial positive value due to the fact that the digit represented at input terminal 175 is greater than that represented at input terminal 176, normally nonconductive tube 204 is rendered conductive by application of a positive potential to its grid 206 and tube 205 is therefore rendered nonconductive. This causes a positive-going pulse to be passed through a triode 212 connected as a cathode follower and having its cathode connected to output terminal 177, so that an output pulse is developed at output terminal 177 of the comparer unit. If, on the other hand, cathode 187 is the one which is at a substantially positive potential with respect to ground or if the input numbers are equal and neither of cathodes 186 and 187 rises in potential, tube 205, which is normally conductive, remains conductive and tube 204 remains nonconductive. In these cases, no pulse is developed at output terminal 177.

Comparison of multi-digit numbers

Let it now be assumed that the number at each input terminal comprises a plurality of digits, these digits being introduced into the comparer unit with the lowest-order digit first. Just before the units digits reach comparer unit 35, trigger circuit 203 is put in its normal condition, that is, with tube 205 conductive, by the application of a positive-going pulse to its grid 209 when an "AND" circuit 213, whose three inputs comprise the gates of curves 15, 17 and 18, is enabled by the coincidence of these gates. If the two incoming multi-digit numbers are equal, no further pulses are delivered to change the state of trigger circuit 203, so that terminal 177 remains at −50 volts thus allowing a "compute" gate to be developed in the next machine cycle, as described below. In general, however, the last pair of digits which gives an indication of inequality is taken as indicative of the relative magnitudes of the two input numbers.

Let it be supposed that the number applied to input terminal 175 is 67,233 and that the number applied to input terminal 176 is 67,154. The numbers are compared, digit by digit. Whenever an individual digit of the number applied to terminal 175 exceeds the corresponding digit of the number applied to terminal 176, tube 204 becomes conductive and tube 205 nonconductive. The normal condition of trigger circuit 203 is restored if a subsequent digit at terminal 176 exceeds the corresponding digit at terminal 175. If the subsequent digit equals the digit at terminal 175, trigger circuit 203 is not operated. This process continues until the highest-order digits have passed through the comparer unit. In the particular example being considered, it will be apparent that the third step, namely the comparison of the "2" in the hundreds order of one number with the "1" in the hundreds order of the other number, will be the last indica- of inequality, and hence the comparison of these two digits causes trigger circuit 203 to be turned on and a plus output to be developed at terminal 177, as just described above in connection with single-digit numbers. Since the fourth and fifth digits from the lowest order in both numbers are equal, however, trigger circuit 203 does not change its status as these two pairs of digits are compared, so that at the end of the comparison of the two entire multi-digit numbers a plus output still exists at terminal 177. Accordingly, the result of the third step governs, the comparer unit shows that the number at input terminal 175 is greater than that at input terminal 176, and a sustained plus output is developed at output terminal 177. This, as will now be described, is employed in conjunction with a first tag to produce a shift gate (curve 14).

Development of shift and compute gates

For the purpose of developing a "shift" gate (curve 14), there is provided a circuit including a bistable trigger circuit 214 comprising a pair of dual triodes 215 and 216. Tube 216 is normally conductive and tube 215 nonconductive. The signals from reading head 27 (FIG. 2) as developed at terminal 480 (also in FIG. 18) serve as one input of an "AND" circuit 218, the other two inputs of which comprise the tag gate (curve 6) and the *a* gate (curve 15). Thus "AND" circuit 218 is enabled only if a first tag, as described later, and occurring at tag, *a* time, is read from the drum. This first tag occurs immediately subsequent to comparison of the highest-order digits of the two multi-digit numbers, and thus signifies that comparison of the entire multi-digit numbers has been completed. If the one applied to terminal 175 is the higher, a shift gate (curve 14) is produced, as will now be described. The output of "AND" circuit 218 provides one input of an "AND" circuit 219, whose other input is connected to comparer unit output terminal 177 and whose output is connected to the left-hand grid 220 of tube 215. When "AND" circuits 218 and 219 are both enabled, tube 215 becomes conductive and a positive-going pulse is passed through a cathode follower 220 to a terminal 221. The signal at this terminal comprises the shift gate (curve 14). It can rise only if the multi-digit number at input terminal 175 exceeds that at input terminal 176, causing development of a plus output at output terminal 177, and if a first tag is present on the drum. Termination of the shift gate will be discussed presently For the purpose of providing a "complete" gate (curve 24), the output of "AND" circuit 218 this time serves as one input of an "AND" circuit 222, the output of which is connected to the left-hand grid 223 of a dual triode 224, which with dual triode 225 forms a bistable trigger circuit 226. Tube 225 is normally conductive and tube 223 nonconductive. Third working pulses (curve 3) are supplied to a second input of "AND" circuit 222. The rectifier element 227, comprising the third input of "AND" circuit 222, is connected to the junction 228 of a resistor 229 and a rectifier element 230, junction 228 being at substantially ground potential except when a shift gate is called for as described below, so that "AND" circuit 222 is enabled except at that time, whenever positive-going pulses arrive from "AND" circuit 218 is coincidence with third working pulses (curve 3). The enabling of "AND" circuit 222 renders tube 224 conductive, thereby causing a posiitve-going pulse to pass through a cathode follower 231 and appear at a terminal 232 as the compute gate (curve 24).

In order to terminate the shift and computer gates, trigger circuits 214 and 226 may be restored to their normal condition, that is, with their right-hand tubes conductive, either by the application of a positive-going pulse by means of an "AND" circuit 233, enabled by the coincidence of the gates of curves 5, 6, 13 and 22, or by the application of a positive-going pulse to a terminal 234 (also in FIG. 12) in a manner to be described later, an "OR" circuit comprising rectifier elements 235 and 236 having its output connected respectively to the right-hand grids of tubes 216 and 225 serving for the purpose.

In order to prevent the development of a compute gate (curve 24) when a shift gate (Curve 14) is called for, as indicated by the presence of a positive-going pulse at terminal 177, such a pulse serves as one input of an "AND" circuit 237, the blanking pulses of curve 5 being its other input, and its output being connected to the grid 238 of a triode 239. Anode 240 of triode 239 is coupled by a capacitor 241 to junction 228 which, as previously stated, is normally at substantially ground potential. Furthermore, grid 238 is normally at a substantially negative potential, so that triode 239 is normally nonconductive and capacitor 241 is charged to approximately 250 volts. When "AND" circuit 237 is enabled by the simultaneous presence of a positive-going pulse at terminal 177 indicative of a shift gate requirement and of a blanking pulse (curve 5), however, triode 239 becomes highly conductive and junction 228 is driven, by the discharge of capacitor 241, to a negative value sufficiently high to disable "AND" circuit 222 at least for the duration of a positive-going pulse from "AND" circuit 218, thus preventing the rise of a compute gate (curve 24).

Thus there is provided, in accordance with an important feature of the present invention, a normally closed electronic switch which utilizes capacitive coupling to minimize the effect of supply-voltage variations on the potential at junction 228. By utilizing the blanking pulse (curve 5) in the manner just described, capacitor 241 may be relatively small since its capacitance is dictated by the relatively short duration of the blanking pulse rather than by the length of the positive-going pulse at terminal 177, which would be the determining factor had the conventional type of inverter circuit been used.

THE CONTROL CIRCUITS

FIG. 10 shows certain recording input circuits and associated switching circuits, including switch 47 and a portion 48*a* of switch 48 (FIG. 2). Terminals 245 and 246 are connected respectively to the outputs of delay units 30 and 31 (FIG. 2). The signals from reading head 27 (FIG. 2), developed as described later in connection with FIG. 18, are supplied to terminal 480. Terminals 298 are supplied with a suitably gated portion of curve 23, developed as described later in connection with FIG. 11. Information signals developed in line 250 are passed through a cathode follower 251 to an output terminal 252. Tag signals reach cathode follower 251 through a line 253, first tags being supplied by the network generally designated 254 and second tags being furnished to a terminal 255 in a manner to be described later in connection with FIG. 12. First tags are developed at the beginning of the second digit interval of a box, and second tags at the beginning of the first digit interval of the box.

Introduction of information signals

When the gates of curves 12, 13 and 19 are all up, "AND" circuit 256 is enabled by the information signals read from the drum and appearing at terminal 480, so that these pulses are supplied via "AND" circuit 257 or 258 and line 250 to output terminal 252, which subsequently leads to the recording amplifier. The former "AND" circuit is enabled by the rise of terminal 435 (see FIG. 16) to ground potential when a shift to the right is called for manually. "AND" circuit 258 is enabled, on the other hand, when comparer unit 35 (FIG. 9) calls for a shift, as indicated by the rising of the shift gate (curve 14) at its terminal 221 (also in FIG. 9), and the multiply gate (curve 16) is up. The manual or the automatic calls for a shift are the only conditions under which undelayed information signals are passed through the recording input circuits for re-recording.

Delayed information signals are transmitted from two different sources. Such signals from delay unit 31 (FIG. 2), applied at terminal 246, are supplied to line 250 whenever "AND" circuit 259 is enabled, that is, whenever switch 48 (FIG. 2) is in its "normal" position. Unless "AND" circuit 260 is disabled in the manner about to be described, delayed information signals from delay unit 30 (FIG. 2) are supplied via terminal 245 to line 250. For disabling "AND" circuit 260, there is provided a triode 261 which, with the associated circuit components, comprises a normally closed electronic switch of the type described previously in connection with FIG. 9. This switch is opened, thus disabling "AND" circuit 260, only when triode 261 is rendered conductive by the enabling of either of "AND" circuits 262 and 263. This occurs when a shift to the right is called for, either manually by the grounding of terminal 435 (see FIG. 16), thus enabling "AND" circuit 262; or automatically by the rising of the shift gate (curve 14) at terminal 221 (see FIG. 9), which enables "AND" circuit 263.

For the purpose of preventing the flow of information signals through line 250 during the time interval devoted to synchronization, there is provided a triode 264 and associated circuit components comprising in combination a normally closed electronic switch which, when "AND" circuit 265 is enabled by the coincidence of the gates of curves 5, 16 and 18, opens and thus disables "AND" circuits 257, 258, 259 and 260. As indicated, triode 264 and "AND" circuit 265 comprise the portion 48*a* of switch 48 (FIG. 2).

Entry of first tag on drum

At the initiation of operation of the machine, a single first tag is entered manually by depressing an operate key 413 (see FIG. 15) which, as described later, applies a positive-going pulse at terminal 434 (see also FIG. 16) to condition an "AND" circuit 266 (FIG. 10), which is also supplied with the single-shot gate (curve 23) as described later. Since a single first tag after being recorded on and read from the drum produces either a compute gate (curve 24) or a shift gate (curve 14), one of these gates conditions one input of each of "AND" circuits 267 and 268, thereby to provide subsequent first tags in a manner to be described later. Due to the action of an "AND" circuit 269, however, "AND" circuits 266, 267 and 268 remain disabled unless the gates represented by curves 6, 15, 16 and 18 are all up simultaneously. This insures the entry of each first tag on the drum at exactly the correct time, that is, at the beginning of the highest order of the D register.

First tags from network 254 as developed at the output of an "OR" circuit 270, as well a second tags which are supplied to terminal 255, are applied to cathode follower 251 through line 253 and appear at output terminal 252, which subsequently leads to the recording amplifier.

The single-shot gate generator

For the purpose of developing a gate (curve 23) which embraces a single complete scan of the information on drum 25 (FIGS. 1 and 2), there is provided a single-shot gate generator, the operation of which is controlled by a single-shot relay 382 as described later in connection with FIG. 14. As shown in FIG. 11, this generator comprises two separate bistable trigger circuits 273 and 274 including respectively dual triodes 275 and 276, and 277 and 278. Normally, tubes 275 and 278 are nonconductive, and tubes 276 and 277 are conductive. An "AND" circuit 279 is provided, having one input selectively connected through relay contacts 382–*c* to the ungrounded terminal of a capacitor 280, this terminal normally being connected to a positive potential source through relay contacts 382–*c*. The other two inputs of "AND" circuit 279 comprise the gates of curves 6 and 15, and its output is connected to the left-hand grid of tube 275. When "AND" circuit 279 is enabled by the rise of the gates of curves 6 and 15 and by the application of the positive charge on capacitor 280 to it, accomplished by the pickup of single-shot relay 382 (see FIG. 14), tube 275 is rendered conductive and tube 276 nonconductive, so that the right-hand grid 281 of tube 275 rises approximately to ground potential. As a result, a capacitor 282 is charged to approximately 50 volts, before the multiply gate (curve 16) applied to its lower terminal 665 rises. When this gate rises to approximately ground potential, however, the charge on capacitor 282 causes the right-hand grid 283 of tube 278 to be driven sufficiently positive so that it becomes conductive. The resultant nonconductivity of tube 277 causes a positive-going shift in the potential of line 284, this change being passed through triode 285 connected as a cathode follower to an output terminal 286. Thus the single-shot gate (curve 23) is initiated at a time determined by the rise of the multiply gate (curve 16) which, as indicated in FIGS. 3*b* and 4, corresponds with the beginning of a machine cycle.

To terminate the single-shot gate, an "AND" circuit 287 and a capacitor 288 are provided. The gates of curves 7, 15 and 22 comprise the three inputs of "AND" circuit 287, and its output is connected through capacitor 288 to the right-hand grid 290 of tube 276 and the left-hand grid 291 of tube 277. Before "AND" circuit 287 is enabled and while line 284 is at approximately ground potential, capacitor 288 is charged through a resistor 289 to approximately 50 volts. When "AND" circuit 287 is enabled by the rise of the gates of curves 7, 15 and 22, the charge on capacitor 288 causes right-hand grid 290 of tube 276 and left-hand grid 291 of tube 277 to be sufficiently positive to render these tubes conductive, thus restoring trigger circuits 273 and 274 to their normal condition and returning line 284 to its normally negative potential, and terminating the single-shot gate (curve 23) at output terminal 286 shortly before the end of the same machine cycle.

The leading edge of the single-shot gate (curve 23) is sharpened by the utilization of a triode 292 as the load impedance of cathode follower 285. A capacitor 293 is connected between anode 294 of triode 285 and grid 295 of triode 292, so that the latter is rendered momentarily nonconductive by the negative-going pulse developed at anode 294 as the potential of line 284 changes in a positive-going direction. Such a circuit arrangement will be referred to henceforth as a "double cathode follower."

For use elsewhere in the computer circuits, a selected portion of the single-shot gate (curve 23) as developed at terminal 286 is provided. For thus providing a selected portion, there is provided an "AND" circuit 296 which controls the voltage applied to the grid of a cathode follower 297 having an output terminal 298. One input of "AND" circuit 296 is connected to terminal 286 and hence is supplied with the complete single-shot gate (curve 23). Its other input is connected to the output of an "OR" circuit 299, whose inputs are provided by the illustrated relay contacts 389–*j*, 392–*c*, 392–*f* and 393–*d*, respectively of relays 389, 392 and 393. The operation of these relays will be discussed later in connection with FIG. 15, but a few brief examples will make the significance of the selected portion clearer. If relay 392 remains unactuated and master clear relay 389 is energized, the selected portion at terminal 298 will comprise all of each single-shot gate, since the upper input of "OR" circuit 299 will be at ground potential throughout the single-shot gate (curve 23). If relay 392 remains unactuated and relay 389 is not energized, as is the case when register A or B is selected since none of relays 389, 392 and 393 is actuated, the selected portion at terminal 298 will comprise the portion equal in extent to a single divide gate (curve 17), since "AND" circuit 296 (FIG. 10) is enabled only during the divide gate applied to it, under these conditions, through unactuated contacts 392–*c* and "OR" circuit 299. The divide gate is so timed as to encompass all the boxes corresponding to the A and B registers. If relay 392 alone is actuated, as for example by the selection of the C or D register by the operator as described later, the selected portion at terminal 298 will comprise a portion equal in extent to a single multiply gate (curve 16), since "AND" circuit 296 is enabled only during this gate under these conditions. The multiply gate is so timed as to encompass all the boxes corresponding to the C and D registers, and this gate is applied through actuated contacts 392–*c* and the lower input terminal of "OR" circuit 299. Thus it will be apparent that whether the gate developed at output terminal 298 is all or only a preselected portion of each single-shot gate (curve 23) depends upon the particular operation to be performed by the machine as dictated by the operator.

Entry of second tag on drum

As stated above, a second tag is developed at the time of the beginning of the first digit in a given box. The apparatus for producing the second tag is shown in FIG. 12. This tag is utilized during entry, during readout and during computing. Its development and use in connection with entry will first be considered.

Briefly, numerical entry starts under control of a second tag entered initially at the highest-order digit position and automatically shifted one digit position, after which numerical entry proceeds digit by digit toward the lowest-order digit, a second tag thus being first introduced into the highest-order digit position and successively shifted to the lower-order positions. In general, the second tag is entered on the drum in such a position that upon reading this tag it initiates a gate which coincides with the particular digit time corresponding to the column to be entered and, after this particular entry is made, the tag is automatically shifted and produces another gate in preparation for entering the next lower digit order. This gate, which is always one box in length but which shifts in position depending upon the digit position to be entered, is called the selected digit gate and, in the particular instance as shown by curve 21, is positioned for access to the fourteenth digit position of the A or B register, that is, $A_{14}$–$B_{14}$. It is generated as described presently only when a second tag is present on the drum, and no more than one selected digit gate is generated in each machine cycle.

The selection of a particular register to be entered is made by depressing one of buttons 404, 405, 414 and 406 (see FIG. 15), respectively corresponding to the A, B, C and D registers. As just stated, the second tag must first be entered into the highest-order digit box of the selected register. Since a pulse is read from the drum effectively one box earlier than it was recorded, the second tag must be recorded at the time that the box immediately following the one at which tag entry is to begin is under the reading head. For example, if entry is to be made into the A or B register, the second tag is introduced when the synchronizing box (FIG. 1) is under the reading head, since this will produce recordation of the second tag in the highest-order digit box $A_{15}$–$B_{15}$ of the A and B registers, as will be apparent from FIG. 1. It should be noted that the time of the synchronizing box is determined by the synchronizing gate (curve 22). In this case, relay 392 (see FIG. 15) is not actuated, so that its contacts 392–*d* (FIG. 12) remain as shown and the synchronizing gate (curve 22) is supplied to an "AND" circuit 303. Since this gate determines the time of the synchronizing box, a second tag can be entered into box $A_{15}$–$B_{15}$. If entry is to be made into the C or D register, however, the second tag is introduced when the lowest order digit box $A_0$–$B_0$ of the A and B registers is under the reading head since, as will be seen from FIG. 1, this will cause entry of the second tag into the highest-order box $C_{30}$–$D_{30}$ of the C and D registers, the timing of box $A_0$–$B_0$ being determined by the coincidence of the divide gate (curve 17) and the zero digit gate (curve 18). Under this condition, relay 392 picks up and transfers its contacts 392–*d* from the position shown in FIG. 12, causing the output of an "AND" circuit 338, representing the coincidence of the divide gate (curve 17) and the zero digit gate (curve 18), to be supplied to "AND" circuit 303. The coincidence of the divide and zero digit gates fixes the time of box $A_0$–$B_0$ and thus produces entry of a second tag in box $C_{30}$–$D_{30}$. Since the actual read-in of information pulses is always made during the second half of the box (see FIG. 5), depressing button 405 or 414, respectively to produce entry into the B or C register, causes "interchange" to take place as described above, so that each of these registers is temporarily caused to occur at the time of the second half of its box instead of in its normal position in the first half. Since the highest-order digit in every register is reserved for sign information, the second tag must next be shifted to the next lower-order digit box before actual numerical entry begins.

The detailed steps involved in introducing a second tag, in connection with entry, will now be set forth and illustrated by a specific example. Let it be assumed that an entry is to be made into the A register. Depressing "A" button 404 (see FIG. 15) to select the A register does not energize relay 392, so that its contacts 392–*d* (FIG. 12) remain as shown and thus the synchronizing gate of curve 22 is applied to one input of "AND" circuit 303. This "AND" circuit 303 will be conditioned by the rise to ground potential of terminal 438 (see FIG. 16) and will be enabled when both the "AND" circuits 301 and 302 become enabled by the rise of the gates of curves 6 and 13 applied to "AND" circuit 301, and the application of a single-shot gate (curve 23) to "AND" circuit 302. As will be apparent from FIG. 16, terminal 438 will rise to ground potential only upon the transfer of contacts 341–*m* of sequencing relay 341 (FIG. 13) and also the transfer of either contacts 386–*f* of 387–*f* or 388–*m*, respectively of plus relay 386, minus relay 387 and readout relay 388 (FIG. 15). It will be obvious, therefore, that no second tag is introduced merely by the selection of the register to be entered. The machine continues to idle.

After selection of the register to be entered but before actual entry therein, the operator must actuate either "plus" button 400 or "minus" button 401 (FIG. 15) to indicate the sign of the number about to be entered. This will selectively energize either plus relay 386 or minus relay 387 to transfer either contacts 386–*d* or 387–*d* (FIG. 13), thus starting the operation of the relay chain, described later in connection with FIG. 13, so that sequencing relay 341 is energized, thus actuating contacts 341–*m* (FIG. 16). Since relay contacts 386–*f* or 387–*f* are also transferred, terminal 438 (FIGS. 12 and 16) rises to ground potential, where it remains for approximately 100 milliseconds before returning to −50 volts. As described later in connection with FIGS. 13 and 14, the operation of the relay chain also causes first and second single-shot gates (curve 23), spaced by about 100 milliseconds, to be developed. For the moment, only the first of these single-shot gates is of interest, this first gate serving to condition "AND" circuit 302 so that, when "AND" circuit 301 is enabled by the rise of the gates of curves 6 and 13 "AND" circuit 303 is enabled and a positive-going pulse comprising the second tag is produced and applied through rectifier elements 300 and 324 to terminal 255 (FIG. 12). After following the path described in connection with FIG. 10 (in which terminal 255 also appears), this positive-going pulse which comprises the second tag is initially recorded on the drum at the time that the synchronizing box (FIG. 1) is under the reading head, so that the second tag will be recorded in box $A_{15}$–$B_{15}$.

Re-recording of second tag

The machine now continues to idle for several cycles, the second tag being read and, after a one-box delay, re-recorded in the same box from which it was read, that is, box $A_{15}$–$B_{15}$, during each of these cycles. A selected digit gate rises during each cycle under control of the second tag as read from the drum, and this gate is utilized to provide this delay. How the selected digit gate is developed, and its utilization to provide this delay, will now be described.

In order to develop the selected digit gate (curve 21), the drum signals produced by reading the second tag are applied to a first input terminal 480 of an "AND" circuit 305 (FIG. 12). Its second input terminal 442 (see FIG. 16) is normally at ground potential. Its third input terminal is connected to the output of "AND" circuit 301 and hence is at ground potential whenever both of the gates of curves 6 and 13 are up. Thus "AND" circuit 305 is enabled by the reading of the second tag pulse during *b* time, its output serving as one input of an "AND" circuit 306, the other input of which comprises a third working pulse (curve 3). The enabling of "AND" circuit 306 by the presence of this third working pulse renders a normally nonconductive triode 307 conductive, and partially discharges a capacitor 308 connected to its anode through the left-hand portion of a double diode 311. Since the left-hand anode of tube 311 is at −50 volts, the upper terminal of capacitor 308 cannot go below approximately −50 volts. Grid 309 of a triode 310 operating as a cathode follower is connected to this terminal, and hence this grid remains at approximately −50 volts. At the end of the third working pulse (curve 3), "AND" circuit 306 is disabled, triode 307 becomes nonconductive, the charge on capacitor 308 is only partially restored, and grid 309 rises to approximately +15 volts. This marks the beginning of the selected digit gate (curve 21), which is developed at output terminal 313 connected to the cathode of cathode follower 310. When "AND" circuit 314 (FIG. 12) is enabled by the rise of the gates of curves 2, 6 and 13, a triode 315 is rendered conductive, and a negative-going pulse is applied, through a capacitor 316 and the right-hand diode of tube 311, to capacitor 308, thus completing the recharge of this capacitor and returning grid 309 to approximately −50 volts. This marks the end of the selected digit gate (curve 21) at terminal 313 produced under control of the recorded second tag. Since coincidence of the tag and *b* gates (curves 6 and 13) occurs only once in each box and this coincidence is required both to begin and to end the selected digit gate, this gate is one full box in length, namely 160 microseconds. The selected digit gate initiated by reading the recorded second tag, in the manner just described, therefore, encompasses the highest-order digits of the A and B registers, that is, $A_{15}$–$B_{15}$.

In general, as in the case of the information pulses, a delay of one box is introduced between the reading and the re-recording of the second tag. Since the selected digit gate is exactly one box in length and its rise corresponds with the reading of the second tag, the end or fall of this gate is utilized as an indication of the proper time to again record the tag so that it is recorded in the same box. This is accomplished in the following manner. The selected digit gate (curve 21) which appears at output terminal 313 (FIG. 12) is also applied, through triodes 317 and 318 coupled by a capacitor 319, as a first input of an "AND" circuit 320. Since triode 317 operates as an inverter and triode 318 as a cathode follower, the fall of the selected digit gate (curve 21) raises this first input to ground potential. The output of "AND" circuit 301 serves as the second input of "AND" circuit 320, the third input normally being maintained at ground potential by an electronic switch comprising triode 321 and associated circuits. The output of "AND" circuit 320 is connected to output terminal 255. Accordingly, the fall of the selected digit gate (curve 21) normally causes a second tag, thus delayed by one box, to be developed at output terminal 255. This delayed second tag would, during normal idling conditions, thus be re-recorded in the same box, $A_{15}$–$B_{15}$, from which it was initially read. This would be the desired condition during idling operation, where it is desired that a second tag, once introduced into a given box, shall remain unchanged in position.

Right-shifting of second tag

Under certain conditions, one of them being just prior to the beginning of numerical entry as mentioned above, it is necessary to advance the recorded second tag by one box. This may be called a right shift. This is done by causing the tag as read to be re-recorded immediately without the introduction of the above-described one-box delay. In general, the generation of a single-shot gate (curve 23) is utilized to accomplish this shift, in the following manner. Terminal 480 (FIG. 12), to which all signals read from the drum are applied, is also connected to the first input of an "AND" circuit 322. Terminal 442, normally grounded, connects to the second input, and the third input is provided by the output of "AND" circuit 302. If "AND" circuit 301 is enabled by the rise of the gates of curves 6 and 13, and a second tag as read from the drum is present at terminal 480, "AND" circuit 322 will be enabled when a single-shot gate (curve 23) is present at the input of "AND" circuit 302. The resultant pulse at the output of "AND" circuit 322 is supplied directly through rectifier elements 323 and 324 to output terminal 255, so that a second tag is re-recorded at the same time it is read. Looking at FIG. 1, it is seen that a second tag, originally recorded in box $A_{15}$–$B_{15}$, will thus be re-corded in box $A_{14}$–$B_{14}$. For the purpose of opening the delay path normally followed by each tag as it is read, and "AND" circuit 325 (FIG. 12) is enabled by the rise of the gates of curves 5 and 23, causing triode 321 to become conductive and thus disabling "AND" circuit 320 by dropping one of its inputs to approximately −50 volts. The only tag recorded under these conditions, therefore, is the right-shifted or undelayed one. This right shift of the tag causes the selected digit gate (curve 21) to rise one box earlier than it otherwise would, a condition which remains unchanged as operation continues.

Returning again to the specific example under consideration, it will be recalled that the machine is idling with a second tag standing in box $A_{15}$–$B_{15}$. Since the highest-order digit, as stated above, is reserved for sign information, the second tag must next be shifted from box $A_{15}$–$B_{15}$ to box $A_{14}$–$B_{14}$ before the actual entry of information is begun in box $A_{14}$–$B_{14}$. To automatically accomplish this particular shift of the second tag, use is made of the above-mentioned second single-shot gate which is now developed by the relay train, as described in detail later, about 100 milliseconds having elapsed since the previously discussed first single-shot gate was developed and terminal 438 (FIGS. 12 and 16) having returned to −50 volts in the meantime. This second single-shot gate is utilized, in the manner just described above, to cause the second tag to shift one box to the right under these particular circumstancse. Thus the tag read from box $A_{15}$–$B_{15}$ is re-recorded in box $A_{14}$–$B_{14}$, so that it will be read during the idling cycles which follow at box $A_{14}$–$B_{14}$ time, and the machine is now ready for numerical entry to begin as soon as the operator depresses one of the number keys 370–379 (FIG. 14).

Entry may now be made in the fourteenth digit position of the A register, in the manner described later in connection with FIGS. 14–16. As a key is depressed to determine each item of information to be entered, a single-shot gate (curve 23) is generated, thus shifting the second tag one more box to the right. In this manner entry proceeds digit by digit, until the zero digit position of the A register is entered. At this time the second tag is read when box $A_0$–$B_0$ is under the reading head, and a corresponding single-shot gate (curve 23) is generated, so that "AND" circuit 322 is enabled as just described. The output of "AND" circuit 322 also serves as one input of an "AND" circuit 326, the zero digit gate (curve 18) serving as the other input. Since the zero digit gate will now be up, "AND" circuit 326 is enabled. The resultant positive-going pulse at its output is applide through an "OR" circuit 337 to the gride of a triode 327, and is also applied directly to terminal 234 (also in FIG. 9). This causes a gas tetrode 328 (FIG. 12) to fire, since its control grid is coupled to the anode of triode 327, so that a relay 329 in the anode circuit of tetrode 328 is picked up, assuming that the anode circuit of tetrode 328 is energized by the illustrated relay contacts of a network generally designated by reference numeral 335, which also supplies a terminal 336. The transfer of this relay 392 returns terminal 442 (FIGS. 12 and 16) to −50 volts, thus disabling "AND" circuits 305 and 322. Thus the second tag is not re-recorded on the drum and entry is completed.

The circuits just described function in a similar manner during read-out, since during read-out a selected digit gate is also required and it must be shifted digit by digit until the zero digit is read out.

Utilization of tags

During a computing operation, first and second tags are employed for control. The presence of the first tag on the drum enables the computation to proceed, and the removal of this tag returns the machine to its idling state. The second tag is used during a computing operation to count the number of shifts performed during the calculation and to stop the calculation when the fifteenth shift is called for. This just-described second utilization of the tags, in addition to their first use to designate into which position a digit is to be entered or from which position it is to be read, as previously described, comprises an important feature of the present invention.

The first tag is recorded as described in connection with FIG. 10, but upon being read from the drum does not flow through the delay channel of FIG. 12, which is employed only with second tags. Instead, the first tag appears at terminal 480 (FIG. 9) and enables "AND" circuit 218, causing the development of either a shift gate (curve 14) at terminal 221 or a compute gate (curve 24) at terminal 232, depending upon the result of the comparison operation, as described in connection with FIG. 9. Since no delay channel is provided for the first tag, special provision must be made for recording another first tag one box later. This is accomplished by "AND" circuits 267 and 268 (FIG. 10), one or the other of which is enabled because either a compute gate (curve 24) or a shift gate (curve 14) is present at all times as the computing operation proceeds. Thus the first tag is read and forces either the shift gate or the compute gate to rise, conditioning "AND" circuit 268 or "AND" circuit 267, respectively. The subsequent enabling of "AND" circuit 269 by the coincidence of the next tag gate (curve 6) and the next *a* gate (curve 15), which occurs one box later, enables previously conditioned "AND" circuit 267 or 268. The resultant positive-going pulse is recorded as another first tag.

As shown in FIG. 12, an "AND" circuit 330 is provided. Its first input is connected to the output of "AND" circuit 302, its second input connects to terminal 434, and its third input is supplied with the gate of curve 20. When the computing operation is manually initiated by the rise to ground potential of terminal 434 (as described later in connection with FIG. 16) and "AND" circuit 302 is enabled as previously described, "AND" circuit 330 is enabled and thereby applies a second tag, occurring under the gate of curve 20, through rectifier elements 331 and 324 to output terminal 255. This second tag re-records through the delay produced in the arrangement of FIG. 12, as previously described in connection with entry. During the compute cycles, the second tag merely reads and records with this delay and hence is not shifted. During the shift cycles, however, the second tag must be shifted to the right under control of the shift gate (curve 14). For this purpose, an "AND" circuit 332 (FIG. 12) is provided, it being supplied with blanking pulses (curve 5) and the shift gate (curve 14), and its output serving, through triode 321, to disable "AND" circuit 320 to prevent the normal delay from occurring, this being the same function that "AND" circuit 325 performed during entry. Similarly, an "AND" circuit 333, supplied from the output of "AND" circuit 305 and with the shift gate (curve 14) at its input terminal 221, and having its output connected to terminal 255, now corresponds to "AND" circuits 302 and 322, thus providing a path without delay for re-recording the second tag when "AND" circuit 333 is enabled by the rise of the shift gate (curve 14).

After fourteen shifts, the second tag will have moved to the right until it is reading in zero digit time (approximately 80 microseconds after the time of rise of either the compute gate of curve 24 or of the shift gate of curve 14). Upon the call for the fifteenth shift, the computing operation is stopped by removing both the first and second tags from the drum. This is done in the following manner, utilizing an "AND" circuit 334 (FIG. 12) having four inputs. On the call for the fifteenth shift, the first tag would normally cause the shift gate (curve 14) to rise as previously described in connection with FIG. 9. However, the second tag as read in zero digit time and applied to terminal 480 (FIG. 12) is present at the output of "AND" circuit 305 and comprises one input of "AND" circuit 334. The zero digit gate (curve 18) is up at this time, the call-for-shift pulse is present at terminal 177 (also in FIG. 9), and terminal 434 is at ground potential, so that all four inputs of "AND" circuit 334 are thus up and a positive-going pulse is delivered through "OR" circuit 337 to terminal 234 (also in FIG. 9), thus restoring trigger circuits 214 and 226 (FIG. 9) to their normal condition and turning off the shift and compute gates. Hence it is no longer possible to record the first tag under control of the shift gate by means of "AND" circuit 268 (FIG. 10) or under control of the compute gate by means of "AND" circuit 267, (FIG. 10), and thus the first tag is effectively removed from the drum. The shift and compute gates cannot rise unless a first tag is on the drum. Since the output pulse from "AND" circuit 334 (FIG. 12) is also applied to the grid of triode 327, gas tetrode 328 fires and actuates relay 329, thus removing the second tag from the drum as described above in connection with entry. In this way, the first and second tags are removed from the drum and the computation is effectively stopped after fourteen shifts have occurred.

The sequencing circuits

As shown in FIG. 13 of the drawings, the sequencing circuits comprise a plurality of relays 341–348 arranged in a train. Each relay is preferably of the fast-acting, wire-contact type. The contacts on the relays are used to initiate various operations in the computer which are necessarily sequenced. The relays pick up successively from left to right in two groups or sequences, the first group comprising relays 341–345 and the second relays 346–348. Within each group, the pickup of a given relay causes the release of the preceding relay. Also, the pickup of relay 346, the first of the second group, causes the release of relay 345, the last of the first group.

Operation of the relay train is initiated by the manual operation of "plus" button 400, "minus" button 401, or "read-out" button 402, these buttons respectively actuating relays 386, 387 and 388, as described later in connection with FIG. 15. The resultant transfer of any one of relay contacts 386–*d*, 387–*d* and 388–*d* (FIG. 13) causes the discharge of a capacitor 349, normally connected to a source of positive potential when these relay contacts are in their normal positions, through the pickup coil of a relay 350. The pickup of this relay transfers its contacts 350–*f*, which permits a normally charged capacitor 351 to discharge through contacts 345–*a*, in normal position, into the pickup coil of a start relay 352. The pickup of relay 352 transfers its contacts 352–*a* and causes a capacitor 363 to be first charged and, when relay 352 releases so that contacts 352–*a* return to normal position, to be discharged, this discharge energizing the pickup coil of the first relay 341 of the chain. Relay 352 cannot release if typewriter controller contacts 364, in series with the hold coil and hold contacts 352–*e* of relay 352, are closed, contacts 364 being closed whenever the carriage of the typewriter associated with the computer is in motion during tabulating. Furthermore, relay 352 is prevented from releasing if relay 345, the last relay in the first group of the relay chain, is picked up unless single-shot relay 382 is also actuated, as described presently in connection with FIG. 14. This is true because normally open contacts 345–*b* and normally closed contacts 382–*b* are in series with hold contacts 352–*e* and the hold coil of relay 352. Otherwise, relay 352 releases as soon as capacitor 351 discharges.

According to an important feature of the present invention, the pickup of the first relay 341 of the sequence relays closes its contacts 341–*f* to permit a capacitor 353 to be charged, during a first time interval, provided a relay 354 also picks up and transfers its contacts 354–*f*, as described presently. The release of relay 354, as presently described, permits its contacts 354–*f* to return to normal position, as shown, which causes capacitor 353 to discharge, during a second time interval, through these contacts 354–*f* and the previously closed contacts 341–*j*, into the pickup coil of the second relay 342 of the chain, causing this relay to pickup. The pickup of relay 342 transfers its contacts 342–*g*, breaking the hold circuit of the first relay 341 through contacts 341–*k* and thus releasing this relay.

The remaining relays of the chain operate in a similar manner, a step from one relay to the next in each group taking place whenever relay 354 is momentarily picked up and released, as presently described. Like relay 341, relays 344 and 347 are energized by the discharge of capacitor 353, through contacts 354–*f* and respectively contacts 343–*c* and 346–*g*. Relays 343, 345 and 348 are energized by the dischargre of another capacitor 355, through contacts 354–*g* and respectively contacts 342–*d*, 344–*b* and 347–*a*. The pickup of relay 343 transfers contacts 343–*d*, thus releasing relay 342 by opening its hold circuit including contacts 342–*k*. The transfer of contacts 343–*d* also permits capacitor 353 to be charged again through contacts 354–*f*. Likewise, the pickup of relay 344 transfers contacts 344–*c*, thus releasing relay 343 and permitting capacitor 355 to be recharged through contacts 354–*g*. The pickup of relay 345 opens contacts 345–*l*, thus releasing relay 344. The pickup of relay 346 transfers contacts 346–*b*, opening the hold circuit of relay 345 including contacts 389–*l* and 345–*k* and causing its release, and also permitting the recharging of capacitor 353 through contacts 354–*f*. The pickup of relay 347 transfers contacts 347–*c*, and hence releases relay 346 and permits capacitor 355 to be charged again through contacts 354–*g*. The pickup of relay 348 opens contacts 348–*c* to release relay 347. It will be apparent, therefore, that in general each relay picks up only if the preceding relay has previously been energized and, as soon as it picks up, breaks the hold circuit of the preceding relay to cause its release.

It is to be noted, however, that relay 346, the first relay of the second group, is picked up either by the actuation of relay 329, as described in connection with FIG. 12, which closes contacts 329–*d* and connects the output of network 355 (FIG. 12) appearing at terminal 336 (FIGS. 12 and 13) to this relay coil; or by the discharge of a capacitor 356, normally charged through relay contacts 397–*a*, 395–*a* and 394–*a* in their normal positions, by the actuation of one of relays 397, 395 and 394 as described later in connection with FIG. 15. The release of relay 348, at the end of the second sequence, is accomplished by the opening of contacts 354–*k* when relay 354 is energized subsequent to the energization of relay 348.

The relay oscillator

For the purpose of timing the intervals between successive steps along the relay chain, there is provided a relay 357 which acts jointly with relay 354 to provide a free-running relay oscillator. Operation of the oscillator is initiated by the previously described pickup of start relay 352, the transfer of its contacts 352–*c* supplying +120 volts through a resistor 360, normally closed relay contacts 354–*h* and a resistor 359 to charge a capacitor 358. The release of relay 352 after its above-described momentary energization permits contacts 352–*c* to return to normal position, as shown, to close a discharge path whereby capacitor 358 discharges through the winding of relay 357, this relay remaining picked up for a time determined by the value of resistors 359 and 360 in this discharge path of capacitor 358. The pickup of relay 357 transfers contacts 357–*b* which supplies +120 volts through a resistor 362 thus to charge a capacitor 361. Upon the release of relay 357, contacts 357–*b* return to normal position, as shown, thereby closing a discharge path for capacitor 361 through the coil of relay 354, causing this relay to pick up. Relay 354 in turn releases after a time interval determined by the value of resistor 362 in the discharge path of capacitor 361. While relay 354 is picked up, the above-mentioned capacitor 358 is charged through contacts 350–*c*, which are transferred from the position shown by the energization of relay 350 as previously described. Upon the timed release of relay 354, capacitor 358 discharges through relay 357 to thus energize it, and the operative cycle repeats itself.

Thus relays 354 and 357, with the associated circuit components, provide an arrangement which causes relay 354 to be picked up and released with a predetermined periodicity. Since the charging and discharging of capacitors 353 and 355, which drive the relay chain, as described above, is controlled by relay 354 by means of contacts 354–*f* and 354–*g*, the rate at which the relay train operates depends directly upon the periodicity of this relay oscillator comprising relays 354 and 357. The provision of this relay oscillator and its utilization for timing the operation of the relay chain, therefore, comprises an important feature of the present invention.

Relay control circuits

The relay control circuits of the computer are shown in FIGS. 14, 15 and 16. Referring first to FIG. 14, in order to select a desired number to be entered into a selected register of the computer, four number relays 366–369 are provided. The use of these relays to select the appropriate number gate, needed for entering the desired number, will be discussed later in connection with FIG. 21. These relays are controlled by a group of ten number push buttons designated 370–379 and corresponding respectively to the digits 0, 1, 2, 3, 4, 5, 6, 7, 8 and 9. For each single digit value, the four relays 366–369 assume a different pattern. As shown, with the machine in the idling condition, relays 366 and 368 are energized while relays 367 and 369 are released. This is the particular pattern of these four relays which corresponds to the digit "0." Hence it is obvious that depression of the "0" button 370 causes no change in the shown relay pattern. Upon depression of any one of the remaining buttons 371–379, however, relays 366–369 are caused to assume a unique pattern corresponding to the desired digit. Thus, with only four relays to represent ten different digits, it will be apparent that the well-known coded decimal technique is utilized.

For the purpose of invariably providing a single-shot gate (curve 23) immediately after any number button is depressed, there is provided a capacitor 380 which, as is seen from the relay contact arrangement illustrated in FIG. 14, is normally charged through "0" button 370 and relay contacts 369–*d*, 368–*d*, 367–*d* and 366–*a* in series. When any one of the number buttons 370–379 is depressed, capacitor 380 discharges through a rectifier element 381, causing a single-shot relay 382 to pick up momentarily. Upon the release of such depressed number button, capacitor 380 is again charged in preparation for the next cycle of operation. Relay 382 may also be energized at other times during the operation of the computer, the relay contact network generally designated by reference numeral 383 being provided for this purpose. Such operations are, for example, shift left, operate and interchange.

Turning now to FIG. 15, there is shown a group of fourteen control relays 386–399 which may be designated operation relays. These relays are respectively directly under the control of operation buttons 400–413, so that depressing a given one of these buttons causes the corresponding relay to pick up. For example, depressing operate button 413 causes the pickup of relay 399 which, in turn, transfers relay contacts 399–*a* (FIG. 16), thereby producing a positive-going pulse on terminal 434. Additional buttons 414, 415 and 416 are provided for respectively entering the C register, accomplishing interchange, and turning off the typewriter associated with the computer.

Relays 386–389 and 394–397 remain picked up as long as contacts 350–*b* of hold relay 350 (FIG. 13) remain closed. Relays 390, 391 and 392 hold until released by the opening of either contacts 348–*d* of relay 348 (FIG. 13), the last of the second series of sequence relays, or contacts 389–*e* of master clear relay 389 (FIG. 15). Relay 393 has no hold contacts and remains energized only as long as the operator's finger remains on shift left button 407. Relay 398 holds until typewriter-off button 416 is depressed. Relay 399 is provided with a special hold circuit including contacts 346–*l* of sequence relay 346 (FIG. 13), contacts 389–*m* of relay 389 (FIG. 15), and contacts 329–*f* of relay 329 (FIG. 12).

Selection of a particular register into which a digit is to be entered is made by depressing one of four buttons 404, 405, 414 and 406 (FIG. 15), corresponding respectively to registers A, B, C and D, as discussed in connection with FIG. 12. Depressing button 404 picks up relay 390. Button 405 causes the pickup of relay 391. Due to the presence of rectifier elements 417 and 418, the depressing of button 414 picks up both of relays 391 and 392. Depression of button 406 picks up relay 392 only, due to rectifier element 418. Rectifier elements 419, 420 and 421 are provided so that relays 390, 391 and 392 are all released when interchange button 415 is depressed.

Referring to FIG. 16, the blocks 424, 425, 426 and 427 shown therein correspond respectively to the solenoids in the typewriter associated with the computer which actuate the minus key, the carriage return, the tabular key, and the key lock. Whenever typewriter-on relay 398 (FIG. 15) is energized, +120 volts are applied through closed contacts 398–*c* (FIG. 16) to a terminal 428 and also to key-lock solenoid 427, thus unlocking the keys to make manual operation of the typewriter possible, if desired. The remaining solenoids are energized when the relay contacts respectively associated with them are closed. Solenoid 424 is energized when it is desired to indicate that the number written by the typewriter is negative.

Capacitor 429 is maintained normally in a charged condition by the circuit as shown and, when relay contacts 391–*l* are transferred by energization of relay 391 (FIG. 15) by depressing either of buttons 405 and 414 corresponding respectively to the B and C registers, a discharge circuit for capacitor 429 is provided through a rectifier element 430 and the coil of an interchange relay 431 (FIG. 16), causing this relay to pick up and thus providing the automatic interchange which is necessary when the B or C register is to be entered. Relay 431 may also be energized by the relay contact network designated generally by reference numeral 432, during such operations as master clearing and right shifting, under control of the designated contacts of the sequencing and control relays of FIG. 13.

For the purpose of furnishing enabling voltages to various portions of the computer, there are provided a series of terminals 433–442. These terminals are normally maintained at approximately −50 volts, and may be selectively brought to approximately ground potential by actuation of the relay contacts respectively associated with them. Such actuation of the relay contacts is accomplished at appropriate times by the above-described relay sequencing and control circuits of the computer. Terminals 433–442 are connected to correspondingly numbered terminals throughout the circuit diagrams already described or to be described hereinbelow.

Operation of relay sequencing and control circuits

The operation of the relay sequencing and the relay control circuits of FIGS. 13–16 may be better understood by consideration of a specific example. Let it be assumed that a digit five is to be entered and further that this entry is to be made into next to the highest-order digit position of the A register of the computer, the highest order being reserved for sign information. The A register is first selected by depressing keyboard button 404 (FIG. 15). This causes relay 390 to pick up and hold. Since the five is to be added to the digital information already in the A register, if any, it is next necessary to depress "plus" button 400 on the keyboard, thus initiating a sequence of events within the relay portions of the computer, as follows. First plus relay 386 picks up, which through its contacts 385–*d* (FIG. 13) causes hold relay 350 (FIG. 13) to pick up. Relay 350, through its contacts 350–*b* (FIG. 15), holds plus relay 386 picked up through its contacts 386–*k* even though the operator's finger is now removed from keyboard button 400. Hold relay 350 itself is held by a relay contact network, as shown in FIG. 13. In picking up, hold relay 350 by means of its contacts 350–*f* (FIG. 13) causes start relay 352 to pick up as described above, and this relay in turn, through its contacts 352–*c*, causes the relay oscillator comprising relays 354 and 357 to begin oscillating, all as previously described.

Start relay 352 (FIG. 13) also causes the relay sequencing chain comprising relays 341–345 to start operating, the timing of the chain, as stated above, being controlled by the oscillation of relays 354 and 357. Relays 341–345 pick up sequentially, each relay dropping out as the one following it picks up, until the fifth relay 345 of the sequence is energized, pickup of relay 345 causing relay 344 to release, but relay 345 remaining energized until entry into the selected A register is completed.

Sequence relay 341 in picking up closes its contacts 341–*c* (FIG. 14). When oscillator relay 354 is energized, as described above, its contacts 354–*d* (FIG. 14) are closed. Hence a circuit is closed to single-shot relay 382 (FIG. 14), whereby operation of its contacts 382–*c* produces a first single-shot gate (curve 23) in the manner described above. The pickup of relay 341 also transfers contacts 341–*m* (FIG. 16) so that, since plus relay 386 (FIG. 15) is already energized and its contacts 386–*f* (FIG. 16) accordingly transferred, terminal 438 (FIG. 16) is grounded. This grounding of terminal 438 (see also FIG. 12) produces a second tag at terminal 255 (FIGS. 10 and 12) which is fed via terminal 252 (FIG. 10) to recording head 26 (FIG. 2) whereby, as described above, the second tag is entered when the synchronizing box is under the reading head, so that the second tag is recorded in box $A_{15}$–$B_{15}$ (FIG. 1).

When sequence relay 342 (FIG. 13) picks up in sequence, its contacts 342–*c* (FIG. 14) are transferred so that, when oscillator relay 354 is energized again and its contacts 354–*d* (FIG. 14) are transferred, single-shot relay 382 (FIG. 14) is again energized, producing a second single-shot gate (curve 23) approximately 100 milliseconds after the first one, just mentioned. This second single-shot gate causes the second tag as read from the drum to be re-recorded without delay in the manner described above, so that the tag recorded in box $A_{15}$–$B_{15}$ and read one box earlier in $A_{14}$–$B_{14}$ time is immediately recorded in box $A_{14}$–$B_{14}$. In this particular example, the sequential operation of relays 343 and 344 does nothing useful. However, as soon as relay 345 is sequentially picked up and held, the computer is ready to receive digital information.

The pickup of relay 345 (FIG. 13) transfers its contacts 345–*a* and, since plus relay 386 (FIG. 15) is already energized and its contacts 386–*m* (FIG. 13) accordingly closed, start relay 352 will be energized through normally closed contacts 329–*c* when contacts 354–*m* are closed by the pickup of oscillator relay 354. The pickup of relay 352 transfers its contacts 352–*c*, thus interrupting the oscillation of relays 354 and 357, previously started in operation as described above. Start relay 352 is held through its closed contacts 352–*e*, actuated contacts 345–*b* and normally closed contacts 382–*b* as shown.

The operator now depresses "five" button 375 (FIG. 14), causing the following chain of events to take place. Selected number relays 366 and 368 (FIG. 14), normally energized, are released. As will be described later in connection with FIGS. 21–23, the release of these two relays causes a series of "five" gates (curve $8_5$) to be generated at selected number terminal 593 (FIG. 21) only during the second half of each box when the *a* gate (curve 15) is up. Furthermore, the release of relay 366 (FIG. 14) provides a path whereby capacitor 380 discharges through single-shot relay 382, again picking this relay up momentarily to thus transfer its contacts 382–*c* (FIG. 11) and thereby produce one single-shot gate (curve 23) at terminal 286. At this time a selected digit gate (curve 21), produced under control of the second tag read at $A_{14}$–$B_{14}$ time, appears at terminal 313 (FIG. 12), thereby designating the position in the A register into which it is desired to make an entry.

Referring now to FIG. 7, "AND" circuit 224 is supplied with this last-mentioned single-shot gate (curve 23), with the selected digit gate (curve 21) which will permit entry only into the fourteenth order of the A register, and with the selected number gate (curve $8_5$) which represents the five in the problem chosen. Its output serves as one input of an "AND" circuit 339 having its other input connected to terminal 437. As will be seen from FIG. 16, terminal 437 is now grounded through transferred contacts 386–*f* of plus relay 386 (FIG. 14), now energized as described above. Accordingly, the triple coincidence of the three gates supplied to "AND" circuit 244 enables it, in turn enabling "AND" circuit 339. Hence a positive-going pulse is applied to grid 118 of tube 119, and trigger circuit 121 is turned on at "five" time during the selected digit gate time. As described previously in connection with FIG. 7, this causes a five to be entered into the desired order of the selected A register, which in this case is the fourteenth order.

The momentary pickup of single-shot relay 382, just mentioned, opens its normally closed contacts 382–*b* (FIG. 13) and hence breaks the hold circuit of start relay 352, thus releasing it so that contacts 352–*c* transfer and cause capacitor 358 to discharge through contacts 354–*h*, now in normal position due to the previously mentioned interruption of relay oscillation and consequent release of relays 354 and 357, into the coil of oscillator relay 357. Relay 357 thus picks up momentarily, causing capacitor 361 to be charged through its transferred contacts 357–*b*, and then, upon release, permits the charge on capacitor 361 to energize relay 354 through contacts 357–*b* in normal position. When relay 354 picks up, thus closing its contacts 354–*m*, start relay 352 is again energized through now closed contacts 386–*m*, now closed contacts 354–*m*, normally closed contacts 329–*c*, and now transferred contacts 345–*a*. When start relay 352 picks up, the oscillation of relays 354 and 357 is terminted by the resultant transfer of contacts 352–*c*. This single additional oscillation of relays 354 and 357 is necessary to provide timing pulses for controlling the operation of the typewriter associated with the computer, as described later in connection with FIG. 27. In the meantime, the last-mentioned single-shot gate (curve 23) has shifted the second tag to the $A_{13}$–$B_{13}$ box, so that the machine is now ready to accept another digit in the next lower order of the A register.

Entry may now proceed digit by digit until an entry is made into the zero digit position. As explained above in connection with FIG. 12, relay 329 now picks up and the second tag is automatically removed from the drum, so that entry is completed. As previously stated in connection with FIG. 13, the closing of relay contacts 329–*d* causes the pickup of sequencing relay 346, thus releasing relay 345 by the transfer of relay contacts 346–*b*. Relay 346 is held through contacts 346–*k* and 347–*c*. The opening of relay contacts 345–*b* releases start relay 352, thus starting the relay oscillator again, so that the chain operation of the remaining seqeuncing relays 346, 347 and 348 begins. When the least relay 348 picks up, the opening of contacts 348–*b* causes hold relay 350 to release, and the opening of contacts 348–*d* (FIG. 15) causes register selection relay 390 to release. When hold relay 350 (FIG. 13) releases, contacts 350–*b* (FIG. 15) open, thus releasing plus relay 386 and also release relay 394, whose operation will be described below. The machine is thus restored to its idling condition in readiness for the next operation.

Let it now be assumed that only an incomplete entry has occurred, that is, there are one or more digit positions remaining into which no digit entry is to be made. Under this condition, the operator must terminate the entry operation by depressing release button 408 (FIG. 15). This causes the pickup of release relay 394, and this relay holds through relay contacts 350–*b*. The transfer of relay contacts 394–*a* (FIG. 13) causes the discharge of capacitor 356 into sequencing relay 346, causing this relay to pick up and begainning the series of operations just described. The pickup of relay 346 also transfers contacts 346–*a* (FIG. 16), thus returning terminal 442 to −50 volts and disabling "AND" circuits 305 and 322 (FIG. 12), so that the second tag is removed from the drum. As before, the machine is thus restored to its idling condition by the release of relays 345, 350, 352, 386 and 390.

THE HEAD AMPLIFIERS

Head amplifier unit 40 (FIG. 2) includes a recording amplifier which drives recording head 26 and which is shown in detail in FIG. 17, and a reading amplifier which is supplied with the output of reading head 27 and which is shown in detail in FIG. 18.

The recording amplifier

Referring first to FIG. 17, the recording amplifier comprises triodes 445 and 446, a dual diode 447, a triode 448 arranged to operate as a cathode follower, and a pentode 449. Input signals from the calculator are applied to an input terminal 450 (also in FIG. 19) connected to the grid of triode 445, and first working pulses (curve 1) are applied to a terminal 554 connected to the grid of triode 446.

Let it first be assumed that no input pulse is present at terminal 450, so that triode 445 is non-conductive and its anode 455 is at approximately +250 volts. Under this condition, a first working pulse (curve 1) at terminal 554 renders triode 446 conductive and, due to the action of a capacitor 452 and the left-hand portion of dual triode 447, tends to drive grid 453 of triode 448 in a negative direction. Because of the presence of the right-hand portion of tube 447, whose anode is supplied with −50 volts, grid 453 cannot go more negative than approximately −50 volts, at which level it tends to remain. Accordingly, capacitor 454, connected to this grid as shown, is charged to approximately 300 volts.

Now let it be assumed that a positive-going input pulse is applied to input terminal 450, rendering triode 445 conductive so that the potential of its anode 455 drops substantially, thus reducing the charge on capacitor 454. At the end of this input pulse, triode 445 again becomes nonconductive, its anode 455 returning to approximately +250 volts. This causes the right-hand side of capacitor 454 to rise in a positive direction but, due to the action of the left-hand portion of tube 447 and of rectifier element 456, it cannot rise above approximately ground potential. Grid 453 of triode 448 remains substantially at ground potential until the beginning of the next pulse applied to terminal 554, at which time it drops abruptly to approximately −50 volts. It will be apparent, therefore, that the pulse developed at grid 453 does not begin at the beginning of the input pulse applied to terminal 450, but is delayed until the end of this input pulse and is terminated by the beginning of the next first working pulse (curve 1) applied to terminal 554.

After passing through cathode follower 448, the delayed pulse is shaped pulse and applied to control grid 457 of pentode 449, by which it is amplified and then supplied via output terminals 458 to recording head 26 (FIG. 2). The potential on screen-grid 459 of pentode 449 may be adjusted by means of a potentiometer 460 for the purpose of varying the pulse current which flows through the recording head when pentode 449 is conductive. In the absence of a positive-going signal pulse at its control grid 457, pentode 449 is nonconductive due to the negative potential applied to its control grid with respect to its cathode.

The reading amplifier

The reading amplifier, shown in detail in FIG. 18, comprises tubes 461–467. This figure also shows switch 41 and portion 50*c* of switch 50 (FIG. 2). Reading head 27 (FIG. 2) is connected to input terminals 468. Pentodes 461–463 and the associated circuit components comprise a relatively wide-band amplifier of conventional design. Rectifier elements 469 and 470 between pentodes 462 and 463 serve as a clipping network for the purpose of selecting a portion of the signal lying below ground level, thus minimizing difficulty due to noise and other spurious responses. Triode 464 operates as a cathode follower and provides at an output terminal 471 an amplified but otherwise substantially unchanged version of the signals produced by reading head 27.

In order to provide a drum signal in somewhat more useful form, the same positive-going signals available at output terminal 471 of cathode follower 464 are utilized to charge a capacitor 472 through rectifier elements 473 and 474, to a value prevented from exceeding approximately 15 volts by rectifier elements 475, 476 and 477, connected as shown to a +15 volt source. Capacitor 472 is discharged through a capacitor 478 under control of fourth working pulses (curve 4) applied to a The resultant shaped and elongated pulses, thus developed across capacitor 472, are passed through a double cathode follower comprising triodes 465 and 466, its output appearing at output terminal 480.

The pulses available at output terminal 480 are also supplied to an "AND" circuit 750, which is supplied with the numbers only gate (curve 12). The output of "AND" circuit 750 serves as one input of an "AND" circuit 751, also supplied with third working pulses (curve 3) and the *b* gate (curve 13). Thus this circuit selects the pulses of the B and C registers, each of which occurs in the first half of its respective box (FIG. 1). The output of this circuit, appearing at terminal 752, is connected to the input of delay unit 29 (FIG. 2). The output of "AND" circuit 750 (FIG. 18), together with third working pulses (curve 3) and the *a* gate (curve 15), are supplied to the three inputs of an "AND" circuit 753, which thus serves to select the pulses of the A and D registers, occurring in the second halves of their respective boxes. These pulses are supplied through an output terminal 754 which is connected to the input of delay unit 32 (FIG. 2).

The output of "AND" circuit 750 is also connected to a first input terminal 755 of an "AND" circuit 758. The output of delay unit 29 (FIG. 2) is supplied to a first input terminal 756 of an "AND" circuit 763. Terminals 755 and 756 effectively comprise the two inputs of switch 41 (see also FIG. 2). Output terminal 757 of switch 41 is connected to the input of delay unit 30 (FIG. 2). When switch 41 is in its normal condition, pulses applied to switch input terminal 755 cannot reach switch output terminal 757 by way of "AND" circuit 758 and an "OR" circuit 760 because "AND" circuit 758 is disabled by the action of an "AND" circuit 759 which in turn is disabled because its first terminal 433 (see FIG. 16) is normally at approximately −50 volts. The remaining input terminal 298 (also in FIG. 11) of "AND" circuit 759 is supplied with a suitably gated portion of the single-shot gate (curve 23), as described in connection with FIG. 11. Since the second input of "AND" circuit 763 is normally at ground potential due to the action of an electronic switch comprising a normally nonconductive triode 762, this "AND" circuit is enabled by input pulses applied to terminal 756, and its output passes through "OR" circuit 760 to provide output pulses at switch output terminal 757 during the presence of third working pulses (curve 3). Thus switch 41 normally passes pulses from delay unit 29 to delay unit 30, as shown in FIG. 2.

When interchange is called for, however, switch 41 must be actuated. Under this condition, terminal 433 rises to approximately ground potential (see FIG. 16), thus permitting "AND" circuit 759 to be enabled by the presence of a suitably gated portion of curve 23 at terminal 298 (see also FIG. 11). This in turn permits "AND" circuit 758 to be enabled, during the *a* gates (curve 15), by input pulses applied to input terminal 755, and these pulses pass through "OR" circuit 760 to provide output pulses at output terminal 757 during the presence of third working pulses (curve 3). Furthermore, the enabling of "AND" circuit 759 causes the enabling of "AND" circuit 761 during the blanking pulses (curve 5), thereby rendering triode 762 highly conductive and thus disabling "AND" circuit 763 in the manner descrbied above in connection with FIG. 9. Thus pulses applied to input terminal 756 of switch 41, under this condition, are prevented from reaching output terminal 757.

BASE OSCILLATOR AND SYNCHRONIZING CIRCUITS

FIG. 19 shows the base oscillator and synchronizing circuits, and a portion 48*b* of switch 48 (FIG. 2). The base oscillator, designated generally by reference numeral 482, is a free-running multivibrator comprising a dual triode 483, triodes 484 and 485 arranged as cathode-follower trigger tubes, and triodes 486 and 487 serving as output amplifiers. The output signals from base oscillator 482 are provided at output terminals 488 and 489, the output terminals being prevented from rising above ground potential by clamping rectifier elements 530 and 531, respectively.

The rate of oscillation of base oscillator 482 is determined by the potential with respect to ground of a line 490. When this line is at +75 volts, for example, base oscillator 482 operates at a frequency well below the frequency corresponding with synchronization. As will be described below, the potential of line 490 is varied to provide operation at the proper rate to insure synchronization. The nominal rate of operation is approximately 300 kilocycles per second, thus requiring approximately 3 4 microseconds for each cycle of operation. Each output pulse, therefore, is approximately 1.7 microseconds wide.

In accordance with an important feature of the present invention, the speed of operation of the computer as a whole is determined by the speed of rotation of magnetic drum 25 (FIGS. 1 and 2). In general, when the system is synchronized, a pulse read from the drum at a time corresponding to a given box will continue to be read at the same corresponding time. Since there is normally a one-box delay in transmitting the pulse through the computer channels, this bit of information will be recorded one box after it is read. Therefore, if a pulse is recorded at a given time, the fact that it arrives at reading head 27 at a time corresponding to one box earlier in the next drum cycle indicates that the computer speed is matched to the drum speed.

In accordance with the present invention, there are provided synchronizing circuits which perform two basic functions. The first function is to bring the base oscillator into synchronism with the drum, this function being conveniently designated the "coarse" control. The second function of the synchronizing circuits, aptly called the "fine" control, is to maintain synchronization by insuring that the pulse which is read occurs in the proper part of the box. During the time that the rate of base oscillator 482 is being varied to achieve synchronization, no information signals are permitted to reach the drum, but normal operation is restored automatically upon the achievement of synchronization.

Coarse control

Let it first be assumed that the system is out of synchronization. To bring the system into synchronization, a single pulse is recorded at a definite time and the time of arrival of this same pulse at reading head 27 is observed. This is automatically accomplished in the following manner. There is provided a bistable trigger circuit 491 comprising dual triodes 492 and 493. An "AND" circuit 494 comprising a portion 48*b* of switch 48 is provided, it being enabled when the three gates of curves 13, 16 and 18, comprising its three inputs, are all up. As indicated, this "AND" circuit comprises a portion 48*b* of switch 48 (FIG. 2), and its output serves as one input of an "AND" circuit 495, whose other input is the tag gate (curve 6) and whose output is connected to the right-hand grid of tube 493. When "AND" circuits 494 and 495 are enabled by the rising of all of the gates of curves 6, 13, 16 and 18, trigger circuit 491 is turned off so that tube 493 is conductive. This is an indication that the system is not synchronized. The output of "AND" circuit 494 serves also as one input of an "AND" circuit 496, whose other input is the zero gate (curve $\mathbf{8_0}$) and whose output is connected to a rectifier element 497. Upon the enabling of "AND" circuit 496 by the rise of the zero gate (curve $\mathbf{8_0}$), "AND" circuit 494 already being enabled, a pulse is applied through rectifier element 497 and a cathode follower 498 to terminal 450, which is the input terminal of the recording amplifier shown in FIG. 17, so that this single pulse is recorded on the drum at 0–*m*, *b*, tag time under the zero digit gate (curve 18).

In order to prevent information signals from reaching the drum during the achievement of synchronization, the left-hand portion of a dual triode 499 is rendered nonconductive when trigger circuit 491 is turned off, so that its left-hand cathode falls to approximately −50 volts, thus disabling an "AND" circuit 500 having one input terminal connected to this cathode. The computer output signals applied to its other input terminal 252 (also shown in FIG. 10) are thus prevented from passing to the recording amplifier through rectifier element 501 and cathode follower 498. The left-hand portion of a dual triode 502 is also rendered nonconductive, due to the presence of rectifier elements 503 and 504.

When trigger circuit 491 is turned off, the right-hand cathode of dual triode 499 rises approximately to ground potential, thus raising the upper end of a resistor 505 to ground potential. Under this condition, a free-running trigger circuit 506 comprising triodes 507 and 508 is actuated, so that it begins multivibrator operation. During the first portion of its operating cycle, the grid of triode 507 gradually rises until it is approximately at ground potential, and triode 507 becomes conductive, so that grid 509 of a triode 510 is brought to ground potential through the cathode follower comprising the right-hand portion of dual triode 502. This renders triode 510 conductive for an interval long enough to permit a storage device or capacitor 511 to be discharged until the voltage across it decreases to approximately 75 volts, this minimum level being established by a diode 512.

The voltage across capacitor 511 is applied through a cathode follower 513 to line 490, and thus serves as the control voltage which governs the rate of base oscillator 482. When the voltage across capacitor 511 is 75 volts, base oscillator 482 is running at its slowest speed, a rate appreciably lower than that required for synchronization with the drum. Trigger circuit 506 now reverses, so that its triode 508 becomes conductive and the grid of triode 507 drops to approximately −50 volts. Due to the cathode follower action of the right-hand portion of tube 502, this causes triode 510 to cut off. Capacitor 511 now charges toward +250 volts through a resistor 514, so that the control voltage on line 490 rises and base oscillator 482 slowly increases its speed of operation. Since trigger circuit 491 is still turned off and tube 493 is still conductive, the upper end of resistor 505 is at ground potential and the grid of triode 507 gradually rises toward ground potential.

During this time, the previously mentioned single pulse has been recorded and its time of arrival is monitored in the following manner to determine whether or not it can be read during the synchronizing box, that is, at a time corresponding to one box earlier than that in which it was recorded. The test pulse as read from the drum appears at terminal 471, which is an output terminal of the reading amplifier of FIG. 18 and which serves as one input of an "AND" circuit 515. The other three inputs of "AND" circuit 515 comprise the gates of curves $\mathbf{8_0}$, 13 and 22. If the single test pulse occurs when these gates are all up, that is, if it is read under the synchronizing gate (curve 22), "AND" circuit 515 is enabled. This is the indication that the frequency of base oscillator 482 and the drum speed are correctly related, since a pulse recorded during the zero digit gate (curve 18) will be read one box earlier, or under the synchronizing gate (curve 22). The enabling of "AND" circuit 515 causes a capacitor 516 to be charged through a diode 517. This charge across capacitor 516 is retained and the resultant voltage is applied through a cathode follower 518 to one input of an "AND" circuit 519. A second input comprises the point gate (curve 7), and the third input is connected to the output of "AND" circuit 494. The enabling of "AND" circuit 519 by the reading of a correctly timed test pulse renders dual triode 492 conductive to thus turn trigger circuit 491 on, signifying that synchronization has occurred and preventing triode 507 of multivibrator 506 from again becoming conductive, since the upper end of resistor 505 is now driven to approximately −50 volts. If for any reason synchronization is not achieved in the first cycle, however, triode 507 again becomes conductive and the above-described synchronizing cycle is repeated as often as necessary. Capacitor 516 is discharged and prepared for the next cycle of operation by means of a triode 527, a capacitor 528 and a diode 529, triode 527 being rendered conductive whenever "AND" circuit 496 is enabled as previously described.

Fire control

When trigger circuit 491 is turned on, as described above, the right-hand cathode of tube 499 drops to approximately −50 volts, thus disabling trigger circuit 506 and cutting off the right-hand portion of tube 502. The rise of the left-hand cathode of tube 499 enables "AND" circuit 500, thus reconnecting the computer output signals present at terminal 252 (also in FIG. 10) to input terminal 450 of the recording amplifier (see also FIG. 17). At this time, the adding channel of the computer is emitting zeros and these are now recorded.

The arrangement will now be described by which correction of the control voltage in line 490 is made by every pulse read from the drum, in accordance with an important feature of the present invention. The rise of the left-hand cathode of tube 499, described above, also enables a resistive coincidence circuit 520 comprising resistors 521 and 522, since the junction 532 of these resistors is no longer held at −50 volts by rectifier elements 503 and 504. The inputs of coincidence circuit 520 comprise all the intelligence pulses read from the drum as developed at terminal 471 (also in FIG. 18) and all blanking pulses (curve 5) applied to terminal 541. Thus these signals are combined and their sum appears at junction 532 of resistors 521 and 522. The resultant pulse voltage is applied through the left-hand portion of tube 502 operating as a cathode follower to grid 509 of triode 510. The degree of overlapping between the pulses as read and the blanking pulses (curve 5) determines the duty cycle of this pulse voltage and hence the current flow from capacitor 511 through triode 510. If these pulses overlap too much, the voltage across capacitor 511 tends to drop, thus slowing down base oscillator 482 and causing the read pulses to move out with respect to the blanking pulses. Conversely, if the pulses as read do not overlap the blanking pulses by the proper amount, the voltage across capacitor 511 rises, thus speeding up base oscillator 482 and forcing the read pulses into closer coincidence with the blanking pulses.

In order to insure that the current passes by triode 510 is a function only of the duty cycle of the pulses at its grid 509 and is substantially independent of any changes in tube characteristics or in the amplitude of the individual input pulses to coincidence circuit 520, a resistor 524 is connected between cathode 525 and triode 510 and a source of −250 volts. Thus the charge in capacitor 511 varies as a function of the duty cycle of the pulse voltage at grid 509. A rectifier element 526 is connected between cathode 525 and ground, and so polarized that cathode 525 cannot fall below ground potential. The peak cathode current of triode 510 is fixed by resistor 524 since, when grid 509 is driven in a positive direction, only sufficient cathode current flows to maintain cathode 525 approximately at ground level. Since the plate current equals the cathode current, the peak current from capacitor 511 is fixed by resistor 524, and the only parameter that can effect the average current through triode 510 is the duty cycle of the pulses on its grid 509. As pointed out above, this corresponds with the amount of overlapping between the drum pulses and the blanking pulses.

PERIODIC PULSE GENERATORS

The operation of the computer requires the development of a large number of periodic gates, illustrated by certain of the curves of FIGS. 3*a* and 3*b*, and these gates are maintained in a strict predetermined timing with respect to base oscillator 482 (FIG. 19). These gates are developed by appropriate pulse generators timed by the above-described base oscillator 482.

Blanking and working pulse generators

The blanking and working pulse generator of FIG. 20 comprises essentially a free-running multivibrator 533 and a pulse-forming electronic circuit chain having four substantially identical stages, three of which are included within a feedback loop so that, once started, the chain continues to operate as a ring circuit. Starting of the chain is assured by the fact that the multivibrator is free-running. Multivibrator 533 comprises dual triodes 534 and 535, and has a normal operating frequency substantially lower than that at which it is forced to operate in a manner later to be described. The excursions of the left-hand grid of triode 535 are passed through a double cathode follower comprising triodes 538 and 539 connected in parallel and triode 540, the output of the cathode follower being developed at output terminal 541. This terminal is the source of the blanking pulses (curve 5) which are utilized throughout the circuits of the computer.

These blanking pulses are supplied, as shown in FIG. 20, to one input of an "AND" circuit 542, the other input of which is connected to terminal 488, comprising one of the output terminals of base oscillator 482 (FIG. 19). The output of "AND" circuit 542 is connected to the grid of a triode 543 which is normally nonconductive. A capacitor 544 is charged, under this condtion, to approximately 300 volts. When "AND" circuit 542 is enabled, triode 543 becomes conductive, thus substantially reducing the charge on capacitor 544. Upon the disabling of "AND" circuit 542, triode 543 becomes nonconductive, so that the right-hand side of capacitor 544 rises in a positive direction. Due to the presence of rectifier elements 545 and 546 and rectifier element 531 (FIG. 19) connected to terminal 489, it cannot rise above approximately ground potential. It remains at this potential until terminal 489 (also in FIG. 19) drops to approximately −50 volts. Thus it will be apparent that a pulse has been developed at the right-hand side of capacitor 544 which begins when "AND" circuit 542 is disabled by the termination of one of the outputs of base oscillator 482 (FIG. 19), and which is ended by the termination of the other output of the base oscillator.

This delayed pulse is passed through a double cathode follower comprising parallel-connected triodes 547 and 548 and a triode 549, and appears at terminal 550. These pulses, called the fourth working pulses, are represented by curve 4 (FIG. 3), and comprise the output of the first stage of the pulse-forming chain. These pulses are also applied to the left-hand grid of tube 534 of multivibrator 533 for controlling its speed of operation.

The pulses at terminal 550 also serve as the input to the second stage of the pulse chain, this stage comprising triodes 551, 552 and 553, and operating in the same manner as just described for the first stage to provide a train of first working pulses (curve 1) at terminal 554.

The pulses at terminal 554 also supply the third stage of the pulse chain comprising triodes 555, 556, 557 and 558, and producing output pulses which appear at terminal 559 (curve 2). It will be noted that these pulses, called the second working pulses, are also supplied to the right-hand grid of tube 535 of multivibrator 533, thus providing a closed loop comprising the multivibrator and the first three stages of the pulse chain. The pulses at terminal 559 also serve as the input to the fourth stage comprising triodes 560, 561, 562 and 563, the output of this stage being developed at an output terminal 564 and comprising the third working pulses (curve 3).

The pulses produced at the respective terminals 554, 559, 564 and 550 are each approximately 1.7 microseconds in length and follow each other in the order just recited. In other words, at any one of these terminals there is a 1.7-microsecond pulse followed by a 5.1-micro second rest, so that one and only one of these four terminals is energized at any given instant. These four pulse chains comprise the working pulses of the computer, and are utilized throughout the circuits thereof.

Tag, point and number gate generators

FIGS. 21, 22 and 23, when arranged consecutively from left to right, illustrate the detailed circuit arrangement for developing a set of twelve gates, the first two being designated the "tag" and "point" gates (curves 6 and 7), and the last ten comprising the number gates (curves $\mathbf{8}_9$–$\mathbf{8}_0$). Each gate is approximately 6.8 microseconds in length and each gate rises as the preceding gate falls. The first gate to rise defines the "tag" cell, the next the "point" cell, the third the "nine" cell the next the "eight" cell, and so on. The apparatus for developing these gates also comprises a pulse-forming chain arranged in a closed loop.

In order to insure that these twelve gates are generated at the proper rate, there is provided a free-running multivibrator 567 (FIG. 21), the speed of which in turn is controlled by the application of first working pulses (curve 1) at terminal 554 (see also FIG. 20) through a so-called "steering circuit" comprising resistors 568 and 569, and capacitors 570 and 571. The outputs of multivibrator 567 are developed on lines 572 and 573. Since its constants are so selected that multivibrator 567 effectively divides the frequency of the first working pulses (curve 1) by a factor of two, the outputs on lines 572 and 573 comprise alternately rising pulses each having a length of approximately 3.4 microseconds.

In a manner similar to that described in connection with FIG. 20, the "tag" gate (curve 6) is caused to rise, due to the action of a capacitor 574 (FIG. 22), when a triode 575 is rendered nonconductive by the fall of the "zero" gate (curve $\mathbf{8}_0$) applied to the grid of triode 575. The "tag" gate is terminated by the fall of line 572, due to the presence of rectifier elements 576 and 577. The resultant pulse is passed through a double cathode follower comprising parallel-connected triodes 578 and 579, and a triode 580, and appears at a terminal 581.

In a similar manner, the pulses available at terminal 581 are also applied to the grid of a triode 582 having a capacitor 583 connected to its anode to cause the rise of the "point" gate, the fall of which coincides with the fall of line 573. After passing through a double cathode follower comprising triodes 584 and 585, the "point" gate (curve 7) appears at an output terminal 586. Successive stages in the chain operate in a similar manner to provide the "nine" gate (curve $\mathbf{8}_9$) at a terminal 587, the "eight" gate (curve $\mathbf{8}_8$) at a terminal 588, and so on through similar stages of the chain represented by block 609 (FIG. 21) until the "zero" gate (curve $\mathbf{8}_0$) is developed at a terminal 589. Number gates $\mathbf{8}_1$ through $\mathbf{8}_7$ are developed respectively at terminals 611–617.

The several number gates are supplied to the indicated contacts (FIG. 21) of relays 366–369 (FIG. 14), which operate under control of keys in the manner described above in connection with FIG. 14 to select a particular number gate for application to one input of an "AND" circuit 590 (FIG. 21), to whose other input terminal 608 (also in FIG. 23) is applied the *a* gate (curve 15). When "AND" circuit 590 is enabled, the selected number gate passes through a double cathode follower comprising triodes 591 and 592, and appears at an output terminal 593. If the particular selected number gate happens to be the "five" gate, for example, the waveform at terminal 593 will be as shown by curve $\mathbf{8}_5$. With the relay contacts in their idling positions as shown, however, the "zero" gate (curve $\mathbf{8}_0$) is selected.

For the purpose of developing a gate which is the inverse of the "zero" gate (curve $\mathbf{8}_0$), the latter gate is also supplied to a triode 594 (FIG. 21) operating as an inverter and feeding a cathode follower 595 to provide at an output terminal 596 an inverse or "not-zero" gate (curve 11).

For some purposes in the computer, it is necessary to have a gate which remains up only long enough to cover the time occupied by the number gates, that is, the "nine" through "zero" gates (curves $\mathbf{8}_9$–$\mathbf{8}_0$). In order to accomplish this, the "point" gate (curve 7) at terminal 586 (FIG. 22) is fed to a triode 597 (FIG. 23) and a capacitor 598 to cause the rise of the "numbers only" gate coincident with the fall of the "point" gate, while its fall is produced by feeding the "tag" gate (curve 6) at terminal 581 (FIG. 22) through a triode 610 (FIG. 23) and the left-hand portion of a dual diode 599, so that the fall of the "numbers only" gate is coincident with the rise of the "tag" gate. The resultant pulse is passed through a double cathode follower comprising triodes 601 and 602, and appears as the "numbers only" gate (curve 12) at a terminal 603.

*a* and *b* Gate generators

For the purpose of generating the *a* and *b* gates (curves 15 and 13), there is provided a free-running multivibrator 618 (FIG. 23), the speed of which is controlled by applying the tag gate (curve 6) through a so-called "steering circuit" comprising capacitors 619 and 604, and resistors 605 and 606. The outputs of multivibrator 618 are passed through double cathode followers as shown and appear at output terminals 607 and 608 as the *b* and *a* gates, respectively represented by curves 13 and 15. Since multivibrator 618 operates effectively as a frequency divider having a factor of two, the outputs at terminals 607 and 608 comprise gates which are alternately up and each of which has a length of approximately 80 microseconds. This is the time separation of successive tag pulses (curve 6). These gates are utilized to identify the first and second digits of a box as the digits pass through the computing circuits, the *b* gate (curve 13) at terminal 607 being up during the first half of a box and the *a* gate (curve 15) at terminal 608 being up during the second half of the box.

Miscellaneous gate generator

FIGS. 24–26 show schematically the apparatus for developing the miscellaneous gates represented by curves 16–20 and 22. Referring first to FIG. 24, there is shown an arrangement which effectively divides the frequency of a pulse train (curve 13) applied to input terminal 607 by a factor of sixteen. This arrangement includes a monostable trigger circuit 622 comprising triodes 623 and 624. Triode 623 is normally nonconductive and triode 624 is normally conductive. The constants of the trigger circuit are so selected that it is caused to go through a cycle of operation by the fall of each fourth pulse applied to input terminal 607, thus effectively providing frequency division by a factor of four.

The output of trigger circuit 622 is utilized to control the operating frequency of a free-running multivibrator 625 comprising triodes 626 and 627. Its constants are so chosen that this multivibrator would normally operate at a rate somewhat less than one-fourth that of the input pulses. Its output is supplied through a triode 628 operating as a cathode follower to a pulse-shaping circuit 629 which comprises an "AND" circuit 630, cathode followers 631 and 632, and diodes 633 and 634. The *b* gate (curve 13) serves as one input of "AND" circuit 630, the other input being supplied from the cathode of triode 628. The output of "AND" circuit 630 is fed to the grid of cathode follower 631, to the cathode of which is connected diode 634. Diode 633 has its cathode connected to the cathode of triode 628 and its anode connected to the cathode of diode 634 and to the grid of cathode follower 632. Due to the operation of this pulse-shaping circuit, the pulse train at output terminal 635 of cathode follower 632 comprises a series of substantially rectangular pulses having rises and falls both of which substantially coincide with rises of the *b* gate (curve 13) applied to input terminal 607. Due to the frequency-dividing action of trigger circuit 622 and multivibrator 625, the signal at output terminal 635 is up for eight input pulses and then down for eight input pulses.

Referring now to FIG. 25, there is shown a pair of bistable trigger circuits 636 and 637, comprising respectively dual triodes 638 and 639, and 640 and 641. Trigger circuit 636 includes cathode followers 642 and 643, and trigger circuit 637 includes cathode followers 644 and 645. Trigger circuit 636 is triggered by pulses at input terminal 635 (see also FIG. 24) applied to one input of an "AND" circuit 646 the output of which is connected to a triggering terminal 620, which in turn is connected through a so-called "steering circuit" comprising capacitors 647 and 648 and resistors 649 and 650 to the outer grids of tubes 638 and 639. A first output of trigger circuit 636 is taken from an output terminal 651, and a second output from an output terminal 652, respectively connected to the cathodes of triodes 642 and 643.

Trigger circuit 637 is triggered by means of pulses applied through an "OR" circuit 653 having its two inputs respectively supplied from triggering terminal 620 and from output terminal 651 of trigger circuit 636, the output of "OR" circuit 653 being applied through a triggering terminal 654 and a so-called "steering circuit" comprising capacitors 655 and 656 and resistors 657 and 658 to the outer grids of tubes 640 and 41. The first output of trigger circuit 637 is developed at a terminal 659 and the second output is developed at a terminal 660, respectively connected to the cathodes of triodes 644 and 645.

There is also provided an "OR" circuit 661 having its three inputs respectively supplied from output terminal 651 of trigger circuit 636, output terminal 659 of trigger circuit 637 and, at a terminal 607, with the pulse train of curve 13. The output of "OR" circuit 661 serves as the second input of the above-mentioned "AND" circuit 646 to the first input of which, as stated above, are applied the pulses developed at terminal 635 (see also FIG. 24).

FIGS. 25 and 26, taken together and arranged from left to right, show the specific arrangements for developing each of the miscellaneous gates. The "multiply" gate (curve 16) is developed by feeding the pulses at output terminal 659 of trigger circuit 637 to a double cathode follower comprising triodes 663 and 664 (FIG. 26), the resultant pulses appearing at an output terminal 665.

The "divide" gate (curve 17) is developed by utilizing the pulses at output terminal 651 of trigger circuit 636 and the pulses at output terminal 660 of trigger circuit 637 respectively as the two inputs of an "AND" circuit 666 (FIG. 25), the output of which is passed through a double cathode follower comprising triodes devices 667 and 668 (FIG. 26), the output (curve 17) appearing at a terminal 689.

For the purpose of developing the "zero digit" and "not-zero digit" gates illustrated respectively by curves 18 and 19, the pulses at output terminal 652 of trigger circuit 636 (FIG. 25) are fed to a pulse-forming circuit comprising a triode 669 and a dual diode 670 (FIG. 26), and into a double cathode follower comprising triodes 671 and 672. The zero digit gate of curve 18 appears at an output terminal 673, and is also applied through a triode 674 operating as an inverter and a double cathode follower comprising triodes 675 and 676 to provide the not-zero digit gate of curve 19 at an output terminal 677.

To provide the gate illustrated by curve 20, the pulses at output terminal 651 of trigger circuit 636 (FIG. 25) and the pulses at output terminal 659 of trigger circuit 637 serve as the two inputs of an "AND" circuit 678 (FIG. 25), the output of which is supplied through a pulse-forming circuit comprising a triode 679 and a dual diode 680 to a cathode follower 681, the gate appearing on an output terminal 682 (FIG. 26). In the cases of the gates of curves 18 and 20, each pulse is caused to terminate at the proper time by means of an "AND" circuit 683 (FIG. 26), the three inputs of which respectively comprise fourth working pulses (curve 4) and the gates of curves $\mathbf{8_0}$ and 15, and the output of which is supplied through a triode 684 to the left-hand portions of dual diodes 670 and 680, respectively.

To provide the synchronizing gate illustrated by curve 22, the pulses at output terminal 652 of trigger circuit 636 (FIG. 25) and the pulses at output terminal 660 of trigger circuit 637 serve as the two inputs of an "AND" circuit 685 (FIG. 25), the output of which is fed through a double cathode follower comprising triodes 686 and 687 (FIG. 26), the resultant pulses being developed at an output terminal 688.

Thus it will be apparent that means have been provided, in accordance with an important feature of the present invention, for developing a plurality of miscellaneous gates, the pulses of which have rises and falls both substantially coinciding with rises of the *b* gate (curve 13), but each of which encompasses a predetermined different number of these *b* gates. Thus the miscellaneous gates are synchronized but of different durations.

THE READ-OUT UNIT

FIG. 27 is a detailed schematic circuit diagram, partly in block form, of read-out unit 37 (FIG. 2). The function of this unit is to provide a printed record of numbers as they are entered into the machine or of the contents of the various registers, as desired. If the number standing in a given register is negative, the read-out unit recognizes this and prints the absolute value followed by a minus sign. Zeros to the left of the first non-zero digit are suppressed on both entry and read-out. The read-out cycle is completely automatic once the proper register has been selected, and slightly less than four seconds are required to print the contents of a thirty-digit register. During read-out the machine remains in an idling condition. The information in the register being read is not affected by the read-out operation.

The printing section

The printing section of the read-out unit comprises a group of substantially identical stages 691–700 corresponding respectively to the numbers 1, 2, 3, 4, 5, 6, 7, 8, 9 and 0, and having associated respectively with them solenoids 701–710 arranged to operate the corresponding keys of an electric typewriter (not shown) associated with the machine. Stages 691–700 are supplied respectively with the corresponding number gates as developed at terminals 611–617, 588 587 and 589 (see also FIG. 21). By means of a line 690, each of stages 691–700 is supplied with a signal comprising pulses each having a duration of approximately 1.7 microseconds and an amplitude of approximately 50 volts. The manner in which this signal is supplied to line 690 under various conditions of operation will be described later.

Since stages 691–700 are substantially identical, it is necessary to describe only one of them in detail. "Nine" stage 699 is chosen for this purpose. The pulses on line 690 and the "nine" gate (curve 89) at terminal 587 serve as the two inputs of an "AND" circuit 711, the output of which is connected to the grid 712 of a triode 713 operating as an amplifier. Anode 714 of triode 713 has associated with it an inductive element 715 serving as a load impedance, and anode 714 is coupled through a capacitor 716 to the control grid 717 of a gaseous discharge tube 718, preferably of the thyratron type. Solenoid 709 is connected between ground and the cathode 719 of tube 718. A series network comprising a resistor 720 and a capacitor 721 is connected between cathode 719 and ground. Anode 722 of tube 718 is connected, by means of normally closed relay contacts 354–*c* and 357–*c*, each in series with relay contacts 388–*f* and normally open relay contacts 345–*d* and the illustrated resistance elements, to terminal 428 (see also FIG. 16). Anode 722 is initially energized by the pickup of sequencing relay 345 (FIG. 13), thus closing its contacts 345–*d* (FIG. 27).

The structure just described comprises an important feature of the present invention, in that it insures the firing of discharge tube 718 when a coincidence occurs between the "nine" number gate (curve $8_9$) at terminal 587 and a similarly timed pulse appearing on line 690, even though the latter is of relatively short duration and small amplitude. This highly desirable result is achieved in the following manner. The output of "AND" circuit 711 when enabled raises the potential of grid 712, causing triode 713 to become highly conductive. This results in the storage of energy in inductive load device 715. When the signal pulse on line 690 ends, disabling "AND" circuit 711 and causing the potential of grid 712 to drop, tube 713 becomes nonconductive, and oscillations begin in the ringing circuit comprising inductive load device 715 and stray plate-to-ground capacitance, resulting in the production of a damped oscillatory wave having an initial amplitude of approximately 100 volts. The application of this wave to control grid 717 via coupling capacitor 716 and a resistor 723 insures the immediate firing of discharge tube 718.

Upon ionization of tube 718, the oscillations are damped quickly by the flow of current through control grid 717. The network comprising resistor 720 and capacitor 721 is provided to supply an initial current path for the discharge of tube 718, in view of the fact that solenoid 709 is relatively a highly inductive load. The firing of tube 718 causes the actuation of solenoid 709, which in turn results in the printing of a "9" by the typewriter. Deionization of tube 718 is accomplished by the opening of either of oscillator relay contacts 354–*c* and 357–*c*, depending upon the condition of readout relay contacts 388–*f*, in series with anode 722, after an ionization period of approximately 50 milliseconds.

The input circuits

To insure that only a single number is printed and that the proper digit is printed in the proper digit position, the single-shot gate (curve 23) and the selected digit gate (curve 21) are applied as the two inputs of an "AND" circuit 724, the output of which is applied to one input of each of "AND" circuits 725 and 726. To secure printing during entry, "AND" circuit 725 is enabled, while "AND" circuit 726 is enabled when it is desired to print the register contents, as described presently. A second input to "AND" circuit 725 comprises the selected number gate appearing at termianl 593 (also in FIG. 21) corresponding to the digit to be entered. The third input to "AND" circuit 725 is raised to approximately ground potential when sequencing relay 345 (FIG. 13) and either plus relay 386 or minus relay 387 (FIG. 15) are picked up by the depression of "plus" button 400 or "minus" button 401 (FIG. 15), so that relay contacts 345–*f* and contacts 386–*j* or 387–*l* are transferred. The output of "AND" circuit 725 serves as an input of an "OR" circuit 727. When a pulse at the output of this "OR" circuit coincides with a third working pulse (curve 3) at terminal 564 (also in FIG. 20), a pulse is passed through a cathode follower 728 to line 690. This pulse is in coincidence with one of the number gates applied to stages 691–700, so that the corresponding solenoid is energized and the proper number printed.

The printing of a number during read-out of a register is accomplished by applying signals read from the drum and appearing at terminal 480 (see FIG. 18) to a second input of "AND" circuit 726. The third input of this "AND" circuit comprises the *a* gate (curve 15) at terminal 608 (also in FIG. 23), while the fourth input is raised to approximately ground potential by the pickup of sequencing relay 345 and read-out relay 388 following the depression of "read-out" button 402 (FIG. 15), so that relay contacts 345–*f* and 388–*l* are transferred. The output of this "AND" circuit 726 serves as another input of "OR" circuit 727. Again, coincidence with a third working pulse (curve 3) causes a pulse indicative of a digit read to pass through cathode follower 728 to line 690, and this pulse, as described above, causes the actuation of the corresponding one of solenoids 701–710.

The zero-suppression and negative-number relays

For the purpose of suppressing zeros to the left of the first non-zero digit, there are provided an "AND" circuit 729, a triode 730 operating as an amplifier, a gaseous discharge tube 731, preferably of the thyratron type, and a zero suppression relay 732, all as shown in FIG. 27. One input of "AND" circuit 729 is supplied with the not-zero gate (curve 11) appearing at terminal 596 (also in FIG. 21), and the other input is supplied with the pulses on line 690. Tubes 730 and 731 operate in the manner above described in connection with stage 699 to cause the pickup of relay 732 whenever a pulse is developed at the output of "AND" circuit 729. The release of relay 732 takes place with the pickup of either one of sequencing relays 341 and 348, thus opening relay contacts 341–*d* or 348–*a*.

When relay 732 is in its normal or released condition, the energization of stage 700 by the call for the printing of a zero does not result in the actuation of zero solenoid 710, due to the condition of relay contacts 732–*c*, but instead causes typewriter space solenoid 733 to be energized. When the first pulse on line 690 corresponding to a digit other than zero is developed, however, "AND" circuit 729 is enabled, resulting in the firing of the tube 731 and the pickup of relay 732. This in turn, by the transfer of relay contacts 732–*c*, prepares stage 700 to cause the printing of a zero upon the arrival of the next zero pulse. This condition is maintained until the end of the operating cycle, when relay 732 is released in preparation for the next cycle.

The presence of a "9" in the extreme left-hand or highest-order digit position of a register is an indication that the number is negative. This requires a conversion cycle, following which normal read-out takes place, a minus sign being printed following the last digit of the absolute value of the number. To accomplish this conversion, there is provided an "AND" circuit 734 to one input of which is supplied the "nine" gate (curve $8_9$) as developed at terminal 587 (also in FIG. 22), and to the other input of which is applied the *a* gate (curve 15). The output of this "AND" circuit 734 is connected to one input of each of "AND" circuits 735 and 736, hence both of these "AND" circuits are conditioned at $8_9$, *a* time. A second input of "AND" circuit 735 comprises the synchronizing gate (curve 22), and the third input of this "AND" circuit is raised to approximately ground potential when read-out relay 388 picks up, transferring relay contacts 388–*j*, relay contacts 392–*g* remaining in their normal condition. Thus "AND" circuit 735 is enabled only during the synchronizing box which, as is apparent from FIG. 1, immediately follows the highest-order box of the A and B registers. A second input of "AND" circuit 736 is raised to approximately ground potential when relays 388 and 392 pick up, thus transferring contacts 388–*j* and 392–*h*. The third and fourth inputs of this "AND" circuit are supplied respectively with the divide gate (curve 17) and the zero digit gate (curve 18). It will be apparent from FIG. 4, therefore, that "AND" circuit 736 is enabled only during the box which immediately follows the highest-order box of the C and D registers.

The outputs of "AND" circuits 735 and 736 provide the two inputs of an "OR" circuit 737, the output of which is connected to the grid of a triode 738 which operates in the manner previously described in connection with stage 699 to cause the firing of a gaseous discharge tube 739, preferably of the thyratron type, which has as its plate load a negative relay 740. Thus tube 739 is fired and relay 740 is picked up whenever there is coincidence between an output pulse from "OR" circuit 737 and a pulse occurring at $8_9$, *a* time in the information signal as it enters the recording input circuits at terminal 252 (see FIGS. 10 and 19), keeping in mind that the latter pulse has been delayed one box since it was read from the drum during the highest-order box of the A and B registers or of the C and D registers. The contacts on relay 740 are utilized in such a manner as to cause conversion to take place as described above, and also to cause a minus sign to be printed after the number by the energization of solenoid 424 (FIG. 16). As previously stated, depression of "read-out" button 402 (FIG. 15) started the operation of the relay chain. Accordingly, after the completion of the conversion cycle, relay 740 is released by the pickup of either of sequencing relays 341 and 348, thus opening contacts 341–*d* or 348–*a* and restoring conditions to their original state.

SOLUTION OF A PARTICULAR PROBLEM

For convenience in understanding the overall operation of the machine, let it be assumed for the moment that its capacity is reduced so that it handles two-digit numbers instead of fifteen-digit numbers. Since each register must provide space for sign information, the A and B registers under this assumed condition will have a total capacity of three digits, and the C and D registers a total capacity of five digits. The tabulation below lists the numbers which pass through the machine in solving the problem of $$\frac{73}{30}\times 6+1$$

namely $$\frac{A}{B}\times C+D$$

the parenthetical line numbers in the right-hand column of this tabulation being used in connection with the explanatory notes which follow the tabulation:

| Register | A | B | C | D | Line |
|---|---|---|---|---|---|
| Idle: | | | | | |
| Read-out | 000 | 000 | 00000 | 00000 | (1) |
| Record | 000 | 000 | 00000 | 00000 | (2) |
| Entry: | | | | | |
| Read-out | 000 | 000 | 00000 | 00000 | (3) |
| Record | 073 | 000 | 00000 | 00000 | (4) |
| Read-out | 073 | 000 | 00000 | 00000 | (5) |
| Record | 073 | 030 | 00000 | 00000 | (6) |
| Read-out | 073 | 030 | 00000 | 00000 | (7) |
| Record | 073 | 030 | 00600 | 00000 | (8) |
| Read-out | 073 | 030 | 00600 | 00000 | (9) |
| Record | 073 | 030 | 00600 | 00100 | (10) |
| Calculate, compute: | | | | | |
| Read-out | 073 | 030 | 00600 | 00100 | (11) |
| Record | 043 | 030 | 00600 | 00700 | (12) |
| Read-out | 043 | 030 | 00600 | 00700 | (13) |
| Record | 013 | 030 | 00600 | 01300 | (14) |
| Calculate, Shift: | | | | | |
| Read-out | 013 | 030 | 00600 | 01300 | (15) |
| Record | 130 | 030 | 00060 | 01300 | (16) |
| Calculate, Compute: | | | | | |
| Read-out | 130 | 030 | 00060 | 01300 | (17) |
| Record | 100 | 030 | 00060 | 01360 | (18) |
| Read-out | 100 | 030 | 00060 | 01360 | (19) |
| Record | 070 | 030 | 00060 | 01420 | (20) |
| Read-out | 070 | 030 | 00060 | 01420 | (21) |
| Record | 040 | 030 | 00060 | 01480 | (22) |
| Read-out | 040 | 030 | 00060 | 01480 | (23) |
| Record | 010 | 030 | 00060 | 01540 | (24) |
| Calculate, Clear: | | | | | |
| Read-out | 010 | 030 | 00600 | 01540 | (25) |
| Record | 000 | 000 | 00000 | 00000 | (26) |

Let it be assumed first that the machine is idling, so that a series of zeros is read out and recorded in each register of the drum, as indicated by lines (1) and (2). Entry is now begun by depressing "A" button 404 (FIG. 15) and, since a positive number is to be entered, "plus" button 400 (FIG. 15). This causes a second tag to be entered so that it appears in the second highest order digit position, as described above in connection with FIG. 12 and as illustrated by line (3) of the tabulation, all second tags as first introduced being indicated by underlining. The machine is now prepared for the entry of information. The number "73" is now entered into the proper orders of the A register by depressing "seven" button 377 and "three" button 373 (FIG. 14) in succession, as explained above in connection with FIGS. 14–16. Since an entry has now been made in the last or zero digit position of the A register, the second tag is automatically removed from the A register, signifying that entry into this register has been completed. This condition is illustrated by line (4).

Entry is now made into the B register by depressing "B" button 405 and "plus" button 400 (FIG. 15). Since any entry actually takes place by way of arithmetic unit 34 (FIGS. 7 and 8), the contents of the B register are caused to pass temporarily through arithmetic unit 34 (see FIG. 2) by automatically performing an interchange when "B" button 405 is depressed, as described above. A second tag is introduced in the second highest order position of the B register, as indicated in line (5). Entry of the number "30" is now made into the proper orders of the B register by depressing "three" button 373 and "zero" button 370 (FIG. 14) in succession. Since the B register is now filled, the second tag is again automatically removed. Line (6) indicates the resultant condition.

Entry is made into the C register by depressing "C" button 414 and "plus" button 400 (FIG. 15). This causes an automatic interchange as described above with regard to the B register, and also introduces a second tag into the second highest order position of the C register, as indicated in line (7). Entry of the number "06" is now made by depressing "zero" button 370 and "six" button 376 (FIG. 14) in succession. Since this does not fill the C register, it is now necessary to depress "release" button 408 (FIG. 15), thus removing the second tag without disturbing the zeros standing in the two remaining digital positions, so that the condition shown in line (8) exists.

Similarly, entry is made into the D register by depressing "D" button 406 and "plus" button 400 (FIG. 15), thus introducing a second tag into the second highest order position of the D register, as shown in line (9). The number "01" is now entered by depressing "zero" button 370 and "one" button 371 (FIG. 14) in succession. Because the D register is not yet filled, "release" button 408 (FIG. 15) is now depressed. This allows zeros to be recorded in the two remaining digital positions and then removes the second tag, with the result illustrated by line (10).

Entry has now been completed, and the machine is ready to begin calculation. Calculation is started by depressing "operate" button 413 (FIG. 15), thus causing the introduction of a single first tag in the manner described above in connection with FIG. 10. First, the contents of the A and B registers, as shown in line (11), are compared in comparer unit 35 (FIGS. 2 and 9) as described above to determine whether B might be subtracted from A without yielding a negative result. In this case, the subtraction can be done, so a "compute" cycle is called for, as explained above in connection with FIG. 9, and the contents of the C register is added in arithmetic unit 34, as described above with reference to FIGS. 7 and 8, to that of the D register, C is re-recorded as in a normal cycle, but $C+D$ is recorded in place of D. B is re-recorded as usual, but A is replaced by $A-B$. The results are all indicated in line (12). Using the register entries of line (13), a comparison is again made and, since the contents of the A register still exceeds that of the B register, subtraction is again possible, so that once again the contents of the C register is added to that of the D register in arithmetic unit 34, with the result illustrated in line (14).

Referring now to line (15), it is apparent that the contents of the B register can no longer be subtracted from that of the A register with a positive re-result. Comparer unit 35, therefore, now calls for a "shift" cycle, as discussed above in connection with FIG. 9. In this case, the contents of the B and D registers are read out and re-recorded as in a normal circulation cycle. However, the contents of the A register is shifted to the left, and that of the C register to the right, with the result depicted by line (16). Since the contents of the A register is now larger than that of the B register, as shown in line (17), comparer unit 35 calls for a "compute" cycle. The contents of the B register is subtracted from that of the A register, and the contents of the C register is added to that of the D register, providing the result shown in line (18). Three more "compute" cycles follow, illustrated respectively by lines (19) and (20), (21) and (22), and (23) and 24).

Once again, an attempt is made to subtract the contents of the B register from that of the A register. This being unsuccessful, comparer unit 35 calls for a "shift" cycle. Since one shift has already been made, however, no further shifts are possible in a machine of the limited capacity now being discussed. Accordingly, the machine returns automatically to an idling condition, the register contents being as shown in line (25). The value in the D register is the answer to the problem. To prepare the machine for the next problem "master clear" button 403 (FIG. 15) is depressed. The result is a series of zeros in all the registers, as illustrated in line (26).

GENERAL

The following table lists the relays of the computer, by reference numeral and figure number, with a brief description where appropriate:

| | Figure | Description |
|---|---|---|
| Reference: | | |
| 329 | 12 | |
| 341-348 | 13 | Sequencing. |
| 350 | 13 | Hold. |
| 352 | 13 | Start. |
| 354 | 13 | Relay oscillator. |
| 357 | 13 | |
| 366-369 | 14 | Selected number. |
| 382 | 14 | Single-shot. |
| 386 | 15 | Plus. |
| 387 | 15 | Minus. |
| 388 | 15 | Read-out. |
| 389 | 15 | Master clear. |
| 390 | 15 | |
| 391 | 15 | Register selection. |
| 392 | 15 | |
| 393 | 15 | Shift left. |
| 394 | 15 | Release. |
| 395 | 15 | Convert. |
| 399 | 15 | Shift right. |
| 397 | 15 | Clear. |
| 398 | 15 | Typewriter on. |
| 399 | 15 | Operate. |
| 431 | 16 | Interchange. |
| 732 | 27 | Zero suppression. |
| 740 | 27 | Negative. |

Wherever in the above description particular tube types have been mentioned, it will be understood that this is by way of example only. Other types of tubes, and even other devices, such for example as crystal rectifiers or transistors, may be substituted without departing from the scope of the present invention.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A digital computer comprising the combination of: means for receiving digital information items each representing a numerical value, means for converting each said item into an intelligence pulse differentially spaced in time, means for recording said pulses on a single track of a moving carrier, means for selectively reading from said carrier and mathematically combining said intelligence pulses to provide a resultant intelligence pulse differentially spaced in time, means for recording synchronizing pulses on said single track, means for utilizing said recorded synchronizing pulses as read from said single track to determine the periodicity of said intelligence pulses, means for recording said resultant intelligence pulse on said carrier, and means for reading from said carrier and converting said resultant intelligence pulse into a digital information item representing numerically the mathematical resultant.

2. Pulse delay apparatus comprising: a capacitor; means for charging said capacitor including a potential source; means for discharging said capacitor substantially to zero potential under control of an input pulse; means coupled to said capacitor for producing an output pulse when said capacitor is charged from said source to a predetermined potential; and means for varying the length of time between said input and output pulses by adjustment of the magnitude of said potential source, said means comprising discriminator-rectifier means responsive to the time coincidence between said output pulse and a third pulse occurring at a predetermined time after said input pulse.

3. In combination: a plurality of pulse delay devices each comprising a capacitor, means for charging said capacitor including a potential source, means for discharging said capacitor substantially to zero potential under control of an input pulse, and means coupled to said capacitor for producing an output pulse when said capacitor is charged from said source to a predetermined potential; and means for varying the common length of time between said input and output pulses in all said delay devices, said means being adapted to vary the magnitude of all said potential sources in response to the time coincidence between the output pulse from one of said delay devices and a third pulse occurring at a predetermined time after the input pulse supplied to said one delay device.

4. Apparatus for determining which of two input pulses occurs first, comprising: first and second input terminals adapted respectively to receive said input pulses, first and second output terminals, rectifier elements connected respectively between said first input and output terminals and between said second input and output terminals, impedance elements connected respectively between said first input terminal and said second output terminal and between said second input terminal and said first output terminal, and means for initially establishing said output terminals at substantially the same potential.

5. Apparatus for determining which of two input pulses occurs first, comprising: first and second input terminals adapted respectively to receive said input pulses, first and second output terminals, rectifier elements connected respectively between said first input and output terminals and between said second input and output terminals, capacitively reactive impedance elements connected respectively between said first input terminal and said second output terminal and between said second input terminal and said first output terminal, and means for initially establishing said output terminals at substantially the same potential.

6. Apparatus for determining which of two positive-going input pulses occurs first, comprising: first and second input terminals adapted respectively to receive said input pulses; first and second output terminals; rectifier elements connected respectively between said first input and output terminals and between said second input and output terminals, said rectifier elements being arranged to offer minimum resistance to current flow toward said output terminals; impedance elements connected respectively between said first input terminal and said second output terminal and between said second input terminal and said first output terminal; and means for initially establishing said output terminals at substantially the same potential.

7. Apparatus for determining which of two input pulses occurs first, comprising: first and second input terminals normally at a first potential level and changing to a second potential level upon the application respectively of said input pulses, first and second output terminals, rectifier elements connected respectively between said first input and output terminals and between said second input and output terminals, impedance elements connected respectively between said first input terminal and said second output terminal and between said second input terminal and said first output terminal, means for initially establishing said output terminals at substantially said first potential level, and output means responsive to signals exceeding a third potential level coupled to said output terminals.

8. Apparatus for determining which of two positive-going input pulses occurs first, comprising: first and second input terminals normally at a first potential level and rising to a second potential level upon the application respectively of said input pulses; first and second output terminals; rectifier elements connected respectively between said first input and output terminals and between said second input and output terminals, said rectifier elements being arranged to offer minimum resistance to current flow toward said output terminals; impedance elements connected respectively between said first input terminal and said second output terminal and between said second input terminal and said first output terminal; means for initially establishing said output terminals at substantially said first potential level; and output means responsive to signals exceeding still higher third potential level coupled to said output terminals.

9. Apparatus for determining which of two input pulses occurs first, comprising: first and second input terminals adapted respectively to receive said input pulses, first and second output terminals, rectifier elements connected respectively between said first input and output terminals and between said second input and output terminals, impedance elements connected respectively between said first input terminal and said second output terminal and between said second input terminal and said first output terminal, and means for initially establishing said output terminals at substantially the same potential, said means comprising a pair of rectifier elements connected in series between said output terminals.

10. Apparatus for determining which of two input pulses occurs first, comprising: first and second input terminals adapted respectively to receive said input pulses, first and second output terminals, rectifier elements connected respectively between said first input and output terminals and between said second input and output terminals, impedance elements connected respectively between said first input terminal and said second output terminal and between said second input terminal and said first output terminal, and means for initially establishing said output terminals at substantially the same potential, said means comprising a pair of rectifier elements connected in series between said output terminals, said last-mentioned rectifier elements being arranged to offer minimum resistance to current flow toward their junction.

11. Apparatus for determining which of two input pulses occurs first, comprising: first and second input terminals normally at a first potential level and changing to a second potential level upon the application respectively of said input pulses; first and second output terminals; rectifier elements connected respectively between said first input and output terminals and between said second input and output terminals; impedance elements connected respectively between said first input terminal and said second output terminal and between said second input terminal and said first output terminal; means for initially establishing said output terminals at substantially said first potential level, said means comprising a pair of rectifier elements connected in series between said output terminals; and output means responsive to signals exceeding a third potential level coupled to said output terminals.

12. A relay oscillator comprising: first and second relays having picked up and released conditions, first and second energy storage devices, means for initially charging said first storage device, a connection between said first storage device and said second relay whereby the charge in said device is utilized to pick up said second relay for a predetermined time interval, means for charging said second storage device while said second relay is picked up, a connection between said second storage device and said first relay whereby the charge in said device is utilized upon release of said second relay to pick up said first relay for a predetermined time interval, and means for charging said first storage device while said first relay is picked up and for discharging said first storage device upon release of said first relay, whereby the operative cycle is repeated.

13. A relay oscillator comprising: first and second relays having picked up and released conditions; first and second energy storage devices, said devices comprising capacitors; means for initially charging said first storage device; a connection between said first storage device and said second relay whereby the charge in said device is utilized to pick up said second relay for a predetermined time interval; means for charging said second storage device while said second relay is picked up; a connection between said second storage device and said first relay whereby the charge in said device is utilized upon release of said second relay to pick up said first relay for a predetermined time interval; and means for charging said first storage device while said first relay is picked up and for discharing said first storage device upon release of said first relay; whereby the operative cycle is repeated.

14. A relay oscillator comprising: first and second relays having picked up and released conditions; first and second energy storage devices; means for initially charging said first storage device; a connection between said first storage device and said second relay whereby the charge in said device is utilized to pick up said second relay for a predetermined time interval, said means comprising a momentarily picked up third relay; means for charging said second storage device while said second relay is picked up; a connection between said second storage device and said first relay whereby the charge in said device is utilized upon release of said second relay to pick up said first relay for a predetermined time interval; and means for charging said first storage device while said first relay is picked up and for discharging said first storage device upon release of said first relay; whereby the operative cycle is repeated.

15. A relay oscillator comprising: first and second relays having picked up and released conditions; first and second energy storage devices; means for initially charging said first storage device; a connection between said first storage device and said second relay whereby the charge in said device is utilized to pick up said second relay for a predetermined time interval, said time interval being determined by a resistive element in circuit with said first storage device; means for charging said second storage device while said second relay is picked up; a connection between said second storage device and said first relay whereby the charge in said device is utilized upon release of said second relay to pick up said first relay for a predetermined time interval, said time interval being determined by a resistive element in circuit with said second storage device; and means for charging said first storage device while said first relay is picked up and for discharging said first storage device upon release of said first relay; whereby the operative cycle is repeated.

16. A relay oscillator comprising: first and second relays having picked up and released conditions, first and second energy storage devices, means for initially charging said first storage device, a connection between said first storage device and said second relay whereby the charge in said device is utilized to pick up said second relay for a predetermined time interval, means for charging said second storage device while said second relay is picked up, a connection between said second storage device and said first relay whereby the charge in said device is utilized upon release of said second relay to pick up said first relay for a predetermined time interval, means for charging said first storage device while said first relay is picked up and for discharging said first storage device upon releasee of said first relay, and means for positively disabling said last-mentioned means upon the completion of a desired number of operative cycles.

17. In an energy storage step counter of the type wherein successive voltage pulses to be counted are impressed on a capacitor and an output pulse is supplied by a tube and associated power supply in response to the impression of a predetermined number of said voltage pulses on said capacitor, the combination therewith of means to stabilize said counter comprising means to detect sample voltages of said successive voltage pulses which vary in amplitude as a function of said voltage pulse amplitudes, means to develop a compensating voltage dependent upon the voltage of said power supply, and means to combine said sample voltages and said compensating voltages and to apply the resultant to said tube as a bias, said bias serving to compensate for variations in said voltage pulse amplitudes and in said power-supply voltages.

18. In an energy storage step counter of the type wherein successive voltage pulses to be counted are impressed on a storage element and electron flow in a tube having an associated power supply is controlled in response to the impression of a predetermined number of said voltage voltage pulses on said storage element, the combination therewith of means for linearizing the discharge of said storage element, means to stabilize said counter comprising means to detect sample voltages of said successive voltage pulses which vary in amplitude as a function of said voltage pulse amplitudes, means to develop a compensating voltage dependent upon the voltage of said power supply, and means to combine said sample voltages and said compensating voltage and to apply the resultant to said tube as a bias, said bias serving to compensate for variations in said voltage pulse amplitudes and in said power-supply voltage.

19. In an energy storage step counter of the type wherein successive voltage pulses to be counted are impressed on a storage element and a first electrode of a tube having an associated power supply is energized in response to the impression of a predetermined number of said voltage pulses on said storage element, the combination therewith of means to stabilize said counter comprising means to detect sample voltages of said successive voltage pulses which vary in amplitude as a function of said voltage pulse amplitudes, means to develop a compensating voltage dependent upon the voltage of said power supply, and means to combine said sample voltages and said compensating voltage and to apply the resultant to a second electrode of said tube as a bias, said bias serving to compensate for variations in said voltage pulse amplitudes and in said power-supply voltage.

20. In a digital computer comprising a moving carrier adapted to store digital information in the form of a single pulse differentially spaced in time for each decimal digit and having associated reading and recording heads, the combination therewith of: a first path comprising a single electrical channel for information flow connecting said heads and comprising delay means, a second path comprising a single electrical channel for information flow connecting said heads and comprising counting circuit means, means adapted for comparing the relative values represented by the digital information flowing respectively in said first and second paths, and switching means interposed in said first and second paths for controlling the flow of information therethrough in response to said comparing means.

21. A digital computer comprising the combination of: a plurality of registers having an input and an output and each being adapted to receive manifestations of a plurality of numbers, the manifestation of each said number comprising a single intelligence pulse differentially spaced in time; first and second paths connected between said output and said input, each said path comprising a single electrical channel; means for normally passing manifestations of the numbers in a first group of said registers through said first path and manifestations of the numbers in a second group of said registers through said second path; means for selectively interchanging the manifestations in said first and second groups of registers, whereby manifestations normally in said first group pass through said second path and manifestations normally in said second group pass through said first path; means for mathematically combining the intelligence pulses corresponding to the manifestations respectively in said paths to provide a resultant intelligence pulse differentially spaced in time, said resultant intelligence pulse being supplied to the input of one of said registers; and means for converting said resultant intelligence pulse as produced at the output of said last-mentioned register into a desired manifestation of a number representing the mathematical resultant.

22. In a digital computer: means for receiving a group of digital information items each representing a digit and together comprising a numerical value, means for converting each item of said group into a single intelligence pulse, means for recording said intelligence pulses on a moving carrier, means for recording on said carrier a tag pulse in a predetermined position relative to each said intelligence pulse, and means for reading said tag pulses from said carrier and for utilizing said tag pulses to control the operation of said computer.

23. In a digital computer: means for receiving a group of digital information items each representing a digit and together comprising a numerical value, means for converting each item of said group into a single intelligence pulse, means for recording said intelligence pulses on a single track of a moving carrier, means for recording on said track of said carrier a tag pulse in a predetermined position relative to each said intelligence pulse, and means for reading said tag pulses from said carrier and for utilizing said tag pulses to control the operation of said computer.

24. In a digital computer: means for receiving groups of digital information items each representing a digit and each group comprising a numerical value, means for converting each item of each said group into a single intelligence pulse, means for recording said intelligence pulses on a moving carrier, means for recording on said carrier a tag pulse in a predetermined position relative to each said intelligence pulse, and means for reading said tag pulses from said carrier and for utilizing said tag pulses to control the operation of said computer.

25. In a digital computer: means for receiving groups of digital information items each representing a digit and each group comprising a numerical value, means for converting each item of each said group into a single intelligence pulse, means for recording said intelligence pulses on a moving carrier, means for recording on said carrier a tag pulse in a predetermined position relative to each of said intelligence pulses corresponding to a selected one of said item groups, and means for reading said tag pulses from said carrier and for utilizing said tag pulses to control the operation of said computer.

26. In a digital computer: means for receiving groups of digital information items each representing a digit and each group comprising a numerical value, means for converting each item of said group into a single intelligence pulse, means for recording said intelligence pulses on a moving carrier in boxes each comprising two pulses from different item groups, means for recording on said carrier a tag pulse in a predetermined position relative to the boundaries of a selected one of said boxes, and means for reading said tag pulse from said carrier and for utilizing said tag pulse to control the operation of said computer.

27. In a digital computer: means for receiving groups of digital information items each representing a digit and each group comprising a numerical value, means for converting each item of each said group into a single intelligence pulse, means for recording said intelligence pulses on a moving carrier in boxes each comprising two pulses from different item groups, means for recording on said carrier first and second tags in predetermined positions relative to the boundaries of a selected one of said boxes, and means for reading said tags from said carrier and for utilizing said tags to control the operation of said computer.

28. In a digital computer: means for receiving groups of digital information items each representing a digit and each group comprising a numerical value, means for converting each item of each said group into a single intelligence pulse, means for recording said intelligence pulses on a moving carrier in boxes each comprising two pulses from different item groups, means for recording on said carrier tags in predetermined positions relative to the boundaries of a selected one of said boxes, means for causing said tags to shift to corresponding positions in successive boxes corresponding to the same item group, and means for reading said tags from said carrier and for utilizing said tags to control the operation of said computer.

29. In a digital computer: means for receiving groups of digital information items each representing a digit and each group comprising a numerical value, means for converting each item of each said group into a single intelligence pulse differentially spaced in time, means for recording said pulses on a single track of a moving carrier with interpositioning of the pulses of said pulse groups, means for selectively reading from said carrier and mathematically combining said pulse groups to provide a resultant group of intelligence pulses each differentially spaced in time, means for recording said resultant pulse group on said carrier, and means for reading from said carrier and converting said resultant group of intelligence pulses into digital information items representing numerically the mathematical resultant.

30. In a digital computer: means for receiving groups of digital information items each representing a digit and each group comprising a numerical value, means for converting each item of each said group into a single intelligence pulse differentially spaced in time, means for recording said pulses on a single track of a moving carrier, means for selectively reading from said carrier and mathematically combining said pulse groups to provide a resultant group of intelligence pulses each differentially spaced in time, means for recording synchronizing pulses on said single track, means for utilizing said recorded synchronizing pulses as read from said single track to determine the periodicity of said intelligence pulses, means for recording said resultant pulse group on said carrier, and means for reading from said carrier and converting said resultant group of intelligence pulses into digital information items representing numerically the mathematical resultant.

31. In a digital computer comprising a moving carrier adapted to store digital information in the form of pulses differentially spaced in time and having associated reading and recording heads, the combination therewith of: a first path for information flow connecting said heads and comprising delay means, said delay means comprising a storage device, means for charging said device including a potential source, means for discharging said device substantially to zero potential under control of an input pulse, and means for producing an output pulse when said device is charged from said source to a predetermined potential; a second path for information flow connecting said heads and comprising counting circuit means; means adapted for comparing the relative values represented by the digital information flowing respectively in said first and second paths; and switching means interposed in said first and second paths for controlling the flow of information therethrough in response to said comparing means.

32. In a digital computer comprising a moving carrier adapted to store digital information in the form of pulses differentially spaced in time and having associated reading and recording heads, the combination therewith of: a first path for information flow connecting said heads and comprising delay means; a second path for information flow connecting said heads and comprising counting circuit means, said counting circuit means being of the type wherein successive voltage impulses to be counted are impressed on a storage element and an output impulse is supplied by a discharge device in response to the impression of a predetermined number of said voltage impulses on said storage element and including means to stabilize said counting circuit comprising means to detect sample voltages of said successive voltage impulses which vary in amplitude as a function of said voltage impulse amplitudes, and means to apply said sample voltages to said discharge device as a bias, said bias serving to compensate for variations in said amplitudes; means adapted for comparing the relative values represented by the digital information flowing respectively in said first and second paths; and switching means interposed in said first and second paths for controlling the flow of information therethrough in response to said comparing means.

33. In a digital computer comprising a moving carrier adapted to store digital information in the form of pulses differentially spaced in time and having associated reading and recording heads, the combination therewith of: a first path for information flow connecting said heads and comprising delay means; a second path for information flow connecting said heads and comprising counting circuit means; means adapted for comparing the relative values represented by the digital information flowing respectively in said first and second paths, said comparing means comprising first and second input terminals adapted respectively to receive input pulses respectively from said first and second paths, first and second output terminals, rectifier elements connected respectively between said first input and output terminals and between said second input and output terminals, impedance elements connected respectively between said first input terminal and said second output terminal and between said second input terminal and said first output terminal, means for initially establishing said output terminals at substantially the same potential, and bistable trigger circuit means for producing a single output pulse when the potential of a predetermined one of said output terminals changes; and switching means interposed in said first and second paths for controlling the flow of information therethrough in response to said comparing means.

34. In a digital computer comprising a moving carrier adapted to store digital information in the form of pulses differentially spaced in time and having associated reading and recording heads, the combination therewith of: a first path for information flow connecting said heads and comprising delay means; a second path for information flow connecting said heads and comprising counting circuit means; means adapted for comparing the relative values represented by the digital information flowing respectively in said first and second paths; and switching means interposed in said first and second paths for controlling the flow of information therethrough in response to said comparing means, said switching means including a relay oscillator comprising first and second relays having picked up and released conditions, first and second energy storage devices, means for initially charging said first storage device, a connection between said first storage device and said second relay whereby the charge in said device is utilized to pick up said second relay for a predetermined time interval, means for charging said second storage device while said second relay is picked up, a connection between said second storage device and said first relay whereby the charge in said device is utilized upon release of said second relay to pick up said first relay for a predetermined time interval, and means for charging said first storage device while said first relay is picked up and for discharging said first storage device upon release of said first relay, whereby the operative cycle is repeated.

35. In a digital computer comprising a moving carrier adapted to store digital information in the form of pulses differentially spaced in time and having associated reading and recording heads, the combination therewith of: a first path for information flow connecting said heads and comprising delay means; a second path for information flow connecting said heads and comprising counting circuit means; means adapted for comparing the relative values represented by the digital information flowing respectively in said first and second paths; and switching means interposed in said first and second paths for controlling the flow of information therethrough in response to said comparing means, said switching means including a relay chain comprising a plurality of relays having picked up and released conditions, first and second energy storage devices, means for charging said first storage device during a first time interval and for charging said second storage device during a second time interval, means operative during alternate time intervals for utilizing the discharge of said first storage device to pick up successively alternate ones of said relays and the discharge of said second storage device to pick up successively the remaining ones of said relays, and means for releasing each of said relays as the succeeding one picks up.

36. Pulse delay apparatus comprising: a capacitor; means for charging said capacitor including a potential source; means for discharging said capacitor substantially to zero potential under control of an input pulse; first ad second electron discharge devices coupled together and each having a control electrode; means for maintaining said first device normally nonconductive and said second device normally conductive with no appreciable current flow through the control electrode thereof; and means for applying the potential across said capacitor to the control electrode of said first device whereby, when said potential reaches a predetermined value, the conductivity states of said devices are reversed and an output pulse is produced.

37. Pulse delay apparatus comprising: a capacitor; means for charging said capacitor including a potential source; means for discharging said capacitor substantially to zero potential under control of an input pulse; first and second electron discharge devices each having an anode, a cathode and a control electrode; means for maintaining said first device normally nonconductive and said second device normally conductive with no appreciable current flow through the control electrode thereof; a common cathode load for said devices and a coupling between the anode of said first device and the control electrode of said second device; and means for applying the potential across said capacitor to the control electrode of said first device whereby, when said potential reaches a predetermined value, the conductivity states of said devices are reversed and an output pulse is produced.

38. Pulse delay apparatus comprising: a capacitor; means for charging said capacitor including a potential source; means for discharging said capacitor substantially to zero potential under control of an input pulse; first and second electron discharge devices coupled together and each having a control electrode; means for maintaining said first device normally nonconductive and said second device normally conductive with no appreciable current flow through the control electrode thereof; means for applying the potential across said capacitor to the control electrode of said first device whereby, when said potential reaches a predetermined value, the conductivity states of said devices are reversed and an output pulse is produced; and means for changing the magnitude of said potential source to vary the length of time between said input and output pulses.

39. Pulse delay apparatus comprising: a capacitor; means for charging said capacitor including a potential source; means for discharging said capacitor substantially to zero potential, said means comprising clamping means selectively actuated by an input pulse; first and second electron discharge devices coupled together and each having a control electrode; means for maintaining said first device normally nonconductive and said second device normally conductive with no appreciable current flow through the control electrode thereof; and means for applying the potential across said capacitor to the control electrode of said first device whereby, when said potential reaches a predetermined value, the conductivity states of said devices are reversed and an output pulse is produced.

40. In a synchronizing system: a cyclically moving carrier having recording and reading means, the speed of said carrier and the spacing of said recording and reading means providing a nominal time interval between the recording and the reading of a pulse; a basic source of first and second control pulses spaced by approximately said nominal time interval; means for supplying said first control pulse to said recording means; means for comparing said first control pulse as read by said reading means with said second control pulse; and means responsive to a difference in timing between said read first control pulse and said second control pulse to vary the frequency of said basic source to secure synchronization between said basic source and said carrier.

41. In a synchronizing system: a cyclically moving carrier having recording and reading means, the speed of said carrier and the spacing of said recording and reading means providing a nominal time interval between the recording and the reading of a pulse; a basic source of first and second control pulses spaced by approximately said nominal time interval; means for supplying said first control pulse to said recording means; means for comparing said first control pulse as read by said reading means with said second control pulse; means responsive to a difference in timing between said read first control pulse and said second control pulse to provide a control voltage; and means for varying the frequency of said basic source as a function of said control voltage to secure synchronization between said basic source and said carrier.

42. In a synchronizing system: a cyclically moving carrier having recording and reading means, the speed of said carrier and the spacing of said recording and reading means providing a nominal time interval between the recording and the reading of a pulse; a basic source of first and second control pulses spaced by approximately said nominal time interval; means for supplying said first control pulse to said recording means; means for comparing said first control pulse as read by said reading means with said second control pulse; means responsive to a difference in timing between said read first control pulse and said second control pulse to provide a control voltage, said means comprising a storage device and means for varying the charge therein; and means for varying the frequency of said basic source as a function of said control voltage to secure synchronization between said basic source and said carrier.

43. In a synchronizing system: a cyclically moving carrier having recording and reading means, the speed of said carrier and the spacing of said recording and reading means providing a nominal time interval between the recording and the reading of a pulse; a basic source of first and second control pulses spaced by approximately said nominal time interval; means for supplying said first control pulse to said recording means; means for comparing said first control pulse as read by said reading means with said second control pulse; means responsive to a difference in timing between said read first control pulse and said second control pulse to provide a control voltage, said means comprising a free-running trigger circuit and means for causing its actuation; and means for varying the frequency of said basic source as a function of said control voltage to secure synchronization between said basic source and said carrier.

44. In a synchronizing system: a cyclically moving carrier having recording and reading means, the speed of said carrier and the spacing of said recording and reading means providing a nominal time interval between the recording and the reading of a pulse; a basic source of first and second control pulses spaced by approximately said nominal time interval; means for supplying said first control pulse to said recording means; means for comparing said first control pulse as read by said reading means with said second control pulse; means responsive to a difference in timing between said read first control pulse and said second control pulse to provide a control voltage, said means comprising a storage device and plural trigger circuits for varying the charge therein; and means for varying the frequency of said basic source as a function of said control voltage to secure synchronization between said basic source and said carrier.

45. In an energy storage step counter of the type wherein successive voltage pulses to be counted are impressed on a storage element and an output pulse is provided in response to the impression of a predetermined number of said voltage pulses on said storage element, the combination therewith of: means for producing said output pulse comprising first and second electron discharge tubes having a common cathode connection and respectively having first and second control electrodes, said first tube normally being conductive and said second tube normally being nonconductive; a connection between said storage element and said first control electrode; and means to detect sample voltages of said successive voltage pulses which vary in amplitude as a function of said voltage pulse amplitudes and to apply said sample voltages to said second control electrode as a bias, said bias serving to compensate for variations in said amplitudes in such a manner that the conductivity conditions of said tubes are reversed and said output pulse is produced when said first and second electrodes reach the same potential irrespective of the actual value thereof.

46. In an energy storage step counter of the type wherein successive voltage pulses to be counted are impressed on an initially charged storage element and an output pulse is provided in response to the impression of a predetermined number of said voltage pulses on said storage element, the combination therewith of: means for producing said output pulse comprising first and second electron discharge tubes having a common cathode connection and respectively having first and second control electrodes, said first tube normally being conductive and said second tube normally being nonconductive; a connection between said storage element and said first control electrode; means to detect sample voltages of said successive voltage pulses which vary in amplitude as a function of said voltage pulse amplitudes and to apply said sample voltages to said second control electrode as a bias, said bias serving to compensate for variations in said amplitudes in such a manner that the conductivity conditions of said tubes are reversed and said output pulse is produced when said first and second electrodes reach the same potential irrespective of the actual value thereof; and means responsive to said output pulse for restoring said storage element to its initial charged condition.

47. In an energy storage step counter of the type wherein successive voltage pulses to be counted are impressed on a storage element and an output pulse is provided in response to the impression of a predetermined number of said voltage pulses on said storage element, the combination therewith of: means for producing said output pulse comprising first and second electron discharge tubes having a common cathode connection and respectively having first and second control electrodes, said first tube normally being conductive and said second tube normally being nonconductive; a connection between said storage element and said first control electrode; means for linearizing the discharge of said storage element comprising rectifier means connected between said storage element and said common cathode connection; and means to detect sample voltages of said successive voltage pulses which vary in amplitude as a function of said voltage pulse amplitudes and to apply said sample voltages to said second control electrode as a bias, said bias serving to compensate for variations in said amplitudes in such a manner that the conductivity conditions of said tubes are reversed and said output pulse is produced when said first and second electrodes reach the same potential irrespective of the actual value thereof.

48. In an energy storage step counter of the type wherein successive voltage pulses to be counted are impressed on an initially charged storage element and an output pulse is provided in response to the impression of a predetermined number of said voltage pulses on said storage element, the combination therewith of: means for producing said output pulse comprising first and second electron discharge tubes having a common cathode connection and respectively having first and second control electrodes, said first tube normally being conductive and said second tube normally being nonconductive; a connection between said storage element and said first cotrol electrode; means for linearizing the discharge of said storage element comprising rectifier means connected between said storage element and said common cathode connection; means to detect sample voltages of said successive voltage pulses which vary in amplitude as a function of said voltage pulse amplitudes and to apply said sample voltages to said second control electrode as a bias, said bias serving to compensate for variations in said amplitudes in such a manner that the conductivity conditions of said tubes are reversed and said output pulse is produced when said first and second electrodes reach the same potential irrespective of the actual value thereof; and means responsive to said output pulse for restoring said storage element to its initial charged condition.

49. In an energy storage step counter of the type wherein successive voltage pulses to be counted are impressed on a first storage element and an output pulse is provided in response to the impression of a predetermined number of said voltage pulses on said storage element, the combination therewith of: means for initially charging said first storage element to a predetermined value; means including a second storage element for incrementally discharging said first storage element in response to each said voltage pulse; means for producing said output pulse comprising first and second electron discharge tubes having a common cathode connection and respectively having first and second control electrodes, said first tube normally being conductive and said second tube normally being nonconductive; a conection between said first storage element and said first control electrode; and means to detect sample voltages of said successive voltage pulses which vary in amplitude as a function of said voltage pulse amplitudes and to apply said sample voltages to said second control electrode as a bias, said bias serving to compensate for variations in said amplitudes in such a manner that the conductivity conditions of said tubes are reversed and said output pulse is produced when said first and second electrodes reach the same potential irrespective of the actual value thereof.

50. In an energy storage step counter of the type wherein successive voltage pulses to be counted are impressed on a first storage element and an output pulse is provided in response to the impression of a predetermined number of said voltage pulses on said storage element, the combination therewith of: means for initially charging said first storage element to a predetermined value; means including a second storage element for incrementally discharging said first storage element in response to each said voltage pulse; means for producing said output pulse comprising first and second electron discharge tubes having a common cathode connection and respectively having first and second control electrodes, said first tube normally being conductive and said second tube normally being nonconductive; a connection between said first storage element and said first control electrode; means for linearizing the discharge of said first storage element comprising cascaded rectifier elements connected between said first storage element and said common cathode connection and a connection between said second storage element and the junction of said rectifier elements; and means to detect sample voltages of said successive voltage pulses which vary in amplitude as a function of said voltage pulse amplitudes and to apply said sample voltages to said second control electrode as a bias, said bias serving to compensate for variations in said amplitudes in such a manner that the conductivity conditions of said tubes are reversed and said output pulse is produced when said first and second electrodes reach the same potential irrespective of the actual value thereof.

51. In an energy storage step counter of the type wherein successive voltage pulses to be counted are impressed on a storage element and an output pulse is provided in response to the impression of a predetermined number of said voltage pulses on said storage element, the combination therewith of: means for producing said output pulse comprising first and second electron discharge tubes having a common cathode connection and respectively having first and second control electrodes, said first tube normally being conductive and said second tube normally being nonconductive; a power supply operatively connected to said tubes; a connection between said storage element and said first control electrode; means to detect sample voltages of said successive voltage pulses which vary in amplitude as a function of said voltage pulse amplitudes; means to develop a compensating voltage dependent upon the voltage of said power supply, said means comprising a voltage-dividing network operatively connected to said power supply; and means to combine said sample voltages and said compensating voltage and to apply the resultant to said second control electrode as a bias, said bias serving to compensate for variations in said voltage pulse amplitudes and in said power-supply voltage in such a manner that the conductivity conditions of said tubes are reversed and said output pulse is produced when said first and second electrodes reach the same potential irrespective of the actual value thereof.

52. Apparatus for temporarily storing time series digital information including in combination, a source of time series digital information, a storage means, recording apparatus associated with said storage means, a gating means connected serially between said source of digital information and said recording means, means intermittently energizing said gating means whereby digital information from said source is recorded on said storage means in areas spaced apart, means energizing said gating means whereby said digital information is recorded on said storage means in the areas lying between said first named recording areas, reading apparatus associated with said storage means, an output device, gating means coupled serially between said reading means and said output device, means energizing said gating means whereby the first recorded information is read from the storage means and supplied to the output device, and means energizing said reading gating means whereby the second recorded information is read from said storage means and supplied to said output device.

53. Apparatus for recording digital information including in combination, a rotating magnetic drum having a magnetizable periphery, recording apparatus disposed adjacent said magnetizable periphery for magnetizing selected areas of said magnetic drum in accordance with electrical signals as the drum passes the recording apparatus, a source of electrical signals representing time series digital information, writing gating circuits coupled between said source of digital information and said recording apparatus, means synchronized with rotation of the drum for energizing said writing gating means during intermittent intervals whereby equally spaced areas of said magnetic drum are recorded with digital information from said source during a first predetermined interval, means synchronized with rotation of the drum for energizing said writing gating means during intermittent intervals during a subsequent revolution of the drum, and means for phasing the intermittent writing intervals on the subsequent rotation with relation to the spaced areas in which information was written during said first interval, whereby digital information from said source of digital information is recorded on areas of said magnetic drum which are interleaved with said equally spaced areas.

54. In a magnetic drum shift register device, two single transducer heads mounted in spaced apart relation adjacent to the periphery of said drum, three separate loops each providing a selectable regenerative path connectible between said transducer heads comprising respectively a left shift path, a right shift path and a no shift path, and control gating means for selecting one of said regenerative paths between said transducer heads whereby shifting operations are performed.

55. In a data recording apparatus, shift control circuits comprising a revolving memory loop having a magnetic memory data track and two single transducer heads spaced apart along the track substantially the number of digits to be recorded in the loop, three separate circuit loops providing respectively: a first circuit path connectible between said heads, a second circuit path connectible between said heads and providing delay wherein said second path and said magnetic memory data track together provide delay for all digits to be recorded, a third circuit path connectible between said heads and providing greater delay than said second path, and control means for selecting one of said three circuit paths whereby shifting operations are performed.

56. In an electronic computer system, a revolving memory loop on a moving magneizable medium, a transducer head for reading from said loop, a transducer head for writing on said loop, three separate loop circuits each providing a separate regenerative path connectible between said read transducer head and said write transducer head comprising respectively left shift, right shift and no shift paths, shift control circuits connected in said loop circuits and responsive to signals from the computer system for connecting a selected one of said paths to the heads whereby information received by the write head from the read head is selectively shifted or not shifted depending upon the regenerative path selected.

57. In an electronic computer system, a revolving memory lane on a moving magnetizable medium, a single reading means for reproducing signals from data stored in said lane of the magnetizable medium, a single writing means for introducing data into said magnetizable medium regeneratively recording signals read from said memory lane, three separate and optionally selectable data processing circuits each having a different time delay, control circuit means for selecting one of said data processing circuits and coupling the same between said reading and writing means for processing data on said revolving memory lane.

58. In a data storage apparatus, a movable member having a magnetizable surface, two single transducer heads spaced apart and adjacent to said surface, three separate loop circuits each including a separate regenerative path connectible between said transducer heads comprising respectively left shift, right shift and no shift paths, and shift control circuit means for coupling one of said regenerative paths between said transducer heads forming a regenerative closed loop whereby shifting operations are accomplished.

59. In an electronic computer system, a revolving memory loop on a moving magnetizable medium, a transducer head for non destructive reading from said loop, a transducer head for destructive writing over information formerly written on said loop, three separate circuit loops each providing a separate regenerative path connectible between said read transducer head and said write transducer head comprising respectively left shift, right shift and no shift paths, shift control circuits connected in said circuit loops and responsive to signals from the computer system for connecting a selected one of said paths to the heads whereby information received by the write head from the read head is selectively shifted or not shifted depending upon the regenerative path selected.

60. In an electronic computer system, a revolving memory loop on a moving magnetizable medium for storing a fixed number of digits, a transducer head for reading from said loop, a regeneration transducer head for writing on said loop, three separate loop circuits each providing a separate regenerative path connectible between said read transducer head and said write transducer head in series with said memory loop, said first path comprising means for delaying at least a single digit, said second path comprising means for delaying at least two digits, and said third path comprising means for delaying no digits, and shift control circuit means connected to said regenerative paths and responsive to signals from the computer system for connecting a selected one of said paths to the heads whereby information read by said read head may be routed through different ones of said paths and the time required for regeneration may be selectively varied.

61. In an electronic computer system, a revolving memory loop on a movable magnetization medium for serially recording a word having a plurality of digits, a transducer head for reading from said loop, a transducer head for writing on said loop, three separate circuit loops each including a separate regenerative path connectible between said read transducer head and said write transducer head, including respectively a path having delay means equivalent to one digit time, a path having delay means equivalent to two digit times and a path having no delay means, each of said delay means including a decade counter for serial read-in and serial read-out and shift control circuit means connected to said regenerative paths and responsive to signals from the computer system for a selected one of said paths to the heads whereby information received by the write head from the read head is selectively delayed or not delayed, depending upon the regenerative path selected.

62. In combination for recording messages on a display member having properties of providing a visual display of such messages,
- means for receiving sequences of signals in a form to represent a message,
- means responsive to the signals in the sequence for converting such signals into the information represented by such signals,
- means operatively coupled to the converting means for displaying the information in the message on the display member,
- means operatively coupled to the display member for providing a marking as to the particular position on the display member wherein information is being received at each instant, and
- means operatively coupled to the display member for providing an advance of the marking to the next position on the display member upon the display of the received information at the particular position on the display member.

63. In combination for recording messages on a display member having properties of providing a visual display of such messages,
- a plurality of means each representing individual information and actuatable in a particular pattern to represent a first message,
- means operatively coupled to the first actuatable means for converting the actuation of such actuatable means into pluralities of signals representing usch actuations in coded form to obtain a transmission of such pluralities of signals,
- means operatively coupled to the last mentioned means and to the display member for converting the sequence of signals into the individual information represented by the actuation of the actuatable means to obtain a display of the information as a first message on the display member,
- means operatively coupled to the display member for providing a marking as to the position to receive information in accordance with the actuation of the actuatable means,
- means operatively coupled to the display member for providing an advance of the marking on the display member to the next position in accordance with each actuation of the actuatable means, and
- means for moving said marker through data positions of said display member without altering data contained therein, and
- means for altering data contained at any desired position wherein said marking has been shifted.

64. In combination for recording messages on a display member having properties of providing a visual display of such messages,
- a plurality of means each representing individual information and actuatable in a particular pattern to represent a first message,
- means operatively coupled tot he first actuatable means for converting the actuation of such actuatable means into pluralities of signals representing such actuation in coded form to obtain a transmission of such pluralities of signals,
- means operatively coupled to the actuatable means for displaying as a first message on a first portion of the display member the information repersented by the actuation of the actuatable means,
- means for receiving second pluralities of signals in the coded form to represent a second message,
- means responsive to the second pluralities of signals for converting such signals into the information represented by such signals,
- means operatively coupled to the last mentioned means for displaying the information in the second message on a second portion of the display member.
- means operatively coupled to the actuatable means for shifting the first and second messages relative to one another, and
- means operatively coupled to the actuatable means for effecting a concurrence of said first and second messages to provide for logical manipulation.

65. In combination for recording messages on a display member having properties of providing a visual display of such messages,
- a plurality of means each representing individual information and actuatable in a particular sequence to represent successive words in a first message,
- means operatively coupled to the actuatable means for providing for a conversion of the successive words in the first message to first sequences of signals in a first code for transmission of such signals to a position removed from the display member,
- means operatively coupled to the actuatable means for providing for a display of the successive words in the first message on a first portion of the display member, means operatively coupled to the display member and the actuatable means for providing an indication as to the position on the display member wherein information is to be recorded in accordance with the actuation of the actuatable means, and means operatively coupled to the display member and the last mentioned means for providing an advance of the indication to each successive position on the display member in accordance with the actuation of the actuatable means.

66. In combination for recording messages on a display member having properties of providing a visual display of such messages, a plurality of means each representing individual information and actuatable in a particular pattern to represent a first message, means operatively coupled to the actuatable means for providing for a conversion of the information in the first message to a first plurality of signals in coded form, means operatively coupled to the actuatable means for providing for a display of the first message in a first portion of the display member of the first message, means for receiving second signals in the coded form to represent a second message, means responsive to the second signals for converting such signals into the second particular information, means responsive to the second message for displaying such message on a second portion of the display member, and means operatively coupled to the actuatable means for shifting the first and second messages relative to one another, and means operatively coupled to the actuatable means for effecting a concurrence of said first and second messages to provide for logical manipulation.

67. In combination for recording messages on a display member having properties of providing a visual display of such messages, first means operatively coupled to the display member for providing a sequential recirculation of the information from the display member, second means operatively coupled to the display member for providing an introduction to the display member of the recirculated information to obtain a recording of such information by the display member for display, third means operatively coupled to the display member for providing a marking of the position at which the information is being recorded on the display member, and fourth means operatively coupled to the display member and the third means for obtaining an advance of the marking from each particular position to the next position upon the recording of information in each particular position.

68. In combination for recording messages on a display member having properties of providing a visual display of such messages, means for receiving sequences of signals in a coded form to represent a message, means responsive to the signals in the sequences for converting such signals into the information represented by such signals, means operatively coupled to the converting means for displaying the information in the message on the display member, memory means for storing information in coded form to represent a fixed message, control means operatively coupled to the memory means for obtaining a transfer of the fixed message from the memory means for conversion into a form for display by the display member, and means operatively coupled to the control means and responsive to the information released from the memory means for providing a display of the fixed message by the display member in substitution for the received information displayed by the display member.

69. In combination for recording messages on a display member having properties of providing a visual display of such messages, a plurality of means each representing individual information and actuatable in a particular sequence to represent successive words in a first message, means operatively coupled to the actuatable means for providing for a conversion of the successive words in the first message to first sequences of signals in a first code for transmission of such signals to a position removed from the diplay member, means operatively coupled to the actuatable means for providing for a display of the successive words in the first message on the display member, storage means for providing a storage of a fixed message in the first code, control means operatively coupled to the storage means for obtaining a transfer of the fixed message from the storage means, and means operatively coupled to the control means and the display member for obtaining an introduction of the fixed message from the storage means to the display member to provide a replacement for the information displayed by the display member.

70. A data processing system including a data storage unit for storing data within said system, said data storage unit including a plurality of storage locations for data in said system where said storage locations are selectively accessible, a data entry device for generating data for entry into said system, said data entry device including means for initiating a data storage selection, means included in said processing system responsive to operation of said means for initiating a data storage selection for forming within said processor a data control key for controlling the entry of data form said data entry device into said data storage, and means included in said processing system for controlling said data entry key as data is entered into said storage.

71. The apparatus of claim 70 wherein said data control key is contained in said data storage as a portion thereof.

72. The apparatus of claim 70 further including visual display means for visually viewing data within said processor.

73. The apparatus of claim 71 further including visual display means for visually viewing data within said processor.

74. The apparatus of claim 71 further including group storage control means within said data entry means for forming within said data control key an indication of a group of storage locations into which data is to be transferred.

75. The apparatus of claim 74 further including a disconnect control means within said data entry device for selectively disconnecting said data entry means from said storage.

76. The apparatus of claim 74 further including control means within said processor responsive to the entry of predetermined quantities of data into storage for automatically disconnecting said data entry means from said storage.

77. The apparatus of claim 74 further including means within said data processing unit for interchanging data contained in different portions of said storage, said means for interchanging data between portions of storage being initiated automatically or in response to operation of a control contained in said data entry.

78. A data processing system including a data storage unit for storing data within said system, said data storage unit including a plurality of storage locations for data in said system where said storage locations are selectively accessible, an arithmetic and logic unit forming part of said processing system and being connected to transfer data with said data storage, means included in said processing system responsive to initiation of an operation by said processing system for forming within said processor a data control key for selectively controlling the transfer of data within said processor, and means included in said processing system for controlling said data control key in response to operation of said processor.

79. The apparatus of claim 78 wherein said data control key is contained in said data storage as a portion thereof.

80. The apparatus of claim 78 further including visual display means for visually viewing data within said processor.

81. The apparatus of claim 80 wherein said data control key is a marking associated with said data in said storage and transferred with said data.

82. The apparatus of claim 79 further including control means within said processor responsive to the completion of operations within said processor for eliminating said data control key from said processor.

83. The apparatus of claim 79 wherein data from said storage is transferred to said arithmetic and logic unit for operations therein, means contained within said processor for selecting individual groups of data location from said storage for interoperational processes.

84. The apparatus of claim 83 wherein said processes including shifting of data so as to change the denominational significance of the same, comparing one group with another, and subtracting and/or adding one group to another.

85. A data processing system including a data storage unit for storing data within said system, said data storage unit including a plurality of storage locations for data in said system where said storage locations are selectively accessible, a data entry device for generating data for entry into said system, a marker within said data storage for controlling the selection of storage locations, means within said data storage for shifting said marker to selected storage locations within said data storage, and means under control of said data entry device for removing said marker from said data storage.

86. The apparatus of claim 85 further including means forming a portion of said data entry device for forming a marker in a selected discrete portion of said data storage.

87. The apparatus of claim 86 wherein data in said selected portion of storage is visually displayed.

88. A data processing system including a data storage unit for storing data within said system, (a) a data transfer loop, (b) means for transferring data from said storage to said transfer loop, (c) means within said transfer loop for restoring said data to said storage, (d) selective data modification means within said transfer loop, and (e) marker means for selecting said data within said loop for modification.

89. The apparatus of claim 88 wherein said data processor includes means for generating a marker and storing the same in said storage for transfer with selected data from said storage through said loop.

90. The apparatus of claim 89 further including means in said processor for controlling the position of said marker relative to selected data.

91. The apparatus of claim 90 further including means for removing said marker from said data.

92. The apparatus of claim 91 further including a keyboard for generating data for entry into said transfer loop, said keyboard including means establishing said marker in said storage.

93. The apparatus of claim 89 further including a visual display means for data being circulated through said loop.

References Cited

UNITED STATES PATENTS

| | | | |
|---|---|---|---|
| 2,540,654 | 2/1951 | Cohen | 235—61 |
| 2,609,143 | 9/1952 | Stibitz | 235—61 |
| 2,644,887 | 7/1953 | Wolfe | 250—27 |
| 2,693,533 | 11/1954 | Femmer | 250—27 |
| 2,359,143 | 9/1944 | Myers | 315—252 |
| 2,535,147 | 12/1950 | Markuser | 315—252 |
| 1,904,929 | 4/1933 | Richardson | 317—140 |
| 2,080,273 | 5/1937 | Holmes | 317—141 |
| 2,136,606 | 11/1938 | Bendel | 332—47 |
| 2,414,486 | 1/1947 | Bieke | 250—27 |
| 2,510,075 | 6/1950 | Clavier et al. | 332—47 |
| 2,537,077 | 1/1951 | McVay et al. | 250—36.13.2 |
| 2,565,896 | 8/1951 | Webb | 250—36.13.2 |
| 2,574,904 | 11/1951 | Bellamy | 317—140 |
| 2,600,648 | 6/1952 | Herrick | 317—140 |
| 2,652,554 | 9/1953 | Williams et al. | 235—61 |
| 2,661,421 | 12/1953 | Talamini et al. | 250—27 |
| 2,689,914 | 9/1954 | Keen | 250—36.19 |
| 2,712,065 | 6/1955 | Elbourn et al. | 235—61 |
| 2,739,299 | 3/1956 | Burkhart | 235—61 |
| 2,607,006 | 8/1952 | Hoeppner | 235—61 |
| 2,619,618 | 11/1952 | Adler | 315—238 |
| 2,789,224 | 4/1957 | Leonard | 235—61 |
| 2,790,599 | 4/1957 | Gloess | 235—61 |
| 2,799,449 | 7/1957 | Turing et al. | 235—61 |
| 2,787,416 | 4/1957 | Hansen | 235—61 |
| 2,796,596 | 6/1957 | Kenosian | 235—61 |

OTHER REFERENCES

Chem.: "Diode Coincidence and Mixing Circuits in Digital Computers," Proc. Ire, May 1950, p. 512 relied on.

"Description of a Magnetic Drum Calculator," Staff of Harvard Computation Lab, Harvard Univ. Press, copy right Aug. 22, 1952.

GARETH D. SHAW, Primary Examiner